US012738117B2

(12) United States Patent
Galley et al.

(10) Patent No.: US 12,738,117 B2
(45) Date of Patent: Sep. 15, 2026

(54) METHODS OF ESTIMATING A THROUGHPUT OF A RESOURCE, A LENGTH OF A QUEUE ASSOCIATED WITH THE RESOURCE AND/OR A WAIT TIME OF THE QUEUE

(71) Applicant: Accesso Technology Group Plc, Twyford (GB)

(72) Inventors: Christopher Simon Galley, Twyford (GB); Christoper Simon Peter Barnaby, Twyford (GB); Ian Michael Francis, Twyford (GB); Benjamin Keeling Mathews, Orlando, FL (US); Christoper Andrew Ella, Twyford (GB)

(73) Assignee: Accesso Technology Group Plc, Twyford (GB)

( * ) Notice: Subject to any disclaimer, the term of this patent is extended or adjusted under 35 U.S.C. 154(b) by 0 days.

(21) Appl. No.: 18/221,006

(22) Filed: Jul. 12, 2023

(65) Prior Publication Data

US 2023/0351832 A1 Nov. 2, 2023

Related U.S. Application Data

(63) Continuation-in-part of application No. 17/984,402, filed on Nov. 10, 2022, which is a (Continued)

(51) Int. Cl.

*G06Q 10/00* (2026.01)
*G06Q 10/02* (2012.01)

(Continued)

(52) U.S. Cl.

CPC ............ *G07C 11/00* (2013.01); *G06Q 10/02* (2013.01); *G07C 9/215* (2020.01); *G07C 9/27* (2020.01);

(Continued)

(58) Field of Classification Search

None

See application file for complete search history.

(56) References Cited

U.S. PATENT DOCUMENTS

| | | | |
|---|---|---|---|
| 4,873,513 | A | 10/1989 | Soults et al. |
| 5,754,660 | A | 5/1998 | Shimizu |

(Continued)

FOREIGN PATENT DOCUMENTS

| | | | |
|---|---|---|---|
| CN | 101006475 | A | 7/2007 |
| CN | 101308616 | A | 11/2008 |

(Continued)

OTHER PUBLICATIONS

A Pixel-Weighting Method for Discriminating Objects of Different Sizes in an Image Captured from a Single Camera Mookyung Park; Namsu Moon; Sangrim Ryu; The 3rd Canadian Conference on Computer and Robot Vision (CRV'06) (Year: 2006).*

(Continued)

*Primary Examiner* — Tonya Joseph

(74) *Attorney, Agent, or Firm* — Banner & Witcoff, Ltd.

(57) ABSTRACT

Aspects of the disclosure relate to a method of estimating a length of a queue associated with a resource within a venue. Images of the queue may be received, each image corresponding to a segment of the queue. A server may estimate a number of venue guests in the queue by: for each of a first subset of the images, estimating a number of pixels of the image that correspond to venue guests in the queue; and for each of a second subset of the images, detecting and counting individual venue guests visible in the image. A notification including the estimated number of venue guests in the queue, an estimated current wait time, and/or a time at which a venue guest joining the queue is permitted entry to the resource, may be sent to devices corresponding to venue guests.

22 Claims, 14 Drawing Sheets
(4 of 14 Drawing Sheet(s) Filed in Color)

Related U.S. Application Data continuation-in-part of application No. 15/141,780, filed on Apr. 28, 2016, now Pat. No. 11,526,916, and a continuation-in-part of application No. 17/088,039, filed on Nov. 3, 2020, now Pat. No. 11,869,277, which is a continuation of application No. 15/315,712, filed as application No. PCT/GB2015/051607 on Jun. 2, 2015, now Pat. No. 11,393,271.

(60) Provisional application No. 62/153,686, filed on Apr. 28, 2015.

(51) Int. Cl.
*G07C 9/20* (2020.01)
*G07C 9/27* (2020.01)
*G07C 9/29* (2020.01)
*G07C 11/00* (2006.01)

(52) U.S. Cl.
CPC ............ *G07C 9/29* (2020.01); *G07C 2011/02* (2013.01); *G07C 2011/04* (2013.01)

(56) References Cited

U.S. PATENT DOCUMENTS 5,784,467 A 7/1998 Asayama
5,978,744 A 11/1999 McBride
5,978,770 A 11/1999 Waytena et al.
6,142,368 A 11/2000 Mullins et al.
6,154,549 A 11/2000 Arnold et al.
6,223,559 B1 5/2001 Coleman
6,320,496 B1 11/2001 Sokoler et al.
6,352,205 B1 3/2002 Mullins et al.
6,369,840 B1 4/2002 Barnett et al.
6,414,635 B1 7/2002 Stewart et al.
6,474,557 B2 11/2002 Mullins et al.
6,493,630 B2 12/2002 Ruiz et al.
6,496,207 B1 12/2002 Matsuda et al.
6,529,786 B1 3/2003 Sim
6,587,787 B1 7/2003 Yokota
6,663,006 B2 12/2003 Mullins et al.
6,687,608 B2 2/2004 Sugimoto et al.
6,760,050 B1 7/2004 Nakagawa
6,973,192 B1 12/2005 Gerrard et al.
6,997,380 B2 2/2006 Safaei et al.
7,027,600 B1 4/2006 Kaji et al.
7,222,080 B2 5/2007 Hale et al.
7,319,760 B2 1/2008 Sekine et al.
7,558,678 B2 7/2009 Jones
7,802,724 B1 9/2010 Nohr
7,992,773 B1 8/2011 Rothschild
8,368,695 B2 2/2013 Howell et al.
8,424,752 B2 4/2013 Rothschild
8,427,510 B1 4/2013 Towfiq et al.
8,433,342 B1 4/2013 Boyle et al.
8,538,389 B1 9/2013 Evans et al.
8,606,605 B2 12/2013 Bayne et al.
8,625,796 B1 1/2014 Ben Ayed
8,651,369 B2 2/2014 Rothschild
8,866,673 B2 10/2014 Mendelson
8,936,190 B2 1/2015 Rothschild
8,963,775 B2 2/2015 Faragher
9,135,791 B2 9/2015 Nakamura et al.
9,264,849 B1 2/2016 Kahn et al.
9,448,085 B2 9/2016 Bass et al.
9,485,322 B2 11/2016 Krishnaswamy et al.
9,488,085 B2 11/2016 Crawford et al.
9,491,584 B1 11/2016 Mendelson
9,674,684 B1 6/2017 Mendelson
9,741,022 B2 8/2017 Ziskind et al.
9,813,855 B2 11/2017 Sahadi et al.
9,813,862 B2 11/2017 Liu et al.
9,829,339 B2 11/2017 Bass et al.
9,906,909 B2 2/2018 Sahadi et al.
9,909,896 B2 3/2018 Bass et al.
10,028,091 B2 7/2018 Sahadi et al.
10,129,728 B2 11/2018 Sahadi et al.
10,149,103 B2 12/2018 Sahadi et al.
10,198,717 B2 2/2019 Ziskind et al.
10,210,542 B2 2/2019 Bass et al.
10,299,070 B2 5/2019 Sahadi et al.
11,127,054 B1 9/2021 Sulejmani
11,393,271 B2 7/2022 Galley et al.
2002/0007292 A1 1/2002 Paxton et al.
2002/0029226 A1 3/2002 Li et al.
2002/0055863 A1 5/2002 Behaylo
2002/0194246 A1 12/2002 Moskowitz et al.
2003/0007464 A1 1/2003 Balani
2003/0102956 A1 6/2003 McManus et al.
2004/0093265 A1 5/2004 Ramchandani et al.
2004/0104912 A1 6/2004 Yamamoto et al.
2004/0224703 A1 11/2004 Takaki et al.
2005/0089053 A1 4/2005 Zhu
2005/0114014 A1 5/2005 Isaac
2006/0074550 A1 4/2006 Freer et al.
2006/0087474 A1 4/2006 Do et al.
2006/0106850 A1 5/2006 Morgan et al.
2007/0032269 A1 2/2007 Shostak
2007/0118415 A1 5/2007 Chen et al.
2007/0174115 A1 7/2007 Chieu et al.
2007/0196801 A1 8/2007 Nagasaka et al.
2007/0197247 A1 8/2007 Inselberg
2007/0225904 A1 9/2007 Pantalone et al.
2007/0239348 A1 10/2007 Cheung
2007/0239409 A1 10/2007 Alan
2007/0270161 A1 11/2007 Hampel et al.
2007/0270166 A1 11/2007 Hampel et al.
2007/0286220 A1 12/2007 Stenning
2008/0059889 A1 3/2008 Parker et al.
2008/0067244 A1 3/2008 Marks
2008/0183582 A1 7/2008 Major
2008/0186164 A1 8/2008 Emigh et al.
2008/0214216 A1* 9/2008 Bragg .................... H04L 67/55 455/466
2008/0290182 A1 11/2008 Bell et al.
2008/0306826 A1 12/2008 Kramer et al.
2008/0312946 A1 12/2008 Valentine et al.
2009/0017798 A1 1/2009 Pop
2009/0027418 A1 1/2009 Maru et al.
2009/0055208 A1 2/2009 Kaiser
2009/0089131 A1 4/2009 Moukas et al.
2009/0222388 A1 9/2009 Hua et al.
2009/0265428 A1 10/2009 Light et al.
2009/0319306 A1 12/2009 Chanick
2009/0319616 A1 12/2009 Lewis, II et al.
2010/0037141 A1 2/2010 Carter et al.
2010/0042320 A1 2/2010 Salmre et al.
2010/0063854 A1 3/2010 Purvis et al.
2010/0077036 A1 3/2010 DeLuca et al.
2010/0117790 A1 5/2010 Bayne et al.
2010/0161432 A1 6/2010 Kumanov et al.
2010/0162121 A1 6/2010 Yoakum et al.
2010/0194784 A1 8/2010 Hoff et al.
2010/0261526 A1 10/2010 Anderson et al.
2010/0277276 A1 11/2010 Bayne et al.
2011/0054976 A1 3/2011 Adler et al.
2011/0078026 A1 3/2011 Durham
2011/0090123 A1 4/2011 Sridhara et al.
2011/0130955 A1 6/2011 Pu et al.
2011/0136507 A1 6/2011 Hauser et al.
2011/0173545 A1 7/2011 Meola
2011/0199302 A1 8/2011 Tossell et al.
2011/0221745 A1 9/2011 Goldman et al.
2011/0231235 A1 9/2011 MacIlwaine et al.
2011/0246148 A1 10/2011 Gupta et al.
2011/0267369 A1 11/2011 Olsen
2011/0307547 A1 12/2011 Backer et al.
2012/0024947 A1 2/2012 Naelon
2012/0069131 A1 3/2012 Abelow
2012/0078668 A1 3/2012 Hirose et al.
2012/0081250 A1 4/2012 Farrokhi et al.
2012/0091202 A1* 4/2012 Cohen .................... G07B 15/00 235/382
2012/0096490 A1 4/2012 Barnes, Jr.

(56) References Cited

U.S. PATENT DOCUMENTS

2012/0166960 A1 6/2012 Salles
2012/0172055 A1 7/2012 Edge
2012/0179764 A1 7/2012 Erdal
2012/0182933 A1 7/2012 Bandhakavi et al.
2012/0191497 A1 7/2012 Patterson et al.
2012/0192074 A1 7/2012 Patterson et al.
2012/0197690 A1 8/2012 Agulnek
2012/0197720 A1 8/2012 Bezancon et al.
2012/0214515 A1 8/2012 Davis et al.
2012/0219164 A1 8/2012 Li et al.
2012/0239504 A1 9/2012 Curlander et al.
2012/0270573 A1 10/2012 Marti et al.
2012/0271691 A1 10/2012 Hammad et al.
2012/0274642 A1 11/2012 Ofek et al.
2012/0284117 A1 11/2012 Karandikar
2013/0012235 A1 1/2013 Burdo et al.
2013/0024203 A1 1/2013 Flores et al.
2013/0024265 A1 1/2013 Lotzof
2013/0030875 A1 1/2013 Lee et al.
2013/0036455 A1 2/2013 Bodi et al.
2013/0052990 A1 2/2013 Zhang
2013/0059603 A1 3/2013 Guenec et al.
2013/0073381 A1 3/2013 Binkley
2013/0085834 A1 4/2013 Witherspoon, Jr. et al.
2013/0091452 A1 4/2013 Sorden et al.
2013/0124234 A1 5/2013 Nilsson et al.
2013/0132230 A1 5/2013 Gibson et al.
2013/0137464 A1 5/2013 Kramer et al.
2013/0157655 A1 6/2013 Smith, II et al.
2013/0158867 A1 6/2013 Sidhu et al.
2013/0173377 A1 7/2013 Keller et al.
2013/0173393 A1 7/2013 Calman et al.
2013/0191213 A1 7/2013 Beck et al.
2013/0225282 A1 8/2013 Williams et al.
2013/0231135 A1 9/2013 Garskof
2013/0267260 A1 10/2013 Chao et al.
2013/0279543 A1 10/2013 Torimoto et al.
2013/0281084 A1 10/2013 Batada et al.
2013/0317944 A1 11/2013 Huang et al.
2013/0339073 A1 12/2013 Dabbiere
2014/0019603 A1 1/2014 Dunko
2014/0025466 A1 1/2014 Bortolin et al.
2014/0058766 A1 2/2014 Yu et al.
2014/0067544 A1 3/2014 Klish et al.
2014/0073363 A1 3/2014 Tidd et al.
2014/0074593 A1 3/2014 Chomsky et al.
2014/0082509 A1 3/2014 Roumeliotis et al.
2014/0118113 A1 5/2014 Kaushik et al.
2014/0122040 A1 5/2014 Marti
2014/0128103 A1 5/2014 Joao et al.
2014/0129266 A1 5/2014 Perl et al.
2014/0132772 A1 5/2014 Billau et al.
2014/0162693 A1 6/2014 Wachter et al.
2014/0164761 A1 6/2014 Kufluk et al.
2014/0188614 A1 7/2014 Badenhop
2014/0189802 A1 7/2014 Montgomery
2014/0207509 A1 7/2014 Yu et al.
2014/0225466 A1 8/2014 Sumiya
2014/0228060 A1 8/2014 Abhyanker
2014/0237076 A1 8/2014 Goldman et al.
2014/0244332 A1 8/2014 Mermelstein
2014/0253383 A1 9/2014 Rowitch
2014/0256357 A1 9/2014 Wang et al.
2014/0257991 A1 9/2014 Christensen et al.
2014/0278054 A1 9/2014 Tidd et al.
2014/0292481 A1 10/2014 Dumas et al.
2014/0342760 A1 11/2014 Moldavsky et al.
2015/0028996 A1 1/2015 Agrafioti et al.
2015/0035644 A1 2/2015 June et al.
2015/0038171 A1 2/2015 Uilecan et al.
2015/0052460 A1 2/2015 Mohammad Mirzaei et al.
2015/0058133 A1 2/2015 Roth et al.
2015/0074558 A1 3/2015 Haskins et al.
2015/0080014 A1 3/2015 Ben-Yosef et al.
2015/0081348 A1 3/2015 Avera et al.
2015/0081532 A1 3/2015 Lewis et al.
2015/0088671 A1 3/2015 Xiong et al.
2015/0088782 A1* 3/2015 Zhang ................ G06Q 30/0281
705/346
2015/0100398 A1 4/2015 Narayanaswami et al.
2015/0112841 A1 4/2015 Ivanovic et al.
2015/0127445 A1 5/2015 Jaffee
2015/0154674 A1 6/2015 Todasco
2015/0176997 A1 6/2015 Pursche et al.
2015/0181384 A1 6/2015 Mayor et al.
2015/0222935 A1 8/2015 King et al.
2015/0229626 A1 8/2015 Hauhn
2015/0233715 A1 8/2015 Xu et al.
2015/0237473 A1 8/2015 Koepke
2015/0241238 A1 8/2015 Bass et al.
2015/0242890 A1 8/2015 Bass et al.
2015/0244725 A1 8/2015 Ziskind et al.
2015/0262086 A1 9/2015 Mader et al.
2015/0262216 A1 9/2015 Aziz et al.
2015/0294303 A1 10/2015 Hanson et al.
2015/0296347 A1 10/2015 Roth
2015/0334569 A1 11/2015 Rangarajan et al.
2015/0334676 A1 11/2015 Hart et al.
2016/0005003 A1 1/2016 Norris et al.
2016/0050526 A1 2/2016 Liu et al.
2016/0063537 A1 3/2016 Kumar Goel
2016/0078370 A1 3/2016 McEwen et al.
2016/0105644 A1 4/2016 Smith et al.
2016/0127351 A1 5/2016 Smith et al.
2016/0150370 A1 5/2016 Gillespie et al.
2016/0242010 A1 8/2016 Parulski et al.
2016/0283082 A1 9/2016 Roskind et al.
2016/0286361 A1 9/2016 Ciecko
2016/0300192 A1 10/2016 Zamer
2016/0316324 A1 10/2016 Sahadi et al.
2016/0323708 A1 11/2016 Sahadi et al.
2017/0010119 A1 1/2017 Bass et al.
2017/0011348 A1 1/2017 Ziskind et al.
2017/0161720 A1 6/2017 Xing et al.
2017/0162006 A1 6/2017 Sahadi et al.
2017/0169449 A1 6/2017 Heaven et al.
2017/0237820 A1 8/2017 Scarborough et al.
2017/0248438 A1 8/2017 Bass et al.
2017/0372270 A1 12/2017 Ziskind et al.
2018/0005194 A1 1/2018 Dotan-Cohen et al.
2018/0012195 A1 1/2018 Nagaraj
2018/0124559 A1 5/2018 Sahadi et al.
2018/0129984 A1 5/2018 Polk et al.
2018/0192248 A1 7/2018 Sahadi et al.
2019/0014438 A1 1/2019 Sahadi et al.
2020/0226523 A1* 7/2020 Xu ....................... G06V 40/103
2022/0092442 A1* 3/2022 Sefair Cristancho .. G06Q 10/04
2023/0162552 A1 5/2023 Bass et al.

FOREIGN PATENT DOCUMENTS

CN 101807264 A 8/2010
CN 102651214 A 8/2012
CN 102939619 A 2/2013
CN 103916641 A 7/2014
CN 104134226 A 11/2014
EP 1288627 A2 3/2003
EP 2650692 A1 10/2013
JP H06243229 A 9/1994
JP H10-049571 A 2/1998
JP H10340299 A 12/1998
JP H11272156 A 10/1999
JP 2000-500934 A 1/2000
JP 2001-101461 A 4/2001
JP 2003044618 A 2/2003
JP 2005309885 A 11/2005
JP 2007164291 A 6/2007
JP 2007212635 A 8/2007
JP 2008502971 A 1/2008
JP 2012-508413 A 4/2012
JP 2022041755 A 3/2022
KR 20070035040 A 3/2007
WO 99/40740 A2 8/1999
WO 2003034350 A2 4/2003

(56) References Cited

FOREIGN PATENT DOCUMENTS

| | | | | |
|---|---|---|---|---|
| WO | 2005124699 | A1 | 12/2005 | |
| WO | WO-2009103996 | A1 * | 8/2009 | ......... G06K 9/00778 |
| WO | 2011/115855 | A2 | 9/2011 | |
| WO | 2011141561 | A1 | 11/2011 | |
| WO | 2011/159811 | A2 | 12/2011 | |
| WO | 2013/163444 | A1 | 10/2013 | |
| WO | WO-2014113656 | A1 * | 7/2014 | ............ G06V 20/58 |
| WO | 2015/017442 | A2 | 2/2015 | |
| WO | 2015/130969 | A1 | 9/2015 | |
| WO | 2015/130971 | A1 | 9/2015 | |
| WO | 2016/172731 | A1 | 10/2016 | |
| WO | 2016/176506 | A1 | 11/2016 | |
| WO | 2016/179098 | A1 | 11/2016 | |
| WO | 2017/100801 | A1 | 6/2017 | |

OTHER PUBLICATIONS

Jul. 22, 2022 U.S. Notice of Allowance U.S. Appl. No. 15/141,780.
European Patent Application 15754659.9 EP Examination Report dated May 2, 2019.
European Patent Application 15754659.9 Extended European Search Report dated Sep. 29, 2017.
European Patent Application 15755106.0 Examination Report dated Dec. 17, 2019.
European Patent Application 16784110.5 Extended European Search Report dated Nov. 7, 2018.
European Patent Application 16787189.6 Extended European Search Report dated Oct. 26, 2018.
European Patent Application 16789894.9 Extended European Search Report dated Oct. 17, 2018.
Evolving Efficient Them Park Tours Testa et al. (Year: 1999).
Feng et al., Yue; "Effective venue image retrieval using robust feature extraction and model constrained matching for mobile robot localization", Machine Vision and Applications, DOI 10.1007 /s00138-011-0350-z, Oct. 28, 2010.
Journal of Computing and Info Tech-CIT 7, "Evolving Efficient Theme Parks" p. 79-80 (Year: 1999).
Krueger, Robert; Thom, Dennis; Ertl, Thomas; "Visual Analysis of Movement Behavior using Web Data for Context Enrichment" Institute for Visualization and Interactive Systems (VIS), Published in Pacific Visualization Symposium (PacificVis), 2014 IEEE, pp. 193-200.IEEE, 2014.
PCT Application No. PCT/US2004/12667, International Search Report dated Oct. 29, 2004.
PCT Application No. PCT/US2015/017827, International Preliminary Report on Patentability dated Aug. 30, 2016.
PCT Application No. PCT/US2015/017827, International Search Report and Written Opinion dated Jun. 11, 2015.
PCT Application No. PCT/US2015/017829, International Preliminary Report on Patentability dated Aug. 30, 2016.
PCT Application No. PCT/US2015/017829, International Search Report and Written Opinion dated Jun. 8, 2015.
PCT Application No. PCT/US2016/029260, International Preliminary Report on Patentability dated Oct. 24, 2017.
PCT Application No. PCT/US2016/029260, International Search Report and Written Opinion dated Jul. 27, 2016.
PCT Application No. PCT/US2016/029880, International Preliminary Report on Patentability dated Oct. 31, 2017.
PCT Application No. PCT/US2016/029880, International Search Report and Written Opinion dated Jul. 27, 2016.
PCT Application No. PCT/US2016/030424, International Preliminary Report on Patentability dated Nov. 7, 2017.
PCT Application No. PCT/US2016/030424, International Search Report and Written Opinion dated Jul. 29, 2016.
PCT Application No. PCT/US2016/067582, International Preliminary Report on Patentability dated Jun. 12, 2018.
PCT Application No. PCT/US2016/067582, International Search Report and Written Opinion dated Mar. 17, 2017.
Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
U.S. Appl. No. 14/632,872 Office Action mailed Mar. 7, 2016.
U.S. Appl. No. 14/632,884 Final Office Action mailed Dec. 1, 2017.
U.S. Appl. No. 14/632,884 Office Action mailed Apr. 2, 2018.
U.S. Appl. No. 14/632,884 Office Action mailed May 19, 2017.
U.S. Appl. No. 14/633,015 Final Office Action mailed Dec. 28, 2017.
U.S. Appl. No. 14/633,015 Office Action mailed Apr. 13, 2017.
U.S. Appl. No. 14/633,015 Office Action mailed Jun. 25, 2018.
U.S. Appl. No. 14/633,019 Final Office Action mailed Nov. 10, 2016.
U.S. Appl. No. 14/633,019 Office Action mailed May 6, 2016.
U.S. Appl. No. 15/138,157 Office Action mailed Mar. 9, 2017.
U.S. Appl. No. 15/144,359 Office Action mailed Apr. 5, 2017.
U.S. Appl. No. 15/271,087 Office Action mailed Jun. 7, 2017.
U.S. Appl. No. 15/383,710 Final Office Action mailed Jan. 30, 2018.
U.S. Appl. No. 15/383,710 Office Action mailed Aug. 16, 2017.
U.S. Appl. No. 15/597,609 Office Action mailed Jul. 10, 2017.
U.S. Appl. No. 15/683,620 Office Action mailed Feb. 22, 2018.
U.S. Appl. No. 15/805,014 Office Action mailed Apr. 5, 2018.
U.S. Appl. No. 15/906,285 Office Action mailed May 9, 2018.
Aug. 12, 2015—(WO) International Search Report—App No. PCT/GB2015/051607.
Doel et al. "Physically-based Sound Effects for Interactive Simulation and Animation", ACM SIGGRAPH 2001, pp. 537-544.
Funkhouser et al. "Real-Time Acoustic Modeling for Distributed Virtual Environments" ResearchGate, 2004, pp. 1-11.
May 27, 20157—(WO) International Searach Report and Written Opinion—App No. PCT/CN2015/073780.
O'Brien et al. "Synthesizing Sounds from Physically Based Motion" ACM, 2001, pp. 1-8.
O'Brien et al. "Synthesizing Sounds from Rigid-Body Simulations" ACM, 2002, pp. 1-7.
Patents Act 1977: Search Report under Section 17(5) issued in Application No. GB1409764.6 dated Nov. 26, 2014.
Foreign Action other than Search Report for EP App 1572809.6 dated Feb. 19, 2021 (11 pages).
Jerseykids, "What Happens When a Disney Ride Breaks Down" Apr. 20, 2013, XP055775681, retrieved from the Internet: URL: https://jerseykids.net/2013/04/20/what-happens-when-a-disney-ride-breaks-down/retrieved on May 19, 2021, 7 pages.
Niles "What's fair compensation for theme park guests who are evacuated from rides?" Theme Park Insider, Apr. 3, 2013, XP055775687, Retrieved from the Internet: URL https://www.themeparkinsider.com/flume/201304/3432/ retrieved on May 19, 2021, 4 pages.
Pawlowski "Queuing psychology: Can waiting in line be fun?" CNN, Nov. 20, 2008, XP055775674, Retrieved from the Internet: URL: http://edition.cnn.com/2008/TECH/science/11/20/queuing.psychology/retrieved May 19, 2021, 2 pages.
Chu, Liou, et al. "Simulation of Theme Park Queuing System by using Arena" Ninth International Converence on Intelligent Information Hiding and Multimedia Signal Processing, Oct. 16-18, 2013, 4 pages.
Passy, Charles "What You Get With VIP Status at Theme Parks" The Wall Street Journal, May 17, 2007, from URL: https://www.wsj.com/articles/SB117935310021005437 (4 pages).
English Summary of First Chinese (SIPO) Office Action, issued Sep. 29, 2018, in corresponding Chinese Patent Application No. 201580029155.0, 18 pages.
Oct. 1, 2018—U.S. Office Action—U.S. Appl. No. 15/141,780.
Apr. 16, 2019—U.S. Office Action—U.S. Appl. No. 15/141,780.
May 15, 2020—U.S. Office Action—U.S. Appl. No. 15/141,780.
Oct. 7, 2020—U.S. Office Action—U.S. Appl. No. 15/141,780.
Apr. 13, 2021—U.S. Office Action—U.S. Appl. No. 15/141,780.
Dec. 2, 2021—U.S. Office Action—U.S. Appl. No. 15/141,780.
Mar. 20, 2019—U.S. Office Action U.S. Appl. No. 15/315,712.
Sep. 19, 2019—U.S. Office Action—U.S. Appl. No. 15/315,712.
Jul. 21, 2020—U.S. Office Action—U.S. Appl. No. 15/315,712.
Jan. 21, 2021—U.S. Office Action—U.S. Appl. No. 15/315,712.

(56) References Cited

OTHER PUBLICATIONS

Jul. 6, 2021—U.S. Office Action—U.S. Appl. No. 15/315,712.
Mar. 21, 2021—U.S. Notice of Allowance—U.S. Appl. No. 15/315,712.
Oct. 22, 2020—U.S. Office Action—U.S. Appl. No. 16/518,614.
Apr. 12, 2021—U.S. Office Action—U.S. Appl. No. 16/518,614.
Jan. 13, 2022—U.S. Office Action—U.S. Appl. No. 16/518,614.
May 31, 2022—U.S. Office Action—U.S. Appl. No. 16/518,614.
Aug. 13, 2022—U.S. Notice of Allowance—U.S. Appl. No. 16/518,614.
Apr. 17, 2023—U.S. Notice of Allowance—U.S. Appl. No. 16/518,614.
Oct. 13, 2023—U.S. Notice of Allowance—U.S. Appl. No. 16/518,614.
Nov. 15, 2021—U.S. Restriction Requirement—U.S. Appl. No. 17/088,039.
Aug. 4, 2022—U.S. Office Action—U.S. Appl. No. 17/088,039.
Feb. 16, 2023—U.S. Office Action—U.S. Appl. No. 17/088,039.
Jun. 7, 2023—U.S. Notice of Allowance—U.S. Appl. No. 17/088,039.
Aug. 31, 2023—U.S. Notice of Allowance—U.S. Appl. No. 17/088,039.
Oct. 13, 2022—(UAE) Examination Report—App No. P6000333/2016.
Sep. 29, 2018—(CN) Examination Report—App No. 201580029155.0.
Feb. 19, 2021—(EP) Examination Report—App No. 15728092.6.
Nov. 26, 2014—(UK) Examination Report—App No. 1409764.6.
May 7, 2019—(JP) Examination Report—App No. 2016-571133.
Dec. 30, 2021—(KR) Notice of Allowance—App No. 10-2016-7036508.
Aug. 8, 2022—U.S. Notice of Allowance—U.S. Appl. No. 15/141,780.
Aug. 29, 2022—U.S. Notice of Allowance—U.S. Appl. No. 15/141,780.
Dec. 3, 2024—(EP) Search Report—App No. 24188457.6.
Vishwanath A. Sindagi et al. "A Survey of Recent Advances in CNN-based Single Image Crowd Counting and Density Estimation" Arxiv.org, Cornell University Library, 201 Olin Library Cornell University Ithaca, NY 14853, XP080774401, DOI: 10.1016/J.Patrec.2017.07.007, Jul. 5, 2017, 16 pages.
Apr. 24, 2025—U.S. Office Action—U.S. Appl. No. 17/984,402.
Apr. 10, 2026—U.S. Notice of Allowance—U.S. Appl. No. 17/984,402.

* cited by examiner

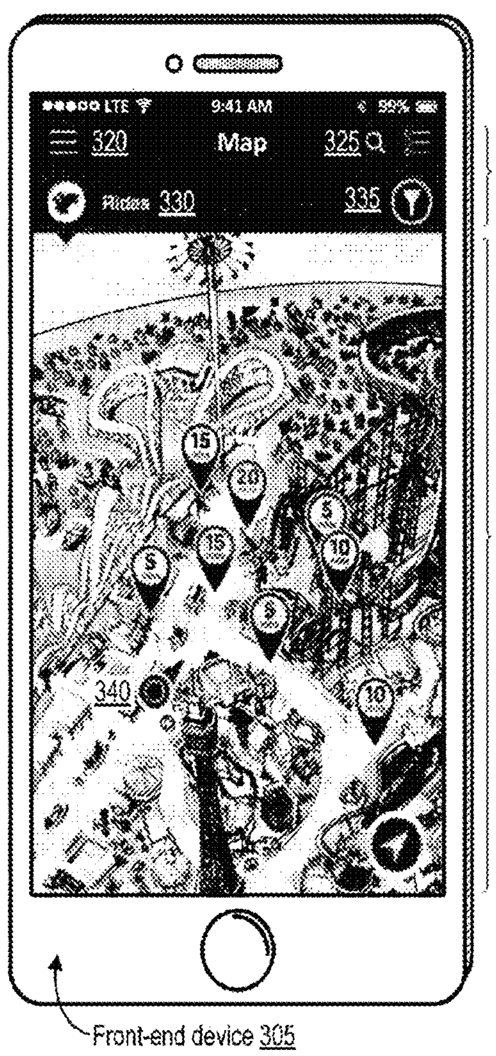
Fig. 8A
Fig. 8B
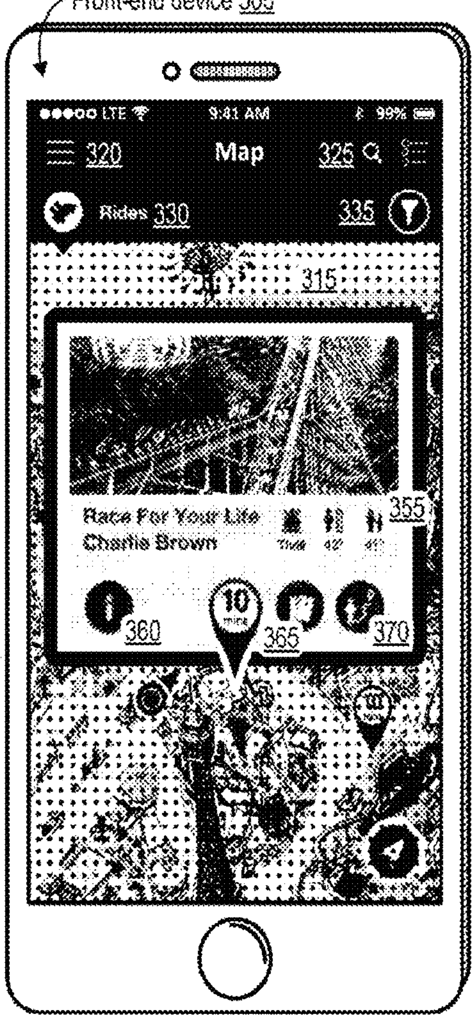

METHODS OF ESTIMATING A THROUGHPUT OF A RESOURCE, A LENGTH OF A QUEUE ASSOCIATED WITH THE RESOURCE AND/OR A WAIT TIME OF THE QUEUE

CROSS-REFERENCE TO RELATED APPLICATIONS

This application is a Continuation-In-Part application of U.S. patent application Ser. No. 17/984,402, filed Nov. 10, 2022 and entitled "Methods of estimating a throughput of a resource, a length of a queue associated with the resource and/or a wait time of the queue," which is a Continuation-In-Part application of:

U.S. patent application Ser. No. 15/141,780, filed Apr. 28, 2016 and entitled "INTELLIGENT PREDICTION OF QUEUE WAIT TIMES," which claims the priority benefit of U.S. provisional application No. 62/153,686 filed Apr. 28, 2015 and entitled "System and Method for Predicting Line Wait Times"; and U.S. patent application Ser. No. 17/088,039, filed Nov. 3, 2020 and entitled "QUEUING SYSTEM," which is a continuation of U.S. patent application Ser. No. U.S. Ser. No. 15/315,712, filed Dec. 1, 2016, which is a National Stage Application of PCT/GB2015/051607, filed Jun. 2, 2015 and entitled "QUEUING SYSTEM," which claims priority to GB 1409764.6, filed Jun. 2, 2014, all of which are incorporated by reference herein in their entirety.

TECHNICAL FIELD

One or more aspects described herein generally concern analytics pattern processing. More particularly, these aspects concern predicting resource throughput, queue lengths and queue wait times, based on multiple sources of data.

BACKGROUND

Entertainment and event venues such as theme parks, cruise ships, universities, arenas, concert venues, ski resorts, relaxation resorts, ice rinks, spas, skate parks, and stadiums typically have large numbers of visitors/guests. These venues typically have multiple "points of interest" that correspond to locations of attractions such as restaurants, cafeterias, concession stands, stores, libraries, theme park rides, theatre shows, movies, circus shows, animal shows, or costumes characters. Points of interest may also include locations of restrooms, water fountains, entrances, exits, or crossroads.

Due to the large numbers of guests in these various venues, those wishing to visit such points of interest will typically be required to stand in fairly long lines. The wait line for any given point of interest may have different numbers of guests on different days (e.g., weekends versus weekdays) and during different times of day (e.g., mornings versus afternoons). More guests in a line typically translates to a longer wait time unless guest throughput is increased by the entertainment venue. Means for increasing throughput might include operating additional cash registers or increasing overall guest capacity of a particular venue as might occur through making available an increased number of seats or moving furniture to increase floor space.

Some entertainment venues currently provide an estimated line wait time to guests. But this wait time is a rough estimate typically determined by venue staff periodically picking a single guest and tracking how long it takes that guest to traverse the line. Though somewhat helpful to new guests entering the line, line conditions may fluctuate during the wait time making the prediction inaccurate. This might occur with a rapid influx of new guests in a relatively short period of time. While staff may react by increasing guest throughput or guest capacity, such reaction is after-the-fact and occurs only once the problem is visibly identified.

Such manual wait time estimates are typically only provided for large "main" attractions due to the effort required. As a result, wait times for smaller attractions are often completely unknown to guests. Furthermore, there is no way to predict future wait times (i.e., what will the wait time be in one hour or next Tuesday or on a particular holiday) using manual methods such as these. Thus, there is a need in the art for determining wait times for points of interest in a venue.

Queuing systems are employed in various types of situation where multiple users wish to access the same resource or attraction at the same time or as early as possible, including restaurants, amusement park rides, museum or gallery exhibits, service counters or meetings and other similar activities. In such situations, a physical queue is often used. A ticket-based queuing system (a so-called 'deli-counter' ticket) is an improvement on this, but still groups all waiting users together.

Virtual queues offer benefits to attraction operators and users (also referred to as guests in the context of an amusement park, for instance), since time spent waiting in a physical queue is considered wasted and could be spent on other activities.

Where multiple attractions are being managed at the same time, the complexity and costs increase by an order of magnitude, especially when a virtual queuing system is set up for each attraction. Thus, management of guests or users for such queuing systems in a cost-efficient and operationally-efficient way remains a challenge

SUMMARY

Against this background, a method of estimating a length of a queue associated with a resource within a venue is provided. The method may comprise receiving, from one or more cameras present in the venue, one or more images of the queue. The method may further comprise estimating, by a server, a number of venue guests in the queue, based on the one or more images of the queue.

The queue may comprise one or more segments. Each of the one or more images may correspond to a segment of the queue. Estimating the number of venue guests in the queue may comprise one or more of:

- for each of a first subset of the one or more images, estimating a number of venue guests in the corresponding segment of the queue by estimating a number of pixels of the image that correspond to venue guests in the queue; and
- for each of a second subset of the one or more images, estimating a number of venue guests in the corresponding segment of the queue by detecting and counting individual venue guests visible in the image.

The method may further comprise sending, to one or more of a front-end device and mobile devices corresponding to venue guests, a notification comprising one or more of:

- the estimated number of venue guests in the queue;
- an estimated current wait time based on the estimated number of venue guests in the queue; and a time at which a venue guest joining the queue is permitted entry to the resource, based on the estimated number of venue guests in the queue.

A "mobile device", as defined in this application, may include mobile communications devices, such as mobile telephones. A "mobile device" may further include short-range devices, such as NFC or RFID devices. In one example, the mobile device may be an RFID wristband.

Estimating the number of venue guests in the queue based on the one or more images of the queue may comprise, for each of the one or more images, estimating a number of venue guests in the corresponding segment of the queue. Estimating the number of venue guests in the queue based on the one or more images of the queue may further comprise summing, for each of the one or more images, the estimated number of venue guests in the corresponding segment of the queue.

Each segment of the queue may have a corresponding capacity. Estimating the number of venue guests in the queue may comprise identifying a queue segment containing an end of the queue. Estimating the number of venue guests in the queue may further comprise summing the capacities of each of the segments that are ahead of the segment containing the end of the queue.

The segments of the queue may be in a defined order. In this context, a segment that is "ahead" of another segment may be further towards the front of the queue, where the entrance to the attraction is.

Estimating the number of venue guests in the queue may further comprise estimating a number of venue guests in the queue segment containing the end of the queue based on the image of the corresponding segment. Estimating the number of venue guests in the queue may further comprise summing the estimated number of venue guests in the queue segment containing the end of the queue, along with the capacities of each of the segments that are ahead of the segment containing the end of the queue.

Each segment of the queue may have a corresponding capacity. Estimating a number of venue guests in the queue may comprise identifying a queue segment containing an end of the queue. Estimating a number of venue guests in the queue may further comprise, for each of the one or more images corresponding to a segment that is ahead of the segment containing the end of the queue or corresponding to the segment containing the end of the queue, estimating a number of venue guests in the corresponding segment of the queue. Estimating a number of venue guests in the queue may further comprise summing, for each of the one or more images corresponding to a segment that is ahead of the segment containing the end of the queue or corresponding to the segment containing the end of the queue, the estimated number of venue guests in the corresponding segment of the queue.

Identifying a queue segment containing the end of the queue may comprise identifying a segment with a threshold number of people in it, directly ahead of a segment with no people in it, or number of people below a threshold level.

Identifying a queue segment containing the end of the queue may comprise performing a binary search. In other words, a segment midway through the queue sequence may be examined to determine whether there are users in that segment. If there are no users in that segment, the end of the queue may be determined to be ahead of that segment. Otherwise, if there are users in that segment, the end of the queue may be either in that segment or behind that segment in the queue structure. Then, a segment midway through the portion ahead of or behind the previously examined segment may be examined. In this way, the portion of the queue structure in which the end of the queue may be known to be may be approximately halved for each segment examined.

Identifying a queue segment containing the end of the queue may comprise performing a linear search, starting from a segment of the queue closest to the resource (comprising or adjacent to the exit from the queue/the entrance to the resource) or starting from a segment of the queue furthest from the resource (comprising or adjacent to the entrance to the queue).

Identifying a queue segment containing the end of the queue may comprise determining a segment of the queue that contained the end of the queue in a previous iteration, determining whether that segment currently contains the end of the queue. If it does, the end of the queue may be identified. If it does not, an adjacent queue segment may be inspected to determine whether the end of the queue is in that segment. Based on whether there are people in the segment of the queue that contained the end of the queue in a previous iteration, the immediately preceding or immediately subsequent adjacent segment may be inspected. If the segment of the queue that contained the end of the queue in a previous iteration is empty (or below a threshold), the method may comprise determining whether the immediately preceding adjacent segment (the adjacent segment closer to the resource) contains the end of the queue. Likewise, if the segment of the queue that contained the end of the queue in a previous iteration is full (or greater than a threshold), the method may comprise determining whether the immediately subsequent adjacent segment (the adjacent segment further from the resource and closer to the entrance) contains the end of the queue. If the end of the queue is not found, the search may proceed linearly by searching in the same direction until the end of the queue is found.

For each of the first subset of images, estimating the number of venue guests in the corresponding segment of the queue may further comprise applying a weighting to each pixel, wherein the weighting is based on one or more of:

a gradient mask applied to the image, wherein the gradient mask causes a lower weighting to be applied to pixels corresponding to areas that are closer to a corresponding camera and a higher weighting to pixels corresponding to areas that are further from the corresponding camera, to account for perspective effects in the image; and an estimated density of the queue at a location corresponding to the pixel.

The one or more segments may comprise a subset of segments for which corresponding images are not available (in other words, the segments are unobserved). The method may further comprise identifying a queue segment containing an end of the queue. The method may further comprise, for each queue segment that is ahead of the segment containing the end of the queue and for which a corresponding image is not available, estimating a number of venue guests in the corresponding segment of the queue by assuming the number of venue guests in the segment is equal to a corresponding capacity of the segment.

The one or more segments may comprise a subset of segments for which corresponding images are not available (in other words, the segments are unobserved). The method may further comprise, for each segment for which a corresponding image is not available:

estimating a number of venue guests in a segment immediately subsequent to the segment for which a corresponding image is not available, based on an image corresponding to the immediately subsequent segment; and if the estimated number of venue guests in the immediately subsequent segment is greater than a threshold number or is greater than a threshold percentage of a capacity of the immediately subsequent segment, estimating a number of venue guests in the corresponding segment of the queue by assuming the number of venue guests in the segment is equal to a corresponding capacity of the segment.

The method may further comprise displaying, by the server and via a map user interface of a front-end device, the estimated number of venue guests in the queue.

The method may further comprise sending, by the server, the estimated number of venue guests in the queue to one or more of a front-end device and mobile devices corresponding to venue guests.

The method may further comprise determining, by the server and based on the estimated number of venue guests in the queue, an estimated current wait time and sending the estimated current wait time to one or more of a front-end device and mobile devices corresponding to venue guests.

The method may further comprise determining, by the server and based on the estimated number of venue guests in the queue, a time at which a venue guest joining the queue is permitted entry to the resource and automatically sending, to a mobile device corresponding to the venue guest, a notification indicating when the venue guest is permitted entry to the resource.

The method may further comprise managing, by the server and based on the estimated number of venue guests in the queue, a virtual queue, wherein managing the virtual queue comprises automatically sending, to mobile devices corresponding to venue guests included in the virtual queue, notifications indicating when the corresponding venue guests are permitted entry to the resource.

The method may further comprise regulating, by the server, access to the resource by one or more venue guests by receiving, from a mobile device corresponding to a venue guest, a request to access the resource, adding the venue guest to a virtual queue associated with the resource, and managing the virtual queue by removing the venue guests from the virtual queue at a rate based on the estimated number of venue guests in the queue.

Advantageously, using images of the queue from cameras to estimate the number of venue guests in the queue may automatically provide an accurate estimate of the queue length. This may be used by park management software for various purposes, such as calculating wait time, estimating throughputs, and the like.

Estimating the number of venue guests standing in the queue may comprise, for at least some of the one or more images, comparing the one or more images with one or more reference images of a same location captured at a time when there are no venue guests in the queue.

Estimating the number of venue guests standing in the queue may comprise, for at least some of the one or more images, applying a mask to the one or more images so that areas of the one or more images that correspond to areas of the venue that do not form part of the queue may be excluded when estimating the number of venue guests.

Estimating the number of venue guests standing in the queue may comprise, for at least some of the one or more images, detecting heads of venue guests visible in the one or more images.

Detecting heads of venue guests visible in the one or more images may further comprise determining whether each of the venue guests is standing in the queue.

Detecting heads of venue guests may comprise using image processing techniques to recognise user heads in the queue. Image processing techniques may also be used to categorise the heads detected in the image to heads of users queueing for the resource and heads of users that are not queuing for the resource (e.g. because they are queuing for other resources, travelling between resources, resting on benches, and the like).

Previous methods may rely on the physical distance covered by the queue, assuming a uniform density of guests to estimate a number of guests in the queue. However, this method may be inaccurate because guests do not queue in a uniform density. The queueing density may be affected by weather, as users accumulate in sheltered parts of the queue during rain. Users may also spread out more in the queue in response to news events concerning infectious disease. Such changes in queue density may render previous techniques for estimating queue length inaccurate. The proposed method therefore aims to provide an improved estimate.

Preferably, estimating the number of venue guests standing in the queue comprises, for each image: estimating a number of pixels of the image that correspond to venue guests standing in the queue; and applying a weighting to each pixel, based on a gradient mask applied to the image, wherein the gradient mask causes a lower weighting to be applied to pixels corresponding to areas that are closer to a corresponding camera and a higher weighting to pixels corresponding to areas that are further from the corresponding camera, to account for perspective effects in the image.

A method of estimating a wait time of a queue associated with a resource within a venue is also provided. The method may comprise determining, by a server, a throughput of the resource. The method further comprises receiving, from one or more cameras present in the venue, one or more images of the queue. The method may further comprise estimating, by a server, a number of venue guests in the queue, based on the one or more images of the queue.

The queue may comprise one or more segments. Each of the one or more images corresponds to a segment of the queue. Estimating the number of venue guests in the queue may comprise one or more of:

for each of a first subset of the one or more images, estimating a number of venue guests in the corresponding segment of the queue by estimating a number of pixels of the image that correspond to venue guests in the queue; and for each of a second subset of the one or more images, estimating a number of venue guests in the corresponding segment of the queue by detecting and counting individual venue guests visible in the image.

The method further comprises estimating a current wait time of the queue, based on the number of venue guests in the queue and the throughput of the resource. The method may further comprise sending, to one or more of a front-end device and mobile devices corresponding to venue guests, a notification comprising one or more of:

the estimated current wait time; and a time at which a venue guest joining the queue is permitted entry to the resource, based on the estimated current wait time.

The method may further comprise displaying, by the server and via a map user interface of a front-end device, the estimated current wait time.

The method may further comprise sending, by the server, the estimated current wait time to one or more of a front-end device and mobile devices corresponding to venue guests.

The method may further comprise determining, by the server and based on the current wait time, a time at which a venue guest joining the queue is permitted entry to the resource and automatically sending, to a mobile device corresponding to the venue guest, a notification indicating when the venue guest is permitted entry to the resource.

The method may further comprise managing, by the server and based on the estimated current wait time, a virtual queue, wherein managing the virtual queue comprises automatically sending, to mobile devices corresponding to venue guests included in the virtual queue, notifications indicating when the corresponding venue guests are permitted entry to the resource.

The method may further comprise regulating, by the server, access to the resource by one or more venue guests by receiving, from a mobile device corresponding to a venue guest, a request to access the resource, adding the venue guest to a virtual queue associated with the resource, and managing the virtual queue by removing the venue guests from the virtual queue at a rate based on the estimated current wait time (of the physical queue) and/or the throughput of the resource.

The rate of removal from the virtual queue may be independent of the length and/or wait time of the virtual queue. Once users are removed from the virtual queue, they may be permitted to join the physical queue. In this way, the rate of removal of users from the virtual queue may be roughly equal to the rate at which users join the physical queue (with some fluctuations due to the time taken for users to travel physically to the entrance to the queue entrance). Therefore, the rate at which users are removed from the virtual queue may be used to control the length of the physical queue. By increasing the rate at which users are removed from the virtual queue so that the rate is above the throughput of the attraction, the length of the physical queue may be increased. By decreasing the rate at which users are removed from the virtual queue so that the rate is below the throughput of the attraction, the length of the physical queue may be decreased. These effects may be used to maintain a length of the physical queue (or a wait time of the physical queue) at a desired value. Therefore, the rate of removal of guests from the virtual queue may depend on the length and/or wait time of the physical queue and the throughput of the resource.

In the above example, there may be one virtual queue feeding into one physical queue. However, in other examples, there may be multiple parallel queues. For example, a normal virtual queue and a priority virtual queue may both feed into a physical queue. In another example, a normal physical queue and a priority physical queue may run in parallel (e.g. feeding into different entry points of the resource, such as different sides of a train). In another example, there may be a different queue for a different element of the resource, such as a front car of a train or rollercoaster. In another example, a normal physical queue may be accessed by any venue guest, which may run in parallel with a physical buffer queue, which may only be accessed via a virtual queue in series with the physical buffer queue.

Estimating a throughput of the resource preferably comprises forecasting the future throughput over a predetermined period. This future throughput may be useful for calculating current queue wait times. In other words, if a user joins the queue now, the time it will take for them to reach the front is dependent on the future throughput for the entire time they are in the queue. For example, if a coarse estimate indicates that it will take approximately one hour for a user to reach the front of a queue after joining, it may be useful to forecast the throughput of the resource over the next one or two hours, to provide a more accurate estimate of the wait time of the queue.

Alternatively, "estimating" a throughput of the resource may comprise estimating a current throughput of the resource. The estimated current throughput may be an improved estimate (e.g. more accurate), compared to the operating throughput determined via other means.

A coarse estimate may be based on a measured length of the queue and/or on historical measurements of wait times (but not accounting for the event schedule data).

Moreover, as well as estimating current wait times, future throughputs may also be useful to estimate future wait times. These future wait times may be communicated to users so that they may plan to join the queue at a time when demand is lower. This may result in users spending less time standing in line and therefore more efficiently utilising the resources in the venue.

The method may further comprise forecasting a demand of the resource (in other words, predicting a rate at which users will join the queue). Forecasting a demand of the resource may comprise training a model with historical data.

Where the wait time and/or forecasted wait time is communicated to the users, the estimated demand of the resource may depend on the forecasted wait time (because users may be unwilling to wait long periods or may select an alternative resource with a shorter wait time). Therefore, a feedback loop may be set up, which may be accounted for when estimating wait times.

The method may further comprise controlling access to the resource such that a venue guest presenting an identifier is allowed to access the resource only after being removed from the front of the virtual queue, no other access to the resource being permitted.

An identifier may comprise one or more of a mobile device, a RFID device (such as a wristband), a NFC device, a printed ticket, a biometric identifier (such as a fingerprint or facial identifier), and the like.

The method may further comprise detecting, by a scanner at an entrance to the queue, the identifier presented by the venue guest; and automatically controlling an access barrier permitting access to the queue or preventing access to the queue.

The method may further comprise: measuring, by the server, a direct wait time of at least one venue guest in the queue, by: receiving, from the one or more cameras, a plurality of timestamped images of the queue and performing identity recognition (e.g., by facial recognition) on the timestamped images (in order to identify a venue guest); or receiving, from one or more beacons present in the venue, one or more timestamps tracking one or more mobile devices (e.g., a mobile phone, RFID tag and the like, as described elsewhere), corresponding to the venue guests, in proximity to the one or more beacons, wherein the current wait time of the queue may be further based on historic data comprising the measured direct wait time.

Where "identity recognition" is performed, this may comprise consistently identifying a guest so that they may be tracked between images. It might not be necessary to determine an actual identity (e.g., name/address) of the venue guest. In some examples, facial recognition is performed to track the progress of a venue guest through the queue. In other examples, a venue guest may be identified by other characteristics (e.g., a red jumper).

Determining a throughput of the resource may comprise determining, by the server, an operating throughput of the resource; receiving, by the server, event schedule data identifying a plurality of scheduled times corresponding to a plurality of events occurring at one or more of the resource and nearby points of interest, wherein the events may cause a throughput of the resource to deviate from the operating throughput of the resource; and estimating, by the server, the throughput of the resource based on the operating throughput, and the event schedule data.

The method may further comprise: tracking, by the server and via a satellite navigation system, locations of the one or more mobile devices, corresponding to the venue guests; identifying, by the server, one or more trends in the locations of the mobile devices, based on the event schedule data; inputting, into a machine learning model, one or more of: the estimated current wait time, the measured direct wait time, the tracked locations of the plurality of mobile devices, the event schedule data, and the historic data; and wherein estimating the current wait time of the queue, may comprise generating, by the machine learning model, an estimated wait time.

The method may further comprise: displaying, by the server and via a map user interface of a front-end device, the estimated current wait time.

The method may further comprise regulating access to the resource by the plurality of venue guests by:

- receiving, from a mobile device corresponding to a venue guest, a request to access the resource;
- adding the venue guest to a virtual queue associated with the resource; and
- managing the virtual queue by removing venue guests from the virtual queue at a rate, based on the estimated throughput of the resource and/or the length of the queue.

A server configured to perform a method as described above is also provided.

Computer software is also provided. The computer software may comprise instructions that, when executed by a processor of a computing system, may cause the computing system to perform a method as described above.

Setting Out Some Further Non-Limiting Examples

In a first further example, a method of estimating a throughput of a resource within a venue may comprise: determining, by the server, an operating throughput of the resource; receiving, by the server, event schedule data identifying a plurality of scheduled times corresponding to a plurality of events occurring at the resource and/or nearby points of interest, wherein the events may cause the throughput of the resource to deviate from the operating throughput of the resource; and estimating, by the server, a throughput of the resource based on the operating throughput, and the event schedule data.

The method may further comprise one or more of: displaying, by the server and via a map user interface of a front-end device, the estimated throughput; sending, by the server, the estimated throughput to one or more of a front-end device and mobile devices corresponding to venue guests; determining, by the server and based on the estimated throughput, an estimated current wait time and sending the estimated current wait time to one or more of a front-end device and mobile devices corresponding to venue guests; determining, by the server and based on the estimated throughput, a time at which a venue guest joining the queue is permitted entry to the resource and automatically sending, to a mobile device corresponding to the venue guest, a notification indicating when the venue guest is permitted entry to the resource; managing, by the server and based on the estimated throughput, a virtual queue, wherein managing the virtual queue may comprise automatically sending, to mobile devices corresponding to venue guests included in the virtual queue, notifications indicating when the corresponding venue guests are permitted entry to the resource; and regulating, by the server, access to the resource by one or more venue guests by receiving, from a mobile device corresponding to a venue guest, a request to access the resource, adding the venue guest to a virtual queue associated with the resource, and managing the virtual queue by removing the venue guests from the virtual queue at a rate based on the estimated throughput of the resource.

Advantageously, the proposed method may provide a more accurate and reliable method of estimating the throughput of the resource, because a schedule of events that affect throughput may be used to predict changes to the operating throughput. This is in contrast to prior art methods, which assume constant throughput and then react to changes only after they have directly affected the throughput.

Preferably, determining the operating throughput may comprise one or more of: measuring a current throughput of the resource; determining an average throughput of the resource; receiving a theoretical maximum throughput of the resource; and using a model trained with historical throughput data.

There are different possible methods for determining the operating throughput. In one method, start with the operational maximum throughput and then account for inefficiencies (both historical and predicted) that cause deviations (shortfalls) of the throughput from the theoretical maximum. For example, if a resource has loading inefficiencies that reduce the throughput by 5% and also tends to operate with 10% empty seats on average (e.g. because users prefer to sit with other users in their group), the operating throughput of the resource may be around 85.5% of the theoretical maximum (0.95×0.9).

In an alternative method, the operating throughput may be measured directly (e.g. by sensors at the entrance to the resource). The current measured throughput may be the instantaneous throughput (where the throughput varies fairly smoothly) or may be a rolling average of the instantaneous throughput over a predetermined period, to smooth out short-term fluctuations in the instantaneous throughput (e.g. due to loading/unloading times).

Preferably, the event schedule data (or the one or more scheduled events) may include one or more of: cleaning or maintenance of the resource; a change in a capacity of the resource; a change in duration of a guest interaction with the resource; a change in staffing levels for the resource; and a start time or end time of a show scheduled at the resource.

For example, a change in the capacity of the resource may result from: increasing/decreasing the number of trains/carriages/cars/boats running on a ride, changing a number of seats available (e.g. by adding/removing tables), and/or changing the available space (e.g. by opening/closing an area).

The duration of a guest interaction with the resource may be a performance, show or ride running time, for example.

A change in staffing levels for the resource may be a result of adding another server to process a queue, for example.

The throughput of an attraction may vary considerably if events that are of interest to the guests occur at prearranged times. For example, guests may enter an attraction in large numbers the run up to a start time of a show and leave after the end time. These times may therefore have a big impact on the throughput of the resource. For example, where guests do not enter/exit during a performance, the throughput may be very high for short periods (during changeover) and then low for long periods (when the performance is ongoing). In other examples, guests may enter and exit the attraction during the show and there may be a more even throughput of users.

Preferably, estimating the throughput of the resource based on the operating throughput and the event schedule data may comprise: extrapolating the operating throughput and adjusting the extrapolated throughput based on the event schedule data.

Extrapolating the operating throughput may comprise assuming the current operating throughput remains constant or that the current trend in the operating throughput will continue. Adjusting the extrapolated throughput based on the event schedule data may comprise increasing or decreasing the operating throughput by a certain number or proportion when a capacity, duration or staffing level is changed, or by pausing the throughput for cleaning/maintenance.

Preferably, estimating the throughput of the resource based on the operating throughput and the event schedule data comprises: training a throughput model with historic throughput data and estimating the throughput using the throughput model.

Historic throughput data may comprise data from previous days. The data may further comprise other parameters for those days that may be correlated with the throughput, such as the time since the resource was last serviced, a capacity/duration of the resource at the time, total guest numbers in the venue, ambient temperature, rainfall, throughput (and queue length) of other resources in the venue, and the like.

Preferably, the throughput model may be a machine learning model, wherein training the throughput model with the historic throughput data comprises training the throughput model with timestamped throughput data and concurrent data comprising the event schedule data.

The concurrent data may influence or be influenced by the throughput, such that correlations between the concurrent data and the throughput may be drawn. As described above, event data may have an impact on the throughput and therefore the concurrent data comprises the event data. Other examples of concurrent data may include: weather data (such as temperature, humidity, wind and/or rainfall); total number of guests in the venue or a sub-area of the venue; queue length (guests may behave differently depending on how long they have been queuing, which may affect throughput); the time since the resource was last serviced; a capacity of the resource; a frequency of a performance at the resource; and/or a duration of the performance.

Preferably, the concurrent data may further comprise resource state data and/or venue state data.

Resource state data may comprise resource capacity (number of trains running), staffing levels, time since last maintenance, and the like.

Venue state data may comprise total number of people in the park, ambient temperature, day of the week, and the like.

Preferably, the method may further comprise: accessing a calendar data store and retrieving one or more scheduled events, which are scheduled in the calendar data store.

By storing the calendar of scheduled events in a centrally accessible data store, park management activities may be performed in response to the state of the resources in the venue. For example, if demand for certain resources is greater than predicted, staff may be redistributed, if a ride breaks down unexpectedly, maintenance may be brought forward and maintenance for other resources may be rescheduled.

Preferably, the method further comprises: obtaining, from one or more sensors, one or more resource operating parameters; and updating the one or more scheduled events in the calendar data store, based on the one or more resource operating parameters.

The sensors may comprise video cameras or beacons used to monitor queue length and/or rate at which users join the queue. Cameras may also be used to monitor whether there are empty seats when the resource is running (resource utilisation efficiency). Sensors may also monitor time taken for resource changeovers, resource running speed, temperature, vibrations, and other operational parameters.

Preferably, the one or more resource operating parameters comprise one or more of: a number of users in a physical buffer queue associated with the resource; and a number of unoccupied seats on the resource.

The number of users in the queue may be determined by a method described in more detail below.

Preferably, updating the one or more scheduled events in the calendar data store based on the resource operating parameters may comprise: creating a new scheduled event in the calendar data store; or updating a time at which an existing scheduled event in the calendar data store is scheduled to occur.

Updating a scheduled event time may comprise moving the event forwards or backwards in time in order to: influence demand for the resource, and/or affect the throughput of the resource.

Demand may be influenced by changing show times at nearby attractions, for example. The throughput of the resource may be affected by rescheduling cleaning or maintenance (e.g. to occur at a time of when there is decreased demand for the resource).

A second further example may involve a method for queue wait time estimation, and includes receiving mobile device location data associated with a plurality of guest mobile devices corresponding to a plurality of venue guests within a venue. The method may also include receiving event schedule data corresponding to schedules associated with a plurality of points of interest located within the venue. The method may also include generating an estimated wait time based at least on the received mobile device location data and the received event schedule data, the estimated wait time corresponding to a first point of interest of the plurality of points of interest. The method may also include transmitting a wait time dataset identifying the estimated wait time to a front-end device, thereby displaying the estimated wait time via the front-end device.

The first point of interest may be one of an amusement park ride, a restaurant, a cafeteria, a restroom, a concession stand, a store, a library, a theme park ride, a theatre stage, a movie theater, a circus stage, an animal display showing, or some combination thereof.

The estimated wait time may be a prediction of a time that a guest would currently wait before entering the first point of interest.

The estimated wait time may be a prediction of a time that a guest would wait at a predetermined future time before entering the first point of interest.

The method may further comprise receiving network traffic data. Generating the estimated wait time may be further based on the received network traffic data.

The method may further comprise receiving entitlement redemption data. Generating the estimated wait time may be further based on the received entitlement redemption data.

The method may further comprise receiving weather data. Generating the estimated wait time may be further based on the received weather data.

The method may further comprise generating a plurality of additional estimated wait times at predetermined intervals from each other.

The method may further comprise generating a graph charting the estimated wait time and the plurality of additional estimated wait times.

The front-end device may be a guest mobile device corresponding to a venue guest.

The front-end device may be a staff device corresponding to a venue staff member.

The method may further comprise generating a map user interface that identifies the estimated wait time at a location on a map corresponding to a location of the first point of interest.

The map may be distorted so that a first region is drawn at a first scale and a second region is drawn at a second scale.

The map may include a third region between the first region and the second region, the third region having a gradient scale between the first scale and the second scale.

The method may further comprise generating a list user interface that identifies the estimated wait time next to a name corresponding to the first point of interest. The name may be one of a plurality of names within a list of the list user interface.

Generating an estimated wait time may be performed using at least one of a Bayesian algorithm, a nearest-neighbor algorithm, an alternating squares algorithm, a neural network, or some combination thereof.

A third further example concerns a system for queue wait time estimation that includes a communication transceiver receiving mobile device location data and event schedule data. The mobile device location data may be associated with a plurality of guest mobile devices corresponding to a plurality of venue guests within a venue. The event schedule data may correspond to schedules associated with a plurality of points of interest located within the venue. The system may also include a memory. The system may also include a processor coupled to the memory and to the communication transceiver. Execution of instructions stored in the memory by the processor may perform system operations. The system operations may include generating an estimated wait time based at least on the received mobile device location data and the received event schedule data, the estimated wait time corresponding to a first point of interest of the plurality of points of interest. The system operations may also include triggering transmission of a wait time dataset to a front-end device via the communication transceiver, the wait time dataset identifying the estimated wait time, thereby displaying the estimated wait time via the front-end device.

The communication transceiver may further receive network traffic data. Generating the estimated wait time may be further based on the received network traffic data.

The communication transceiver may further receive entitlement redemption data. Generating the estimated wait time may be further based on the received entitlement redemption data.

A fourth further example may concern a non-transitory computer-readable storage medium having embodied thereon a program executable by a processor to perform a method for queue wait time estimation. The executable method may include receiving mobile device location data associated with a plurality of guest mobile devices corresponding to a plurality of venue guests within a venue. The executable method may also include receiving event schedule data corresponding to schedules associated with a plurality of points of interest located within the venue. The executable method may also include generating an estimated wait time based at least on the received mobile device location data and the received event schedule data, the estimated wait time corresponding to a first point of interest of the plurality of points of interest. The executable method may also include transmitting a wait time dataset identifying the estimated wait time to a front-end device, thereby displaying the estimated wait time via the front-end device.

In a fifth further example, there may be provided a queuing system for controlling access by a plurality of users to one or more attractions (that is, one attraction or a plurality of attractions). The plurality of users may have a plurality of access keys and each access key is associated with at least one user from the plurality of users. The queuing system may comprise: an electronic queue management part, configured to manage at least one virtual queue in respect of the one or more attractions, the electronic queue management part being further configured to receive electronic requests for attraction access, each request relating to a respective access key and being for the at least one user associated with the access key to access an attraction from the one or more attractions, receipt of each request causing the respective at least one user to be added to the at least one virtual queue and wherein the electronic queue management part is further configured to determine a time at which the respective at least one user in respect of each request reaches a front of the at least one virtual queue and may access an attraction from the one or more attractions on presentation of the respective access key; and an access control part, in communication with the electronic queue management part and arranged to control access to the attraction such that only a user presenting an access key at the determined time for accessing the (or each) attraction is allowed to access the (respective) attraction. In particular, no other normal access to the (respective) attraction may be permitted (although access for other types of users, such as disabled users may additionally be provided). Thus, each of the at least one virtual queue may be associated with a respective attraction. Then, the at least one user to which the request relates may be allocated to a virtual queue associated with the attraction to which the request relates (there may be one or multiple virtual queues for each attraction).

This provides a complete (100%) virtual queuing system, such that no user (referred to as a guest) queues in a physical line that operates in parallel (as opposed to series) with the one or more virtual queues. This provides a large number of improved opportunities for management of the virtual queue or queues. Although as mentioned above, there may be exceptional cases (such as a disabled user) that may be able to bypass the complete virtual queue, it may be possible to accommodate even such cases in the virtual queue. For example, disabled users may be managed through the system to avoid discrimination. This may further ensure that they avoid having to wait in line for long periods.

The electronic queue management part may be optionally further configured to select one or more users from those allocated to a first virtual queue of the one or more virtual queues. The selected one or more users may each have a respective current position or wait time in the first virtual queue. Then, the electronic queue management part may be further configured to reallocate the selected one or more users to a reallocated position or wait time within the first virtual queue or within a second virtual queue from the one or more virtual queues.

In some examples, the reallocated position or wait time may be either: (a) within the first virtual queue and more advanced than the current position or wait time (that is a position closer to the front and/or a shorter wait time); or (b) within a second virtual queue from the one or more virtual queues and the same or more advanced than the current position or wait time (that is a position the same distance or closer to the front and/or the same or a shorter wait time). This may allow users to be reallocated efficiently and fairly in an electronic queuing system. Optionally, the reallocated position or wait time may be less advanced (that is a position further from the front and/or a longer wait time compared with the current position or wait time) within either the first or second virtual queues. By selecting users (particularly only some of the users, as indicated below), the electronic system may be able to redistribute users to cope with unexpected events (such as a reduction in throughput or closure of an attraction) or to improve efficiency in respect of other attractions (for example, where their virtual queues do not provide sufficient users to maintain capacity). Typically, advancing the user within the queue or transferring the user to another queue either in the same or a more advanced position may be to their benefit, as it may result in shorter wait time overall until an attraction may be accessed (for instance if the attraction associated with the first virtual queue closes or suffers some throughput rate reduction). In some cases, pushing a user back in a virtual queue may be to their benefit. For example, the user may realise that they cannot make the time slot window they have been allocated and they may therefore obtain a time later than their current one. A small time slot window may help the system accuracy and may allow a user to push back and/or let the system know that they will be late.

The electronic queue management part may be optionally further configured to keep a respective current position or wait time the same for each of the users allocated to the first virtual queue that are not the selected one or more users, when the selected one or more users are reallocated to the reallocated position or wait time. Additionally or alternatively, the electronic queue management part may be further configured to keep a respective current position or wait time the same for each of the users allocated to the second virtual queue that are not the selected one or more users, when the selected one or more users are reallocated to the reallocated position or wait time (particularly in the second virtual queue). In other words, only the selected user or users may be reallocated and the positions or wait times of other users may remain unaffected.

In some examples, the electronic queue management part may be configured to select the one or more users by receiving a request from the one or more users. Then, the electronic queue management part may be further configured to reallocate the selected one or more users in response to receipt of the request. Additionally or alternatively, the electronic queue management part may be configured to offer reallocation to at least one user allocated to the first virtual queue. Then, the selected one or more users may comprise one, some or all of the at least one user offered reallocation. In that case, the electronic queue management part may be further configured to receive a request from one or more users in response to the one or more users being offered reallocation. Then, the selected one or more users may comprise one, some or all of the one or more users from whom a request is received. Thus, the electronic queue management part may be further configured to reallocate the selected one or more users in response to receipt of the request.

In some examples, the selected one or more users comprise a user who has (or users who have) previously been reallocated to the first virtual queue from another virtual queue. Such users may, for example, be offered the opportunity to move forward (advance) and/or be moved forward (advanced) in the first virtual queue, when they have previously been reallocated to the first virtual queue from another virtual queue, for example a virtual queue for which the associated attraction suffered a problem, such as a reduced throughput or closure.

Optionally, the electronic queue management part may be configured to manage at least one virtual queue in respect to each of a plurality of attractions. Thus, each attraction may have one virtual queue or a plurality of virtual queues associated with it. For example, an attraction may have a primary virtual queue that might be considered a normal (stand-by) virtual queue and a secondary virtual queue that might be deemed a priority virtual queue. One advantage of this approach is that the merge point of the two queues may itself be virtual. Hence, a first guest A who is in the primary virtual queue presents themselves or their group at the front at the same time as a second guest B who is in the secondary virtual queue. Neither will have any idea how long the other has waited and only one access point to the attraction is needed. This will be discussed further below. In some examples, the electronic queue management part is configured to manage a first virtual queue in respect of a first attraction from the one or more attractions and to manage a second virtual queue in respect of a second, different attraction from the one or more attractions. Alternatively, the second virtual queue may be associated with the first attraction.

Optionally, each of the plurality of access keys may comprise one or more of: a portable communications device (for example a mobile telephone, smartphone, watch device, tablet device or similar wireless communications device); a RFID device; a paper ticket; and a biometric feature. The use of an electronic access key may have advantages. For example, the electronic queue management part may be configured to receive the electronic requests through a wireless interface from an access key. In addition or alternatively, the electronic queue management part may be configured to receive the electronic requests from a system or device that is separate to the access key (for example, a booking kiosk), but which may be able to interface with the access key to allow identification of the at least one user associated with the access key.

Access to the attraction is allowed at a time set by the queuing system. This time may be a time range. For example, the determined time may comprise one or both of: an earliest time at which the at least one user may access the attraction; and a latest time at which the at least one user may access the attraction.

Optionally, the access control part may comprise an access barrier for each of the one or more attractions. The access barrier may be configured to allow access by one or more users to the attraction on presentation of an access key associated with the one or more users at the determined time. For example, the access barrier may comprise a sensor configured to detect the access key (for example, by means of a wireless or RFID link, by means of a barcode, QR code or other coding on paper or electronic format or by biometric recognition). In some examples, the access barrier may define a physical buffer queue (for instance, the entry point of the physical buffer queue, which then extends to the attraction). The physical buffer queue may allow access to the attraction for all users that have passed through the access barrier. Multiple physical buffer queues per attraction may be provided. It should be noted that the physical buffer queue may be in series (not parallel) with the at least one virtual queue managed by the electronic queue management part. Entry to a physical buffer queue may be allowed only after reaching a front of the at least one virtual queue.

A change in the rate of throughput of an attraction (the throughput rate change), for example, closure (which may be unexpected) or throughput delay of an attraction may cause the at least one virtual queue and/or any physical buffer queue to become long and may result in a poor experience for users. Optionally, the electronic queue management part may be further configured to detect a closure (typically unexpected) or throughput delay of an attraction (for example, by the provision of external information or by a sensor) and to allocate a user either in the at least one virtual queue or in the physical buffer queue (which may also be deemed part of a virtual queue) for the attraction to another attraction. As discussed above, this may be done by request of the user (by means of the respective access key, for instance) or automatically without request, for instance based on other criteria such as current time, time waited or a probability of reopening or increased throughput of the ride. Additionally or alternatively, the replacement attraction may be specified by the system or selected by the user from a plurality of attractions offered by the system. Optionally, the electronic queue management part may be further configured to allocate the user in the at least one virtual queue or physical buffer queue for the attraction to another attraction with a priority setting. The advantage of a priority setting is discussed below.

Registration of the access key may allow the electronic queue management part to associate it with one or more users. In some examples, the queuing system may further comprise an access key registration part, configured to record an association between each access key and the respective at least one users associated with the access key. The access key registration part may be in communication with the electronic queue management part for communication of information about an access key in respect of which a request has been received.

Different types of virtual queue may be managed by the queuing system. For example, the electronic queue management part may be optionally configured to manage each of the at least one virtual queue according to a predetermined wait time (variable throughput) or a predetermined throughput (variable wait time). The predetermined wait time or a predetermined throughput may be fixed or variable. In some examples, the electronic queue management part may be configured to manage a virtual queue from the at least one virtual queue in the form of a queue sequence. However, alternatives to a queue sequence may be possible. For instance, the virtual queue may be a statistical spread of users based on their request time and the attraction throughput, such as the system described in U.S. Pat. No. 8,606,605.

The electronic queue management part may be configured to reallocate the user within the at least one virtual queue to another attraction in response to receipt of a request to switch. For example, the electronic queue management part may be configured to reallocate the user within the at least one virtual queue to another attraction such that the reallocated position or wait time of the user remains the same. Thus, reallocation may cause no additional wait time for the user or users until they are able to access an attraction.

Optionally, the electronic queue management part may be configured to manage the at least one virtual queue by predicting removal of or removing a number of users from a front of the queue according to a set rate (for example, a number of users per unit of time, such as a minute). This may be a predicted removal in the sense that an estimated wait time or attraction access time for one or more users may be based on the rate of predicted removal, although the actual rate of removal may depend on the rate at which users access the attraction or enter a physical buffer queue preceding the attraction access. The electronic queue management part may be further configured to identify a throughput parameter of the attraction associated with the at least one virtual queue and to adjust each virtual queue, especially the first virtual queue, in accordance with the determined throughput parameter. The identified throughput parameter of the attraction associated with the virtual queue may comprise one of more of: a throughput rate of the attraction associated with the virtual queue; a change in throughput rate of the attraction associated with the virtual queue; a rate of change in the throughput rate of the attraction associated with the virtual queue. In particular, the electronic queue management part may be configured to manage a virtual queue (such as the first virtual queue) by predicting removal of or removing a number of users from the front of the virtual queue according to a set rate and to adjust the set rate based on the determined throughput parameter of the attraction associated with the virtual queue. The electronic queue management part may be configured to determine the time for the at least one user to access the attraction in response to the removal of the at least one user from the at least one virtual queue, for example if the users are removed from the front of the queue according to a set rate.

The electronic queue management part is beneficially configured to identify a decrease in the throughput rate of the attraction associated with a virtual queue, such as the first virtual queue. It may then be configured to inform the at least one user in the virtual queue in response to the identification. Informing the at least one user in the virtual queue if the throughput rate change is a decrease in the throughput rate may comprise offering to reallocate the at least one user to the second attraction. Such an offer may be an invitation for reallocation, as discussed above.

The rate of removal or predicted rate of removal from the front of the at least one virtual queue may be set according to different criteria. For example, the rate may be set on the basis of a number of users associated with a single access key in the virtual queue. This may allow multiple users associated with a single access key to access the attraction at the same time. The increase or decrease in predicted or actual removal rate may be offset by a corresponding decrease or increase in removal rate at a later time. Additionally or alternatively, the rate may be set on the basis of proportion (which may be 100% or less) of an attraction throughput or capacity. Optionally, the proportion may be less than 100% or no more than 95%, 90%, 80% or 75%. Reducing the proportion to less than 100% may mitigate any problems due to the actual throughput of the attraction varying. The proportion may be optionally set on the basis of a reliability performance for the attraction. The reliability performance may be based on one or more of: a variability of throughput for the attraction; a rate of unexpected closure for the attraction; a rate of unexpected closure for one or a more other attractions.

In another option (which may be combined with others), the rate (predicted or actual) is set on the basis of a length of the physical buffer queue. In addition or alternatively, the rate may be set on the basis of a rate of change for the physical buffer queue length. Optionally, the length of the physical buffer queue may be used to determine whether one or more users are moved around in the at least one virtual queue, for example offered immediate access to the attraction or physical buffer queue if the physical buffer queue is too short or their reservation may be delayed in time if the physical buffer queue is too long.

In some examples, the queuing system further comprises a sensor, configured to measure or estimate throughput for the attraction over time, the rate being set based on the measured or estimated throughput. The throughput may be defined (and therefore measured or estimated) in a variety of ways, for example, in terms of: a number of users accessing the attraction per time interval; and/or the time taken by a user to advance a set length in a virtual queue and/or a physical buffer queue.

Optionally, the electronic queue management part is further configured to indicate to the user (optionally, via the access key) an estimated time to reach (or a time at which the user will reach) the front of the at least one virtual queue (such as the first virtual queue). The electronic queue management may be configured to indicate the estimated time to the at least one user via the access key associated with the at least one user.

The estimated time may be based on the set rate of predicted or actual removal. Beneficially, the electronic queue management part may be further configured to update the estimated time at each of a plurality of times (for example, at regular intervals and/or based on another event, such as removal of users from the virtual queue) and to indicate the updated estimated time to the user.

This indication may be useful to the user generally, but it may also allow further interaction between the user and the queuing system. For example, the electronic queue management part may be further configured to receive a reject instruction from the user (such as from the access key) in response to the indication of the updated estimated time (especially if the estimated time for at least one user associated with an access key is updated to an earlier time from a later time and/or if the estimated wait time for the at least one user is updated to a shorter time from a longer previous time). Then, the electronic queue management part may be further configured to cause the estimated time to change back to the later time in response to the reject instruction. The reject instruction may be sent by the at least one user via the associated access key. A user or users selected for reallocation may comprise one, some or all of the user or users from which a reject instruction is not received. Alternatively, one or more users may provide an approve instruction (via their access key) and the electronic queue management part may be configured to receive this. Then, a user or users selected for reallocation may comprise one, some or all of the user or users from which an approve instruction is received.

In some cases, the reliability of the attraction may be greater than expected. The actual throughput for the attraction may be greater than the set rate of predicted or actual removal from the front of a virtual queue (or the sum of the rates for multiple virtual queues) associated with the attraction. In this case, a request may be made to one or more selected users as to whether they wish to bring their time forward (they may decline if, for example, they are already busy, such as having lunch or another ride). Alternatively, they may be pushed back, but given the opportunity to transfer to a different attraction rather than having to wait longer.

As noted above, closure or delays on the attraction may cause problems. Optionally, the electronic queue management part may be further configured to detect a closure (planned or unexpected) or throughput delay of an attraction and to adjust the at least one virtual queue in respect of the attraction accordingly. The electronic queue management part may then be further configured to inform a user in the at least one virtual queue in respect of the attraction of the closure or throughput delay.

The electronic queue management part may be configured to invite the user to switch to another attraction in response to the indicated estimated time or the information or closure or delay. The electronic queue management part may be further configured to receive a request from the user to switch to another attraction in response to the indicated estimated time and/or information (and/or invitation). Then, electronic queue management part may be further configured to reallocate the user within the at least one virtual queue to another attraction in response to receipt of the request to switch. For example, the electronic queue management part may be configured to reallocate the user within the at least one virtual queue to another attraction such that the reallocated position or wait time of the user remains the same. Thus, reallocation may cause no additional wait time for the user or users until they are able to access an attraction.

The virtual queue may be managed in various ways. Priority management may be a desirable part of the queuing system. In examples, the electronic queue management part may be configured to determine that at least one user has a priority setting, thereby causing the position of the user in the at least one virtual queue to move forward at a faster rate than other users in the at least one virtual queue. Additionally or alternatively, the electronic queue management part may be further configured to receive a freeze request in respect of at least one user in the at least one virtual queue causing the at least one user's position in the at least one virtual queue to be fixed, with all other users' positions in the at least one virtual queue changing around the at least one user's fixed position. Then, the electronic queue management part may be further configured to receive an unfreeze request in respect of at least one user having a fixed position in the at least one virtual queue, thereby causing the at least one user's position in the at least one virtual queue to be variable.

In some examples, the at least one virtual queue may comprises a first virtual queue having a first rate of predicted removal or removal from the front of the first virtual queue to access an attraction and a second virtual queue having a second rate of predicted removal or removal from the front of the second virtual queue to access the attraction. Optionally, the first and second virtual queues may be managed in parallel by the electronic queue management part. This may allow users with a priority setting to be placed in a specific one of the two virtual queues, for example the second virtual queue. Beneficially, the electronic queue management part may be further configured to control the addition of users to the first and second virtual queues and/or the first and second rates of predicted removal or removal, such that an average wait time for a user in the second virtual queue is less than an average wait time for a user in the first virtual queue. Thus, the second virtual queue may be used for users with a priority setting.

In a sixth further example, there may be provided a method of managing a queuing system for controlling access by a plurality of users to one or more attractions. The plurality of users have a plurality of access keys, each access key being associated with at least one user from the plurality of users. The method may comprise: receiving electronic requests for attraction access, each request relating to a respective access key and being for the at least one user associated with the access key to access an attraction from the one or more attractions; for each request received, adding the respective at least one user a virtual queue in respect of the attraction; managing the one or more virtual queues in respect of the one or more attractions (each of the at least one virtual queue being associated with a respective attraction of the one or more attractions, such that for each request received, the step of adding may comprise adding the respective at least one user to a virtual queue associated with the respective attraction); determining a time at which the respective at least one user in respect of each request reaches a front of the respective virtual queue and may access an attraction from the one or more attractions on presentation of the respective access key; and controlling access to the attraction such that only a user presenting an access key at the determined time for accessing the attraction is allowed to access the attraction, no other access to the attraction being permitted.

Optionally, the method may further comprise selecting one or more users from those allocated to a first virtual queue of the one or more virtual queues, the selected one or more users each having a respective current position or wait time in the first virtual queue. Then, the method optionally may further comprise reallocating the selected one or more users to a reallocated position or wait time within the first virtual queue or within a second virtual queue from the one or more virtual queues. In some examples, the reallocated position or wait time may be either: (a) within the first virtual queue and more advanced than the current position or wait time; or (b) within a second virtual queue from the one or more virtual queues and the same or more advanced than the current position or wait time.

This method example may be combined with features corresponding to those described herein with reference to the queuing system. A computer program, configured to perform any method as disclosed herein when operated by a processor or (digital) logic configured to perform any method as disclosed herein are also provided. The combination of any specific features from any examples is also provided, even if that combination is not explicitly disclosed.

BRIEF DESCRIPTION OF THE DRAWINGS

The patent or application file contains at least one drawing executed in color. Copies of this patent or patent application publication with color drawing(s) will be provided by the Office upon request and payment of the necessary fee pursuant to 37 C.F.R. 1.84.

A number of specific non-limiting examples will now be described with reference to the following drawings.

FIGS. 8A to 8C illustrate example graphical user interfaces that may be displayed according to one or more illustrative aspects described herein.

DETAILED DESCRIPTION

A throughput estimator may be configured to forecast the throughput of a resource within a venue. The resource may be an attraction or point of interest within the venue, which may be a centrally managed collection of points of interest, such as a theme park.

Figure 1:
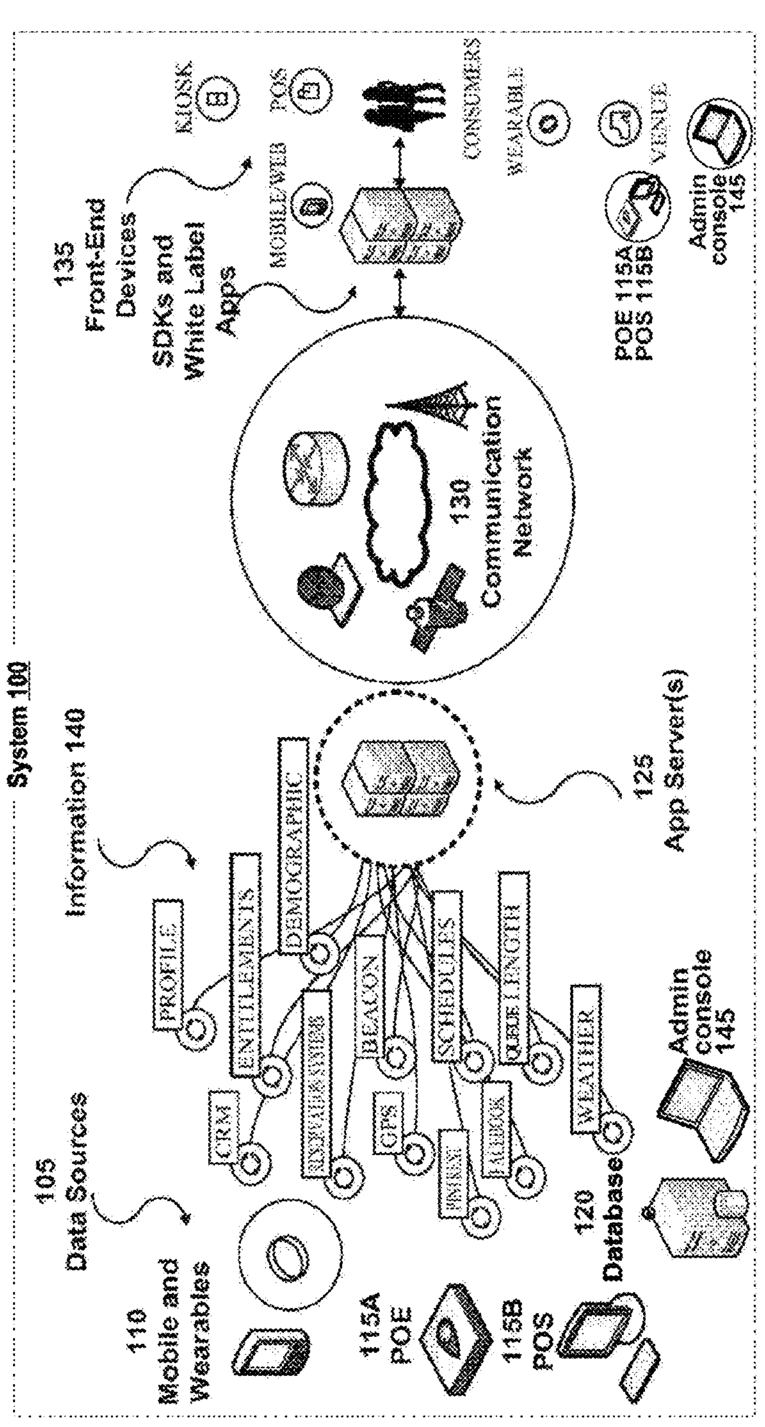
FIG. 1 is a block diagram of a throughput and/or wait time estimation ecosystem 100 according to one or more illustrative aspects described herein.

FIG. 1 is a block diagram of a throughput and/or wait time estimation ecosystem 100. The estimation ecosystem 100 may be used within a venue with multiple points of interest. The venue may be an entertainment venue or an event venue, which may include a theme park, a cruise ship, a school, a university, an arena, a concert venue, a ski resort, a relaxation resort, an ice rink, a shopping mall, a spa, a skate park, or a stadium. The points of interest of the venue may identify locations associated with attractions such as restaurants, cafeterias, concession stands, stores, libraries, theme park rides, theatre shows, movies circus shows, animal shows, or costumed characters.

Points of interest may also include locations associated with restrooms, water fountains, entrances, exits, or crossroads. An area such as an attraction or a restroom may be associated with multiple points of interest. For example, a given area may correspond to a number of entrances and exits or to multiple points of sale such as cashiers or card readers.

The estimation ecosystem 100 illustrated in FIG. 1 centers around one or more application server(s) 125. These application server(s) 125 may obtain information 140 from one or more data source(s) 105. The application server(s) 125 may transmit data identifying current or future estimated throughputs and/or wait times associated with particular points of interest in the venue (e.g., attractions, restrooms, crossroads) via the communication network 130. This data may be transmitted by the application server(s) 125 to one or more front-end device(s) 135. The application server(s) 125 and data source(s) 105 may be located within or outside the entertainment venue. The front-end devices 135 receiving the messages may be generally located within the entertainment venue, but in some cases may be located outside of the same. For example, a mobile device may be associated with a guest who is about to enter the entertainment venue. Similarly, a device may be associated with a staff member who is working remotely or on the outside perimeter of the venue.

The estimated throughput and/or wait time data provided by the system of FIG. 1 may estimate how long a guest will currently or at some point in the future have to wait to enter a ride, restaurant, restroom, or other "attraction" or point of interest at a venue. Wait times and/or throughputs may be computed based on the acquired information 140 using a calculation algorithm that allows calculation of estimates based on various types of information. For example, a Bayesian algorithm may be used to combine direct measurements around the point of interest, historical measurements around the point of interest, or measurements taken from other support systems not directly connected to the point of interest. Using the collected data 140, it may become possible to take a "snapshot in time" of the data sources and use them as inputs to predict current and future throughputs and/or wait times for any point of interest. The data sources 105 that make up the aforementioned supporting systems or that otherwise provided information 140 used in calculations may include mobile devices 110 (including wearable devices), point-of-entry (POE) or point-of-exit (POE) terminals/beacons 115A, point-of-service (POS) terminals 115B, or database(s) 120. Point of service terminals 115B may include cash registers, credit card readers, electronic payment receivers, or some combination thereof.

POE terminals/beacons 115A and POS terminals 115B may provide valuable information about traffic flow, and location data corresponding to mobile devices 110 that are interacting with the POE terminals/beacons 115A and/or POS terminals 115B even when the mobile devices 110 would not otherwise have signal reception. Database 120 may store historical data so that trends may be determined and used as part of the analysis (e.g., tracking how much traffic typically changes on weekends versus weekdays or at particular times of day). The mobile devices 110, either alone or in combination with these other data source(s) 105, may provide information 140 in the form of global positioning system (GPS) data or beacon proximity data.

The information 140 may also include social media data related to Facebook, Twitter, Instagram, Pinterest, Tumblr, or other social media accounts. Such social media data may include profile information, friend information, photos, message information, or some combination thereof. The information 140 may also include login information, guest settings, guest disability information, guest reservation status information, guest demographic information, entitlement information, customer relationship management (CRM) software information, weather information, queue length information, or some combination thereof.

Figure 6:
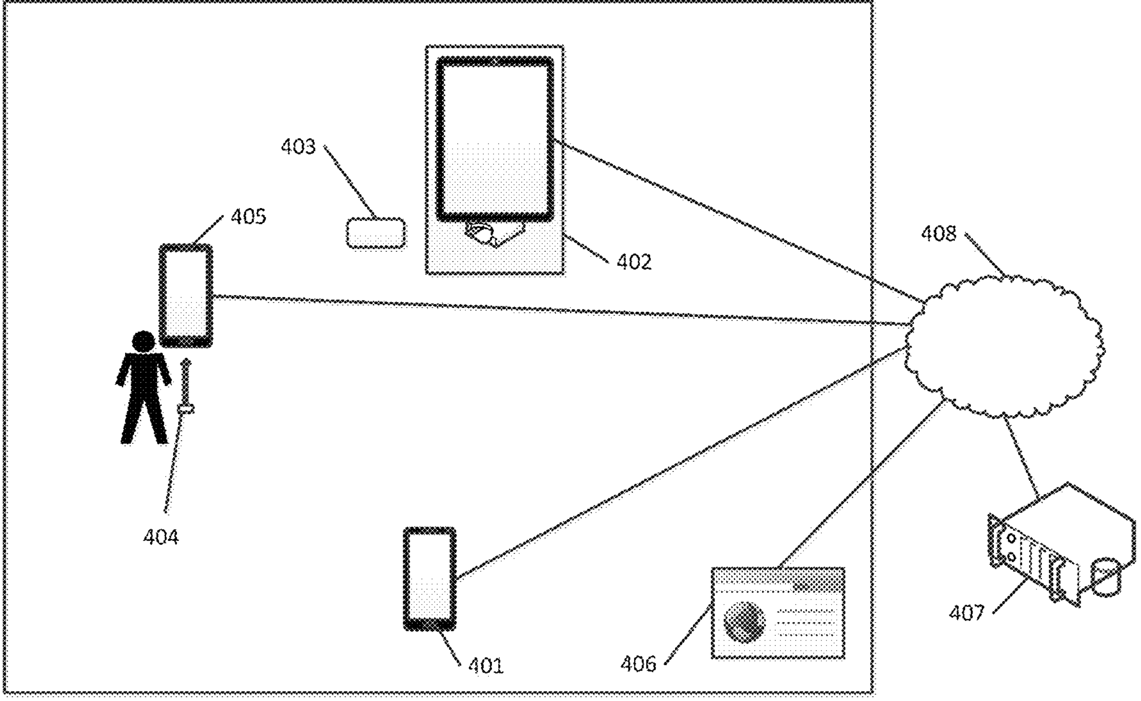
FIG. 6 schematically illustrates interactions between user devices and a system operated according to one or more illustrative aspects described herein.

The data sources 105 may also include information 140 from an administrator console 145 (e.g., which may in some cases be coupled to the database 120, or to a mobile device 110, or to a point of service terminal 1158, or to a point of entry/exit terminal 115A). The information 140 from the administrator console 145 may be generated via an administrator user interface allowing an administrator to manually enter information 140 to be collected by the application server(s) 125. For example, an administrator could manually provide information identifying that a particular attraction will be closed for routine maintenance starting during a predetermined time range. Such an administrator console 145 may be a computer system 500 as illustrated in FIG. 6, or at least may include at least a subset of the components illustrated within the computer system 500 of FIG. 6.

A mobile device 110 of a guest of the entertainment venue may be both a data source 105 that provides information 140 to the application server(s) 125 and a front-end device 135 that receives estimated wait time data transmitted by the application server(s) 125 over the communication network 130. Such a mobile device 110 may be a computer system 500 as illustrated in FIG. 6, or may include at least a subset of the components illustrated within the computer system 500 of FIG. 6.

The mobile device 110 may be a wearable device (also known as a "wearable"), meaning any type of mobile electronic device that may be worn on the body or attached to or embedded in clothes and accessories of an individual. Mobile devices 110 may execute an application (e.g., which may be embedded within an operating system, produced by a third party, or some combination thereof) that shares customer engagement information 140 with a venue's application server(s) 125, receives estimated wait time data, or some combination thereof. The customer engagement data information 140 collected by the application at each mobile device 110 and transmitted to the application server(s) 125 may include a current location, a prior location, a customer wait time in a particular area, a travel time from one area to another, a path taken from one area to another, or some combination thereof.

Processors and sensors associated with a mobile device 110 may gather, process, display, and transmit and receive information. In some cases, the mobile device 110 of a guest may in fact include multiple electronic devices, such as a wearable device wirelessly connected to a "smart" phone, wherein both the wearable device and the "smart" phone include sensors that help obtain information 140 that is then passed to the application server(s) 125, and wherein both the wearable device and the "smart" phone may receive estimated wait time data as front-end devices 135.

The system 100 of FIG. 1 may be used with and communicate with any number of external front-end devices 135 by way of communications network 130.

Communication network 130 may be or include an "intranet," e.g., a personal area network (PAN), a local area network (LAN), a wireless local area network (WLAN), a municipal area network (MAN), a wide area network (WAN), or some combination thereof. The communication network 130 may feature direct or multi-node communication paths/channels that may operate utilizing any number of standards or protocols including TCP/IP, 802.11, Bluetooth, GSM, GPRS, 4G, and LTE. In some cases, the communication network 130 may include Internet connectivity. Communication network 130 may include a variety of connected computing devices that provide one or more elements of a network-based service. The communications network 130 may include actual server hardware or virtual hardware simulated by software running on one or more actual machines thereby allowing for software controlled scaling in a cloud environment.

The front-end devices 135 may be mobile devices, such as cellular phones (e.g., "smart" phones), portable media players, or portable video game consoles used by venue guests. Such front-end devices 135 may receive data identifying current or future wait time estimates corresponding to different attractions or points of interests, for example allowing a venue guest to decide an optimal time to visit a particular attraction or point of interest, or to have an estimate of how long the wait time at a particular point of interest will be once the guest reaches that point of interest after walking there or being transported there. An estimated wait time may be used by front-end devices 135 to provide further predictions based also on walking time to various points of interest (e.g., "head to this ride and get in line right away, it's going to be much busier soon!").

A Point-of-Entry/Exit POE device 115 A, a POS device 1158, or an administrator console 145 may be a front-end device 135 in addition to being a data source 105. Thus, these devices may receive data from the application server(s) 125 identifying estimated wait times. For example, a staff member at a cash register (i.e., a POS device 1158) may receive an alert from the application server(s) 125 identifying that wait times are expected to drastically increase in the near future (e.g., because a nearby movie show just ended), and recommending that guest throughput (e.g., by opening another cash register) or guest capacity (e.g., by adding additional seats) be increased to alleviate potential issues before they actually occur. Thus, venues may prevent capacity and throughput problems proactively rather than reactively.

Front-end devices 135 are also inclusive of kiosks, staff mobile devices, staff wearable devices, venue devices, captive portals, and digital signs. Each of these devices may also be a data source 105 that provides information 140 not only about itself, but also about other devices that it interacts with. For example, a device operated by a staff member may report information 140 about a guest's mobile device 110 after an interaction between the two devices.

Calendar of Events

Scheduled events may be input to the throughput estimator and the throughput estimator may take the scheduled events into consideration when predicting the throughput of the resource. Doing so may comprise assessing or estimating the impact of the events on the throughput of the resource and adjusting the estimated throughput accordingly.

One example of an event that may impact the throughput of a resource is scheduled cleaning of the resource. Regular cleaning of attractions has become increasingly important in view of concerns over infectious diseases that may be transmitted via contact with unclean surfaces.

On the other hand, the system may also be used to identify times when the attraction throughput does not match the scheduled demand for the attraction. There may be times when a ride is busier or less busy than usual. This may be caused by changes in weather, natural variation over the day (e.g. at lunchtime). As a result of these fluctuations, an attraction may be operating at greater or lower capacity than required for the number of guests in the queue (buffer queue or virtual queue). In response to such a determination, the system may be able to schedule events to assist with matching the attraction throughput with the demand. For example:

If the ride is quiet, bring a scheduled cleaning forward

If the ride is busy, add an additional train

If a restaurant is busy, redistribute staff to that restaurant

If a ride breaks down, there may be no way to increase the throughput to match demand. In this case, throughput on other attractions may be increased e.g. by adding trains on those attractions and users that were previously queuing for the now broken attraction may be invited to join a queue for an alternative attraction.

An example may be that a queue for an operation attraction running at capacity has an event scheduled to add an additional train. The attraction may then be running at half capacity when the train is added, in the absence of any corrective action. Users from the queue for the broken attraction may be inserted into the virtual queue for the operational attraction to increase the demand at the time the new train is scheduled to be added to match the predicted throughput.

In another example, a train may be scheduled to be added in 1 hour to match normal fluctuations in demand. A ride may unexpectedly require cleaning and so may need to be temporarily closed. The time at which the train is scheduled to be added may be brought forward to counteract the demand that was not catered for while the attraction was out of service.

In this way, the resources in the park may be utilised more effectively. Where attractions are operating at less than full capacity (i.e. with empty seats) energy is wasted in operating those rides, as compared to operating those rides with all the seats full every time. The proposed system therefore improves the efficiency of the park.

In some examples, the system may use historic data of ride throughputs to help adjust the expected throughput figures. This may involve training a model with historic data to predict future throughputs.

Calculating Waiting Times

When calculating a waiting time for a queue (whether for a physical queue or a virtual queue) the following simple formula may be used:

Wait time for user joining=Number of users in the queue/Throughput of the queue

The number of people in a queue may be referred to as the "length" of the queue. The time that a person joining the queue has to wait before accessing the attraction may be referred to as the "wait time". The total wait time may be comprised of a wait time in a virtual queue, followed by a wait time in a physical buffer queue.

In this simple version of the calculation (which may be employed in prior art methods), the throughput of the queue may be assumed to be constant. However one or more aspects described herein acknowledge that there may be occasions when throughput of a resource changes, for example

- Regular cleaning (throughput=0 for a specified number of minutes)
- Adding more trains (e.g. going from 2 to 4 trains, throughput=0 for 10 minutes to add the trains, then throughput will increase to a given number or the previous throughput will double)
- For a restaurant, from there may be more staff during popular times (e.g. 12 pm-2 pm). The capacity of the restaurant may therefore be increased during these times where staff numbers are higher. More staff may be added so that the number of bookings may be increased, if increased demand is detected.

These events may be used to predict how throughput is likely to change over time. The queue wait time estimator may then use these forecasted changes in throughput to give a more accurate wait time.

Two important factors for determining a queue wait time may be:

- the throughput, both now (operating throughput) and during the period that the person who just joined the queue is actually in the queue (estimated throughput); and
- number of people in the queue, which may be determined by:
  - counting the number of people in a virtual queue or maintaining a running tally using queue management software;

processing images of the physical queue to estimate the number of people in the queue;

monitoring the rate at which users are joining the physical queue and leaving the physical queue to determine changes in the length of the physical queue, an maintaining a running estimate.

In one example, a ride may operate at 800 guests/hr with one train and 1200 guests/hr with 2 trains. The venue may put one train on at the start of the day. Then, at some point during the day, which will be planned based on expected attendance, the second train may be brought into operation. This may take a few minutes, during which the ride is not running. Thus the throughput goes from 800 guests/hr to zero guests/hr for a changeover period (e.g. 5 minutes) to 1200 guests/hr after that. The time at which the changeover happens may be scheduled.

In a further example, if a ride shuts, the park could be prompted to add more trains on another ride. So that users that were previously intending to go on the closed ride have an alternative to go to that has increased capacity.

In yet a further example, where users have been queuing for a ride that breaks down, a new virtual queue could be added for these new trains on the alternative attraction, so that the guests that were in the queue for the ride that shut may be offered an alternative that takes into account the time already spent queuing, so that they are not disadvantaged.

Maintenance/shift change events may be delayed or brought forward to ensure that guests are well catered for. In other words, the throughput of the resources may be managed to meet the demands of the venue guests. For example, a scheduled maintenance window may have been created so that an attraction is due to close at a particular time. The queue may be managed so that users are prevented from joining the queue at a certain point, so that the queue may be empty at the time the attraction closes. However, if the throughput of the attraction is lower than predicted (e.g. because a ride was running more slowly), there may still be people in the queue at the time the attraction is due to close. These people would face a long wait, as they would need to wait the entire duration of the maintenance window, as well as the normal queue time when operation resumes. To address this, the system may push the maintenance window back, to ensure all those guests that joined the queue before the attraction temporarily closes get through before the attraction closes, and don't have to wait any longer.

Demand for an attraction may be expressed in terms of a rate at which users join the queue. Where the wait time is increasing due to increased demand, this may be quantified using the rate of change of the wait time (the differentiated wait time). To estimate this, the rate of growth of a queue may be measured (e.g. using cameras or beacons). In a venue having multiple resources, park management software may use the queue lengths and attraction demands to help balance the guests within the venue. For example, the throughput of a resource may be reduced in order to increase the queue length (or the advertised wait time may be exaggerated). This may induce guests to visit other areas of the park where queue times are shorter. Alternatively, throughput of another resource may be increased to decrease the wait time for that resource and therefore induce guests to move to that area of the venue.

One way in which the utilisation of a resource may be monitored is by monitoring the size of a buffer queue associated with the resource. If the queue becomes too short, the attraction may begin to operate with empty seats. If the queue becomes too long, guests spend time waiting in line that they could spend on other attractions. To monitor the size of the buffer queue, video of the physical queue may be used.

PID control may be used to regulate the length of the buffer queue at the desired value.

One other way is to use historic data to predict how queue parameters will behave in future. The queue lengths may be measured alongside other relevant factors that may be correlated with the queue length and the data may be used to train a model. Queue measurements are likely to be similar on similar days, for example.

The estimated throughput of the resource may be used for estimating queue wait times, which may then be displayed to users in the venue via front-end devices, such as display screens or mobile phones. Methods for estimating queue wait times are discussed in more detail in U.S. patent application Ser. No. 15/141,780, which is herein incorporated by reference.

An average throughput may be calculated for the resource. The average throughput may be used in the waiting time calculation:

Wait time for user joining=Number of users/Average throughput

Figure 2A:
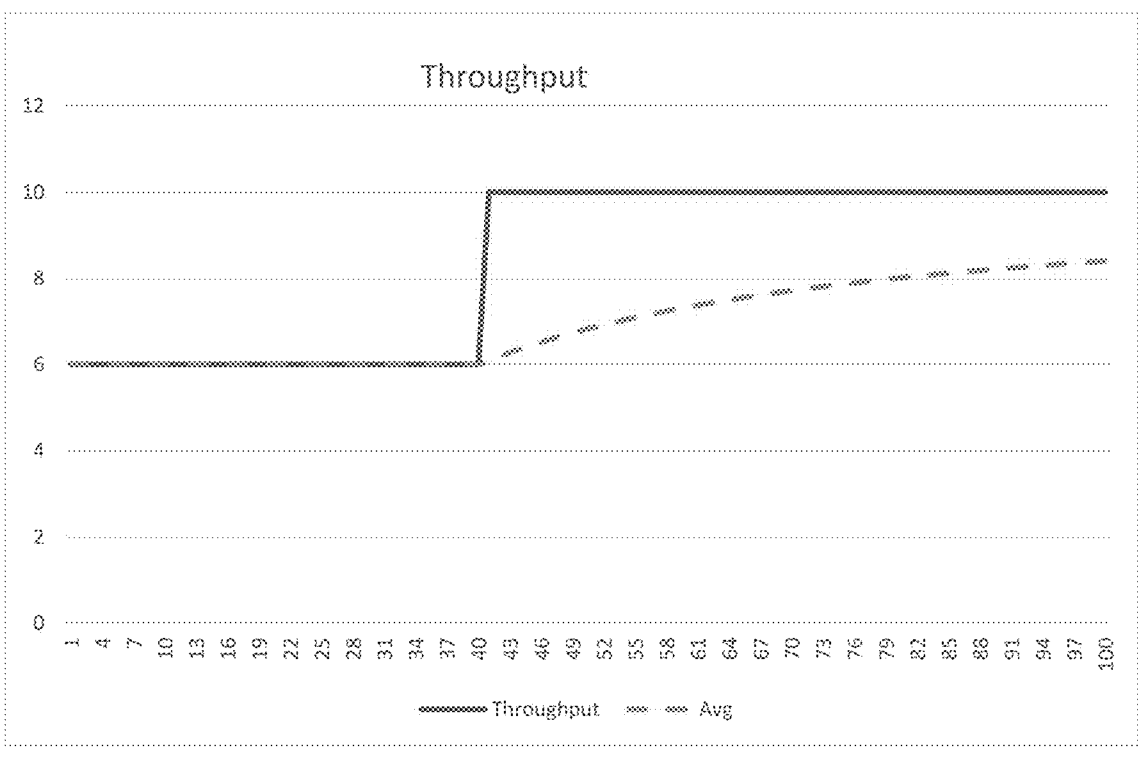
FIGS. 2A to 2C illustrate example graphs of instantaneous throughput and average throughput according to one or more illustrative aspects described herein.
Figure 2B:
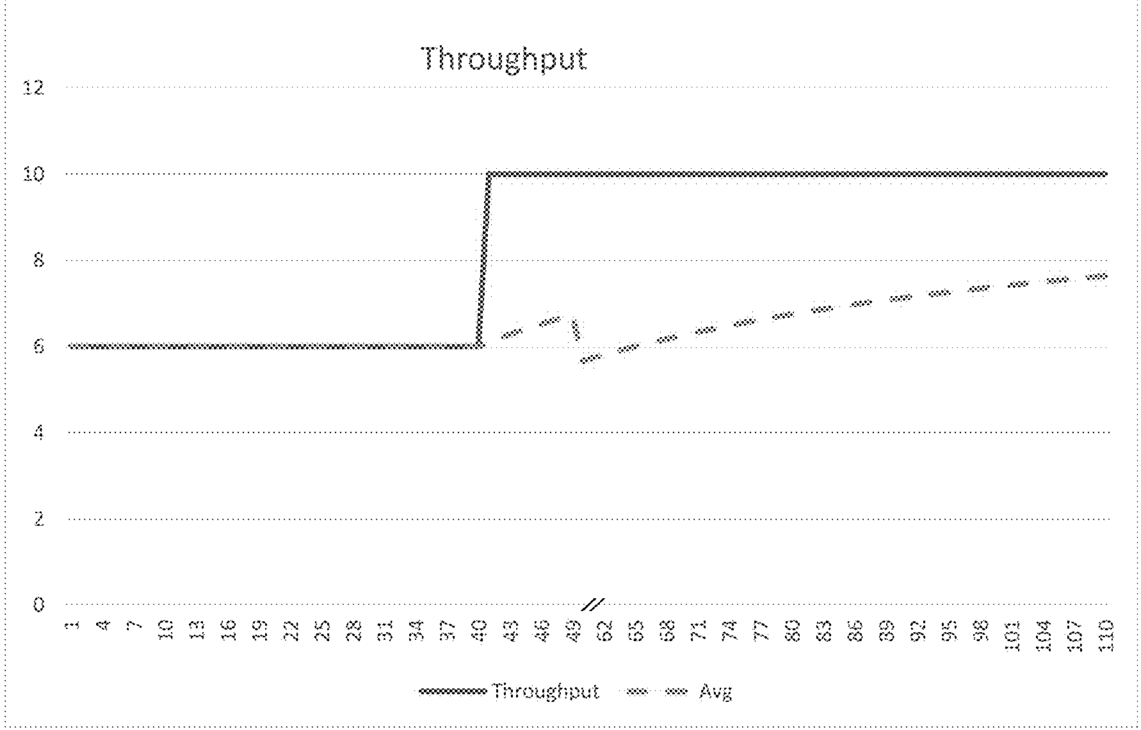
Figure 2C:
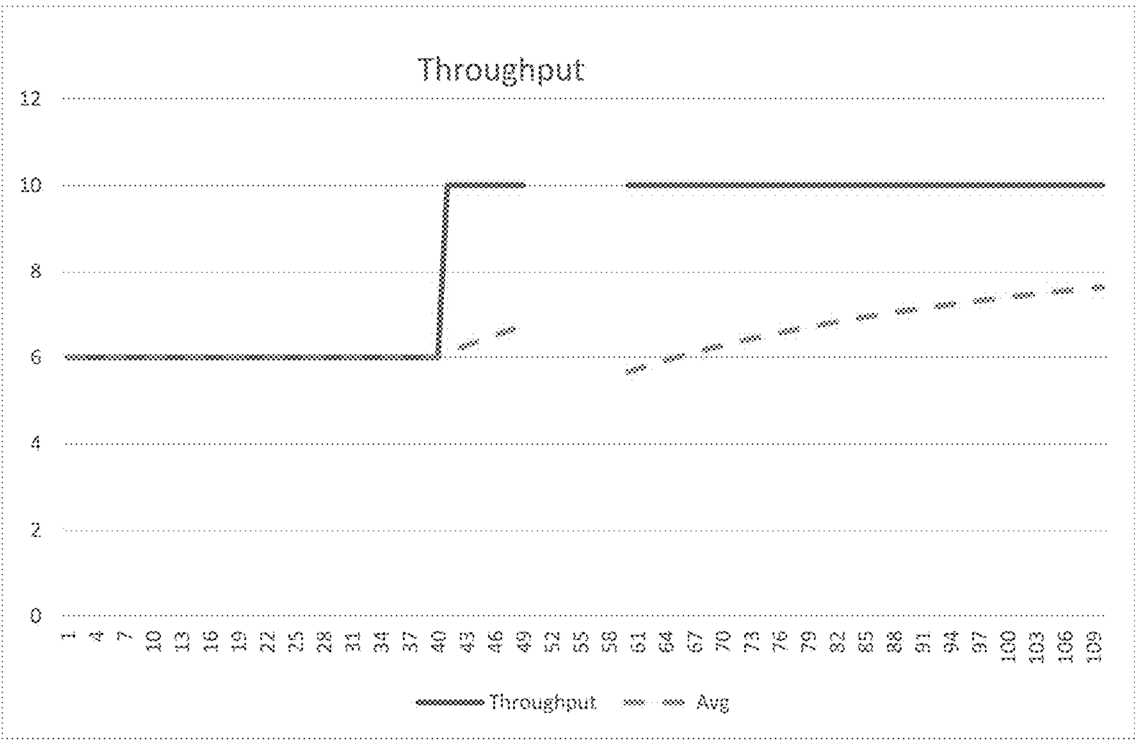

When referring to an "average" in this example, this may refer to the average over a defined period. In the case of FIGS. 2A-2C, this may be the running average, from t=0 up to the time in question, plotted at the x-coordinate.

In other examples, the average wait time may be calculated for the period the user is in the queue, for example.

A worked example of calculating an average throughput for a resource is provided below.

Consider a resource with a variable throughput. If the throughput changes from Ta to Tb (assuming neither is equal to 0), the average throughput may be calculated as a weighted average of the two throughputs. FIG. 2A illustrates a graph of instantaneous throughput and average throughput (measured in people per second) against time (in seconds). In this example, an initial throughput Ta=6 people/sec. Subsequently, the throughput changes to Tb=10 people/sec.

During a 100 second period, the resource has a throughput of to for 40 seconds Ta and a throughput of Tb for 60 Seconds.

Total time=100 seconds, throughput=840 people(6*40/100+10*60/100).

However if the resource stops, the average cannot be calculated whilst the queue is stationary as nobody leaves the queue. The wait time may be infinite if a throughput of zero were recorded. Therefore, this period may be removed from the timing before the average is calculated, then the time removed added back in.

If the resource no longer admits people from t=50 to t=60, then the time from t=50 to t=60 may be removed from the graph. This is illustrated in FIG. 2B.

This time may then be added back in to the wait time for any t>50. The corrected graph is illustrated in FIG. 2C. As may be seen in FIG. 2C, the removed time period is added back in, so that time is continuous on the x-axis. Therefore, the graph may contain a gap where the throughput is zero.

Figure 3:
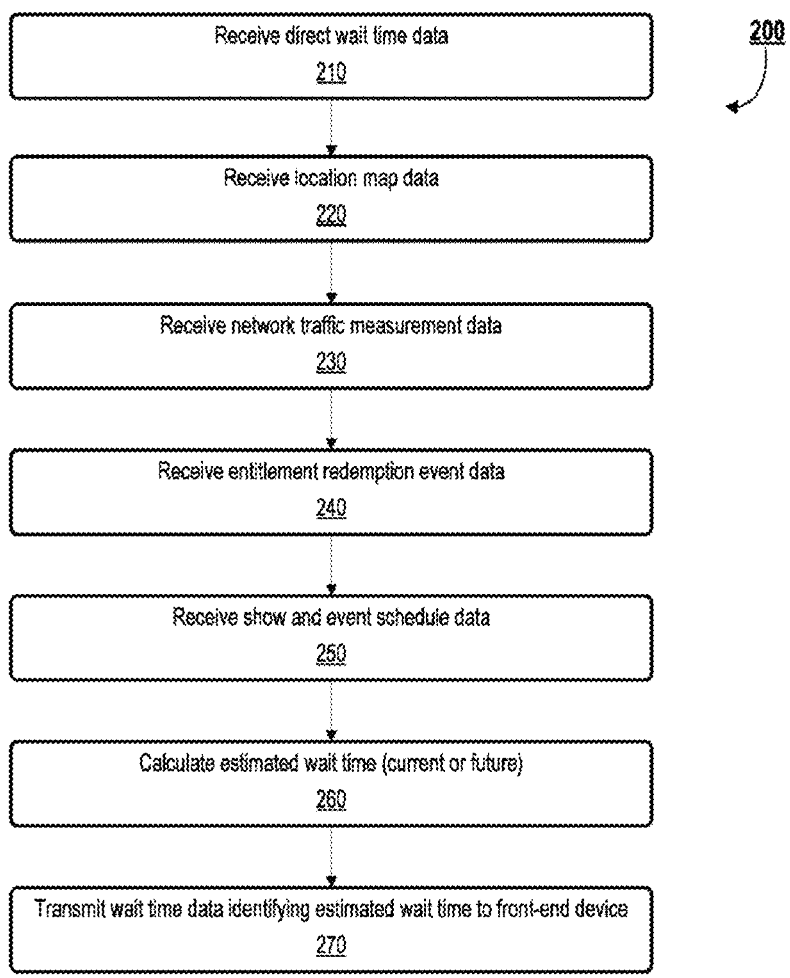
FIG. 3 is a flow diagram illustrating exemplary operations for calculating an estimated wait time according to one or more illustrative aspects described herein.

FIG. 3 is a flow diagram illustrating exemplary operations 200 for calculating an estimated wait time. In particular, FIG. 3 outlines how the application server(s) 125 may gather information 140 and use it to calculate an estimated wait time. It should be noted that the steps of FIG. 3 are exemplary and need not occur consecutively as illustrated in FIG. 3. Various steps illustrated in FIG. 3 and discussed below may occur consecutively, concurrently, or intermittently. For example, information from steps 210-250 may be received concurrently with respect to undertaking the calculation described with respect to step 260. Further, various steps may be occasionally, routinely, or temporarily omitted from the analysis process.

Information 140 may be collected by the application server(s) 125 through multiple methods. For example, information 140 may be collected through connected devices (guest mobile devices report detection of a POE beacon/terminal/geofence/waypoint 115A or vice versa). Information 140 may also be collected through sensors installed in the venue reporting a device location (connected iBeacons, Wi-Fi, RFID). Cameras installed in the venue identifying guests via facial recognition may also be information sources.

At step 210, a “direct” wait time may be measured and provided to the application server(s) 125 either automatically via location data (e.g., GPS location data from mobile devices 110 and/or POE locations beacons 115A). Measurement may also occur via visual tracking effectuated either manually by staff (e.g., entered via an administrator console 145 or POS terminal 115B) or automatically via cameras with facial recognition. The “direct” wait time may be a measurement based on tracking guests from a start of a line until entry into the point of interest (or in some cases until exit from the point of interest).

This information may be analyzed via comparison of timestamps collected when mobile devices 110 corresponding to particular guests are tracked at certain locations corresponding to a line and to an entry or exit. Examples include a movable POE terminal/beacon 115A at the beginning of the line, a POE terminal/beacon 115A at the entry to the point of interest, and a POE terminal/beacon 115A at the exit of the point of interest. The application server(s) 125 may receive the direct wait time data in the form of these timestamps.

At step 220, location map data is received at the application server(s) 125. Locations of venue guests may be tracked in real-time, periodically, or only at certain waypoints such as point-of-entry beacons 115A or point-of-sale terminals 115B. A location map may be generated from all of these disparate location points tracking all known guest locations for a given area. The area could be only an area relevant to one point of interest, such as a line area. The area may be expanded to include a predetermined radius around the point of interest or to include other neighboring points of interest, thus allowing the location map to detect and predict individual guest movements and larger guest group migration events, such as a large number of guests exiting a movie theatre or show at once when it finishes. The location map may be generated by inputting locations and corresponding times, dates, days of the week, months, years, self-reported wait times, and other information into a wait time calculation algorithm. The wait time calculation algorithm may be applied to ignore or minimize (negatively weight) points with missing data.

Information received and provided over communications network 130 may come from other information systems such as the global positioning system (GPS), cellular service providers, or third-party service providers such as social networks. The system 100 may measure location and proximity using hardware on a user device (e.g., GPS) or collect the data from fixed hardware and infrastructure such as Wi-Fi-based or cellular-tower-based positioning systems and Radio Frequency ID (RFID) readers. An exemplary location and proximity implementation may include a Bluetooth low-energy beacon with real-time proximity detection that may be correlated to latitude/longitude measurements for fixed beacon locations.

If a guest arrives at ride entry waypoint, then departs, then arrives and departs again during a configurable period (i.e. the length of the ride), only the first or last departure event might be tracked. This addresses the scenario where guests exit the ride at the same location that they board, so they'll be spotted twice: once before they ride and once after. Not all rides are configured this way, however, since with some rides, guests may disembark at an exit that is located in a different place than the entrance, and thus may be tracked separately.

At step 230, the application server(s) 125 may receive network traffic measurement data. The network traffic includes network traffic of guests within the venue as determined by network connected sensors. For example, guests connecting to (or being detected by) Wi-Fi hotspots, Bluetooth beacons, or near-field-communication (NFC) devices such as radio-frequency identification (RFID) devices may provide another method of tracking locations of guests. Furthermore, if it is detected that guests are using their mobile devices 110 to search for information about a particular point of interest, a probability may be entreated into the wait time calculation algorithm later that that guest may be headed toward that particular point of interest.

At step 240, the application server(s) 125 may receive entitlement redemption event data. This may include various promotions being offered by the venue, such as discounted tickets to the venue on certain days of the week/month/year. Entitlement redemption event data may also include promotions being offered by certain points of interest within the venue, such as discounts/offers at certain restaurants, free rides for certain theme park attractions. Entitlement redemption event data may also include promotions being used by guests, for example identifying that a certain promotion has turned out to be extremely popular or unpopular. Entitlement redemption event data may also include some combination of the above-recited categories of entitlement redemption event data. Promotions and entitlements may ultimately influence wait times by driving up probabilities that guests will be at the venue, or that guests will head to certain points of interest at the venue at certain times.

At step 250, the application server(s) 125 may receive show and event schedule data. This allows the wait time calculation algorithm to predict when large crowds might exit a particular point of interest, such as a scheduled end of a movie or show, and head to other nearby points of interest, such as bathrooms, restaurants, or rides. Similarly, this may allow the server 125 to predict when large crowds might enter a particular point of interest, such as a discounted time period or a grand opening of a new attraction at the venue.

At step 260, the application server(s) 125 may calculate an estimated wait time using the wait time calculation algorithm. The wait time calculation algorithm may use probability calculations, particularly if it is a Bayesian algorithm, and may in particular factor in probabilities of various occurrences based on all of the real-time and historical data it receives (e.g., information 140 of FIG. 1 and/or steps 210-250 of FIG. 3). Based on this information, the wait time calculation algorithm may accurately predict current wait times and future wait times. The wait time calculation algorithm may be based on Bayesian algorithms, nearest-neighbor algorithms, alternating squares algorithms, or some combination thereof. In some embodiments, the wait time calculation algorithm may be replaced with or used in combination with artificial intelligence or machine learning techniques/systems, such as neural networks, and may self-train and self-correct by estimating future wait times, seeing how accurate its estimates turned out once that "future" time comes to pass, and adjusting its later-predicted wait time estimates accordingly.

This concept may be expanded in a number of different ways. For example, additional metadata may be added to the wait time calculation algorithm inputs such as time of day, day of week, season, show schedules, and the like for more accurate results. Guest travel time to get to a ride (e.g., the guest is 15 minutes away) may also be factored in such that the algorithm could be used for predicting what the wait time will be in 15 minutes. Instead of showing the current predicted wait-time, the results may be personalized to show the estimated wait time when the guest arrives (or allow the guest to see expected wait-times through the remainder of the day to better plan their trip). The same solution could be used not just to predict wait times at a point of interest, but generally for predicting heavy or light traffic anywhere within the venue. For instance, if show schedules are one of the inputs, the line length at the food court could vary significantly depending on whether there is a show which ends at 11:30, 12, or 12:30.

Other information could also be used to generate the estimated wait time, such as thermometer data, barometer data, hygrometer data, wind vane data, rain gauge data, light sensor data, weather forecast data, a national/local holiday calendar, a local school vacation calendar, a current tide level measurement (e.g., which may affect aquatic or beach-related venues), a tide forecast, power outage data, seismometer data, smoke detector data, air quality data, emergency detection data, emergency forecast data or some combination thereof. Emergency detection data may include sensor measurement data identifying forecasts earthquakes, tornadoes, fires, tsunamis, or other natural or man-made disasters. Emergency forecast data may include data suggesting that such emergencies are likely to happen. For example, if the venue is near a body of water, information identifying that an earthquake has occurred near the same body of water may suggest that a tsumani or aftershock earthquakes are both likely to affect the venue in the near future.

At step 270, the application server(s) 125 may transmit data that includes estimated wait time(s) to one or more front-end devices. This data may take many forms so as to be compatible with different applications and user interfaces. The report time may be reported to a mobile device 110 of a guest at the venue through an application installed on a device such as a mobile device 110. In some instances, wait times may also be displayed on signs at the line entrance to the point of interest, or on signage provided in the line or waiting area. Signage could be manually updated by staff or updated automatically on digital displays that are front-end devices 135.

Measuring the Queue

Determining a length of the queue may be performed using queue management software where the queue is a virtual queue. A queue management server may keep a record of the users added to the queue and those that have left the queue and the length may be calculated by the software from the live queue data maintained by the server. However, where the queue is a physical queue, determining the queue length may be more difficult. There are a variety of techniques provided int this application that may be used to measure/estimate the number of people in the queue.

Visual Methods

Visual methods of measuring the length of a physical queue use image or video monitoring of the queue and image processing techniques.

It is sometimes not possible to capture a single image that includes the entire queue structure. Therefore, in order to estimate the number of people in the queue, the queue may be divided into a plurality of segments and each segment may be monitored by a respective camera. Therefore, to estimate the number of people in the queue, a number of different images of the queue at a same moment in time may be processed.

Figure 4A:
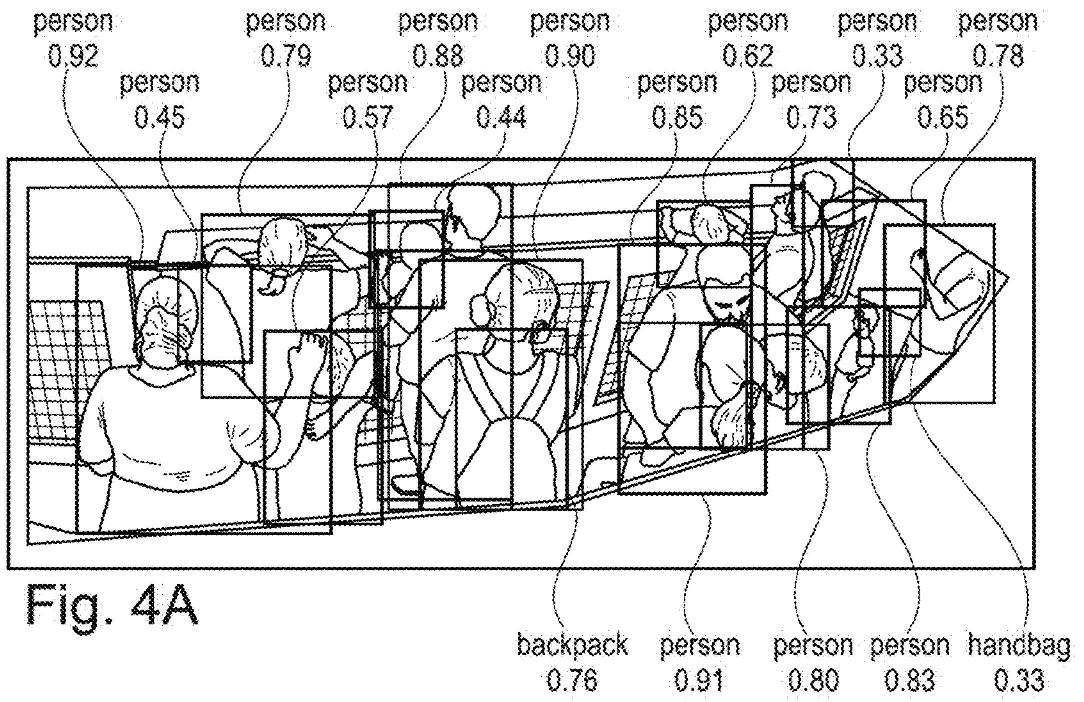
FIGS. 4A and 4B illustrate examples of queue length estimation according to one or more illustrative aspects described herein.

In a first example, referred to as the "heat map" approach, a method of estimating a number of people in a queue segment comprises determining a number of pixels of the image that correspond to venue guests in the queue. A visualisation of the heat map approach is illustrated in FIG. 4A.

Once a number of pixels that correspond to venue guests has been determined, a weighting may be applied to each pixel. The weighting may be based on an estimated density of the crowd at that point and/or a distance of the corresponding part of the image from the camera. In other words, perspective of the image is taken into account, as well as how closely packed the guests are in that location. The weighting may be provided in terms of an estimated number of people per pixel (typically a fraction of a person per pixel).

Machine learning algorithms, including neural networks, may be used to calculate the weighting applied to the pixels (and in doing so, estimate the density of the crowd). The machine learning algorithm may be trained using many training images of crowds with known densities. In this way, the machine learning algorithm may perform large scale crowd counting automatically in real time.

In a first example of a visual method, video images of the queue are analysed and the density of the crowd at each point in the image is estimated. Based on the estimated density of the crowd and the monitored area, the number of people in the queue may be estimated. This method is referred to as the "heat map" method.

To calibrate the heat map method, an image of an area may be obtained when the venue is empty. This provides a reference image with no people in it. Subsequent images may be compared to the reference images.

Using the reference images, a first map may be generated to mask off areas of the image that are to be excluded from analysis (e.g. because they do not form part of the queue). This may be especially useful where portions of the image have visual characteristics that are similar to crowds, but are not crowds. For example, some crowd detection algorithms may confuse gravel with a very dense crowd of people. Therefore, instances of detecting objects that are not people (which could adversely affect the estimate) may be reduced by masking off areas of the images that do not correspond to the queue. Moreover, by reducing the area of the images that require analysis, efficiency of the image processing may be improved.

To determine the mask, an image of the area may be obtained when the venue is empty (as with the heat map calibration method). This provides a reference image with no people in it. Subsequent images (including venue guests) may be compared to the reference images. Areas of the image that do not change (areas that never have people in in them, e.g., because they are out of bounds) may be ignored during image analysis and so may be masked off.

Using the reference images, a second map may be generated to provide a greyscale gradient map of the included areas, which assigns a weighing value to each pixel. This second map may be used to account for perspective in the image, so that areas that are further away (where objects appear smaller in the image) are given a higher weighting. This technique may provide a simple way to account for perspective, rather than trying to remove the perspective using image processing techniques, which may distort the image.

The greyscale map may be generated automatically (e.g. by determining the height of a single person at a number of points in an image from a camera). The greyscale mask may be used as a way of accounting for perspective, as described above.

Alternatively, where the geometry of the scene is fixed (e.g. because the camera is stationary) an image transformation (such as a homography) may be used to account for perspective.

In some examples, the density of the crowd is not estimated. It may be sufficient to identify pixels of the image that correspond to the crowd and account for perspective effects. Such methods may provide faster estimates with less processing and may be useful where accuracy is not critical.

In other examples, a machine learning algorithm may estimate the density of the crowd in terms of people per pixel.

Certain algorithms may automatically account for perspective and therefore a gradient may not be needed.

One or more further images of the venue may be obtained when there are venue guests present. Image processing techniques may be used to identify differences between the images that are due to guests being present in the venue. Image processing may be used to normalise lighting conditions and ignore noise so that only guests are detected. The number of pixels in the images that are attributed to venue guests may be used to provide and estimate of the number of guests visible in the image.

The process may be repeated regularly (e.g. ten, twenty, thirty or sixty times per second, or once every one, ten, twenty or sixty seconds, or once every one, ten, twenty or sixty minutes), so that an image of the area is periodically obtained and an updated estimate of the number of guests in the queue may be derived.

Each image may be processed individually to obtain an estimate of the number of guests present in the corresponding segment of the queue. Alternatively, video processing may be used to track changing numbers of guests over time by taking data from previous image frames into account (e.g. by tracking movement of guests between image frames).

In another example, rather than analysing individual pixels, an algorithm may be used to draw a boundary around areas of the image containing people (if they are tightly packed this will give a large area, individuals will give a smaller isolated area).

In a specific example, the number of users may be estimated by:

- determining the area corresponding to the queue (minus any "holes" in it);
- applying (multiplying) the greyscale mask to calculate a value that give the perspective-adjusted area (closer to the camera the person would appear larger, so would take up a larger area, the greyscale would therefore need to be darker and each pixel would count for less to account for this; further away, each pixel counts for more); and
- multiplying the adjusted area by an approximate density of people (which may be estimated using head-counting techniques).

There are advantages to estimating the number of people using the heat map visual area-based method. Identifying individual people in a crowd to count them may be inaccurate. By identifying an area, no individuals are identified (merely the shape and area of the queue). Therefore, no personal information may be generated.

Figure 4B:
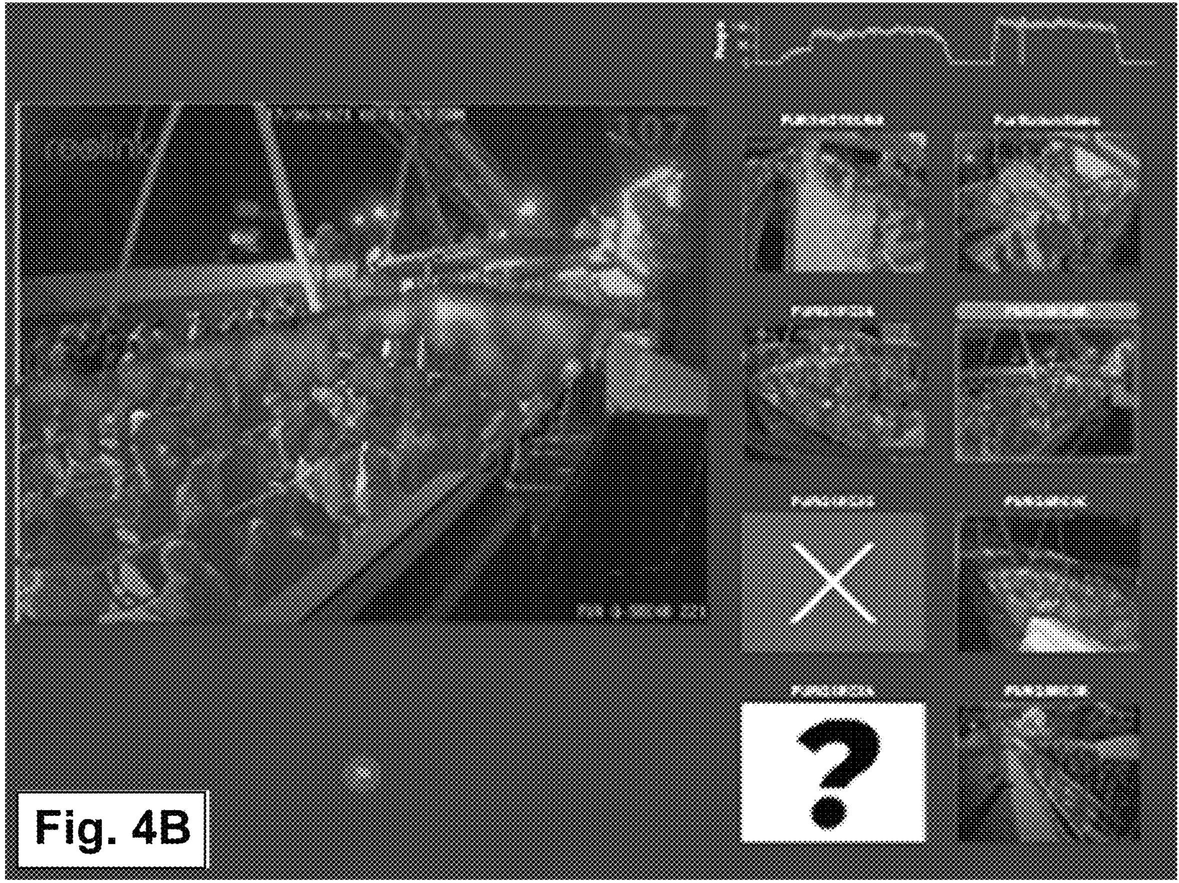

In a second example referred to as an "individual identification" or "head counting" approach, a method of estimating a number of people in a queue segment comprises detecting and counting individual venue guests visible in the image. A visualisation of the individual identification approach is illustrated in FIG. 4B.

A machine learning algorithm or neural network may be trained to identify people by providing training images of individuals (either full length or just head-and-shoulders). The machine learning algorithm may be further configured to assign weights of probability to the individuals identified in images. In other words, the algorithm may identify an individual in an image and also indicate how confident the algorithm is that the identified feature is a person.

The total number of individuals in the queue may be estimated based on the total numbers of individuals identified in the imaged areas.

By monitoring a number of different areas of the queue with separate cameras, the totals from each camera may be combined to provide the total number of people in the queue.

Depending on various factors, the heat map method of crowd estimation may be more suitable for some images and the head counting method may be more suitable for other areas. For example, where there are significant occlusions, it may be difficult to reliably identify individuals and the heat map method may be more appropriate. Likewise, if the camera is fairly high to captures images over a large area then the faces of the guests may be obscured, in which case the heat map method may be more appropriate. In contrast, where people are closer to the camera with faces visible, an individual identification method may be more appropriate.

In another example, the cameras may be used to identify the end of the queue (in other words, the person queueing that joined the back of the queue most recently). If one segment in a queue contains the end of the queue, potentially the segments of queue ahead of that segment need not be processed, as they may be assumed to be full. Likewise, the segments behind may be assumed to be empty in some examples.

In still a further example, a method of estimating a length of a queue comprises a combination of the heat map approach and the individual identification approach. The method used for each image/camera/segment is selected depending on characteristics of the queue.

In other example methods, the queue may be divided segments. For example, some portions of the queue may snake back and forth around an area, whereas other portions of the queue may advance linearly in a given direction (e.g., down a corridor or up a flight of stairs). Each segment of the queue may be covered by a camera.

As described above, each video feed may be processed using one of two available algorithms. The heat map method may be applied for a snaking dense crowd, whereas the individual identification method may be used for less dense areas, or when people are close to the camera.

In some example methods, information relating to the structure of the queue may be provided, in conjunction with one or more sources of video information. By adding information on the queue structure, a more accurate estimate of the number of people in the queue may be provided. Alternatively, the method may be made more efficient by making assumptions about queue segments, based on an identification of the location of the end of the queue.

One example of queue structure information that may be provided is a unique segment number corresponding to each camera/image. The segments may be numbered in order, so that if segment 3 is full, segments 1 and 2 may also be assumed to be full in some examples. Likewise, if segment 12 is empty, segments 13 and onwards may be assumed to be empty in some examples. The numbering may start from the resource end of the queue or the entrance to the queue, so that the numbering convention may be inverted.

In one example method, referred to as the "Sum" method, the number of people in the queue may be estimated by estimating a number of people in each queue segment and summing the estimates from the segments together.

This method is resilient to adding sections to the queue or changing the structure of the queue, as the method does not require any prior knowledge of the queue structure. However, every segment of the queue requires processing. Therefore, this method is more data/processing intensive.

In a variation of the method, referred to as the "Tail Sum" method, the video feeds may be used to identify a location of the end of the queue (or the "tail" of the queue). Based on the location of the end of the queue, an estimate of the number of people in the queue may be provided. The estimate may be based on pre-programmed knowledge of the capacity of each segment of the queue (or average numbers of people in those segments when full). The overall estimate may be provided by summing the capacities of the segments ahead of the tail, along with an estimate of the number of people in the segment containing the tail. In this way, the number of images that require detailed analysis may be reduced. In other words, the system may assume that every segment ahead of the segment containing the tail is full and assume that every segment behind the tail segment is empty.

To identify the end of the queue, a binary search may be performed. For example, analyse a segment at the middle location of the queue structure. If there are guests in that segment, look at the midpoint between the middle location and the end. If there are no guests in that segment, look at the midpoint between the middle location and the beginning. Continue by bisecting the queue until the segment in which the tail of the queue lies is identified.

A complication may arise when the number of people in the queue is estimated based on the location of the end of the queue if the queue structure is not fixed. In some queues, sections of the queue may be opened and closed, depending on how busy the queue is (segments may be opened and closed dynamically). Therefore, for a given position of the endpoint of the queue, the number of people ahead of that point may depend on the current queue structure. In such cases, in order to estimate the number of people in the queue based on the location of the end of the queue, the system may need to be kept up to date with details of the current queue structure.

In practice, it may not be convenient to update a stored queue structure in the queue estimation system every time the queue structure changes, especially if the structure changes multiple times a day, based on the demand. Such dynamic systems may therefore not be suited to the Tail Sum method. The Tail Sum method may be more suitable where the queue structure is permanent.

In a further variation of the method, referred to as the "SumIF" method, which builds on both the Sum and Tail Sum methods, the system may identify a location of the tail of the queue and then process every segment ahead of the segment containing the tail. Like the Tail method, this method assumes that every segment behind the tail segment is empty. However, this method might not make assumptions regarding the segments ahead of the tail segment. Each segment ahead of the tail segment is individually processed to obtain an estimate of the number of users in that segment. Therefore, if some segments of the queue ahead of the tail are configurable to be open or closed, the SumIf method will return an estimate based on the current state of those segments, without prior knowledge of whether those segments have been opened/closed and without making assumptions.

In each of the methods described above, there may be one or more segments of the queue that are unobserved. There may be a number of reasons for this. One reason is that it may not be possible to obtain clear images of some sections of the queue (e.g. because those sections are dark, such as in a tunnel, or because there is intermittent smoke/dry ice in that area). Another reason is that it may be impractical to image every section of the queue so the number of cameras may be limited to a subset of the total segments of the queue. To handle unobserved segments of the queue, the system may check the first observed segment after the blind segment and, if the subsequent observed segment contains at least a threshold number of people (e.g., more than a fraction of the segment capacity, e.g. 50%, or more than a threshold number, e.g. 30), the system may assume that the blind section preceding the observed segment is full. The system may be preconfigured with a capacity of the blind segment, which may be added on to the overall estimate if the number of people in the subsequent observed section meets the threshold.

If the system determines that the tail of the queue is in the unobserved segment (e.g. if the number of people in the subsequent observed segment does not meet the threshold), the system may add half the capacity of the unobserved segment to the overall estimate.

By combining the SumIF method with the method for handling unobserved segments, the proposed method may be able to provide an accurate estimate of the number of people in the queue, with a relatively small number of cameras observing the queue.

A machine learning algorithm may be used to estimate the number of people in the queue. The inputs to the machine learning algorithm may comprise one or more images of the queue (e.g., one image per observed queue segment).

The inputs to the machine learning algorithm may further comprise one or more of the following optional inputs:

- information regarding the queue structure (e.g., the order of the observed segments in the queue structure and/or capacity information for unobserved segments between the observed segments); and/or
- information relating to each specific queue segment (e.g., masking information to delineate parts of the image that relate to the queue from parts of the image that do not relate to the queue and/or instructions regarding whether to use a heat map estimation method or an individual identification method for the image relating to the queue segment).

These inputs may be provided during training of the algorithm and/or during estimation.

The output from the machine learning algorithm may comprise an estimated number of people in the queue.

The output from the machine learning algorithm may optionally further comprise one or more of:

- an estimated number of people in each observed segment of the queue;

annotated images of the queue, illustrating how the estimate has been derived (see FIGS. 4A and 4B); and/or other debugging information.

Methods of training a machine learning algorithm are also provided. The training methods may comprise providing the machine learning algorithm with training data comprising one or more of:

- one or more images of the queue (e.g., one image per observed queue segment);
- information regarding the queue structure (e.g., the order of the observed segments in the queue structure and/or capacity information for unobserved segments between the observed segments);
- information relating to each specific queue segment (e.g., masking information to delineate parts of the image that relate to the queue from parts of the image that do not relate to the queue and/or instructions regarding whether to use a heat map estimation method or an individual identification method for the image relating to the queue segment); and
- an estimated number of people in each observed segment of the queue (e.g. obtained by manually counting the number of people in the image, by manually counting or estimating the number of people in a crowd, or by performing image processing methods on the image, which may be processor-intensive data processing methods).

As discussed above, the process may be repeated regularly to periodically revaluate the estimated queue length. To smooth out noise in the estimates, the system may maintain an exponential moving average of the raw data, which may be presented as the estimated wait time.

To augment the queue length estimation approaches described above, a quality control machine learning model may be provided to supervise the estimation method. The quality control machine learning model may be configured to process data from the cameras in the system, alongside the estimates produced by the methods and historical data for the queue lengths and wait times. Based on these inputs, the machine learning model may be above to detecting if there are any problems with cameras and/or the estimation methods.

For example, if the estimated queue lengths/wait times are significantly different to historical times for the time of day/day of the week, this may indicate an issue. Moreover, if analysis of a camera feed covering a section of queue indicates that that section of the queue is empty, whereas analysis of camera feeds from sections of the queue further back that that segment indicate the presence of guests, this could indicate a problem. For example, the camera feed could be frozen or faulty. There could be a problem with the crowd estimation algorithm, the camera may have been knocked so that the queue is no longer in the frame or there could even be a problem with the queue itself, such as an unintended shortcut causing a section to empty.

Issues with the system may be identified by the machine learning model and brought to the attention of an operator, which may be able to further diagnose and resolve the issue.

The proposed methods may provide a mechanism for balancing accuracy against the available resources. A system employing the proposed methods may be provided and may produce acceptable estimates with a reduced number of cameras. This provides a mechanism for reducing the hardware requirements both in terms of cameras installed and data processed.

Non-visual methods of determining the length of the queue may involve counting people joining the queue and counting people leaving the queue (as described below). However, if there are errors in the numbers counted, maintaining an estimate of the number of people in the queue using the counted numbers may be inaccurate (because the total is effectively an integral of the change and therefore any errors may persist or increase). Therefore, the numbers counted need to be reliable. In contrast, the visual area-based method is able to provide an estimate in which errors do not grow over time. Nevertheless, non-visual methods may provide useful data that may be used to validate the visual methods.

By measuring the total number of people in the queue and measuring the number leaving the queue, the number of users joining the queue may be calculated (which is effectively a differentiation step, so any errors will tend to remain stable or reduce). This may provide an estimate of the demand for the resource.

Non-Visual Methods

Alternative methods of determining a length of a physical queue are provided, without using video/image monitoring techniques. Instead, the number of users joining the queue are monitored and the number of users leaving the queue via the attraction are monitored (assuming that users do not exit the queue without going via the attraction). One way to do this is by using electronic scanners at the entry and/or exit of the queue.

In a case where there is a virtual queue and a physical queue (also called a buffer queue) operating in series, users may only be permitted to enter the physical queue once they have reached the front of the virtual queue. To validate this, users may each have an access key and may be required to scan the access key at an access barrier in order to gain access to the physical queue.

Requiring a user to actively scan an access key in order to gain access to the physical queue (e.g. using an radio-frequency identification, RFID, reader) may provide an accurate way to determine the number of users that have joined the physical queue and the rate at which users are joining the physical queue.

To measure the rate at which users leave the physical queue, the access keys may be scanned again at the exit point of the queue. However, requiring users to actively scan out of the queue may create delays in loading the resource and therefore impact the efficiency of the resource. Therefore, it is preferred that users do not have to actively scan an access key to leave the queue. Instead, beacons may be placed at the exit of the queue and the access keys may be detected passively (by detecting access keys that are in the vicinity, rather than requiring the user to present the key to the reader).

This passive scan method (e.g. using Bluetooth) may not be 100% efficient at detecting every user that leaves the physical queue. Therefore, the queue manager may maintain a record of the order in which users joined the physical queue, from the order in which the users actively scanned in as they entered into the physical queue. Assuming that the users stay in approximately the same order in the queue, the system may infer that if two users have been detected at the queue exit, any users that joined between the joining times of those users are also likely to have left the queue. In this way, the problem of errors accumulating over time may be reduced.

To improve the rate of success of detecting users, an additional detector could be placed at the exit point of the resource (in addition to the exit point of the queue). This additional detects people coming off the ride and this data could be combined with the data from the detector at the queue exit to improve the throughput estimate (taking the ride duration into account).

Wait times may also be measured directly. The beacon-based scanning system described above may be used to provide a measurement of the wait time for the resource. The wireless beacons may be used to detect a wireless device at the entry point and exit point of the queue. It may then transmit this to a server. Other methods for directly measuring queue wait times are discussed in more detail in U.S. patent application Ser. No. 15/141,780.

Various combinations of the methods described above may be employed. For example, the beacon method may be used to verify estimates produced by the visual method. In such a system, the throughput cameras may be equipped with Bluetooth detectors.

The Bluetooth detectors may be used to detect an individual at the entrance to the queue and the exit of the queue (either at the entrance to or the exit from the attraction). By comparing the timestamps of the identification, the wait time of the queue at the time the user joined may be determined. This may be used to validate the estimated wait time that corresponds with the time (in the past) that the user joined the queue. By comparing historical wait times from Bluetooth detectors with historical estimates of the wait time, significant discrepancies may be identified and corrected. If something is wrong with the estimation system, e.g. a problem with the queue or the camera not fully seeing the whole segment, significant discrepancies may be observed.

Of course, the measured wait time is for a time in the past at which the user joined the queue. This method is therefore more useful for validating other estimation methods than for estimating a current wait time.

Historic measured wait times may also be used to provide training data for a machine learning algorithm (e.g. using a Bayesian approach).

If the user is detected at the exit of the ride, rather than the exit of the queue, a correction may be applied to account for the time the user actually spent on the ride.

Measuring Throughput

Throughput for the resource (also called the attraction) may be measured by counting people moving through the access point for the resource.

In one example, throughput sensors (e.g. cameras) may be installed above the entry and/or exit points to the queue, looking down at users and detecting when users cross a threshold line defining the entrance and/or exit to the queue.

Alternatively, the passive scan system described above may be used to provide a measurement of the throughput of the resource. A wireless beacon may be placed at either end of the physical queue. Then, as a user with a wireless device that may interface with the beacon passes it, the device records the time. The device also records the time when it passes the end of the queue. It may then transmit this to a server. An advantage of this approach is that the queue ends may be moved easily, with no need for power or networking, which is instead reliant on the user device.

The system may only need to measure a proportion of the guests rather than 100% to extract the necessary information (for instance, it may know how many have gone into the queue as they have been scanned previously).

Since not every user may be detected when leaving the queue, the system may use an order in which the users joined the queue (where users are required to active scan to enter the queue), to fill in the gaps in the data.

If the beacons for detecting exit from the ride detect no users in a given timeframe, the queue manager may assume that the ride is operating at a constant throughput rate (using the measurement from the last time the beacon detected a user). Once another user is detected, the throughput estimate may be updated.

The visual area-based method for estimating queue length may also be used to measure throughput. By measuring the total number of people in the queue and measuring the number joining the queue, the number of users leaving the queue may be calculated. This may provide an estimate of the throughput of the resource.

In another example, pre-set capacities may be assumed for the attraction, based historic data. For example, it may be known that the attraction operates at a fixed throughput of 300 guests per hour, 600 guests per hour, or 900 guests per hour, based on operating parameters of the attraction (e.g., a number of trains running). The system may estimate an approximate throughput and then, based on the estimated approximate throughput, assume that the actual current throughput is the nearest of the possible pre-set capacities (in other words, measure the throughput and snap to closest pre-set value). In this way, the errors introduced by external sensors may be mitigated, at the expense of accurate real-time values.

Virtual Queuing

The estimated throughput of the resource (and calendar of scheduled events) may be used to manage a virtual queue that feeds into a physical buffer queue for the attraction. Methods of managing such a virtual queue are described in more detail in U.S. patent application Ser. No. 15/315,712, which is herein incorporated by reference.

Virtual queues offer benefits to attraction operators and users (also referred to as guests in the context of an amusement park, for instance), since time spent waiting in a physical queue is considered wasted and could be spent on other activities. It may therefore be preferable for users to spend most of the overall queue time queuing virtually, so that they may visit other attractions, such as cafes and amusement stands, while still effectively waiting in the queue.

One reason for maintaining a physical queue in addition to the virtual queue is to ensure that there are always enough people ready to utilise the resource, so that resource capacity is not wasted.

To balance these needs, it may be preferable to keep the physical queue short but not empty (for example, 10 minutes). Fluctuations in the throughput of the resource may lead to fluctuations in the length of the buffer queue. Therefore, the virtual queue feeding into the physical queue must be managed to maintain the length of the physical queue. In order to do so, measurements of the length of the physical queue and the throughput of the resource may be useful.

There are different ways of operating a virtual queue. In one method, the guest may be sent a notification when they have reached the front of the queue and are permitted entry to the physical queue. In this method, the rate at which users join the physical queue may be easily controlled (because the rate at which guests are summoned to the physical may be controlled to manage the length of the physical queue). There may be a small delay between summoning a user and them arriving at the queue, because they may take some time to travel to the queue point. However, for this method to work, a reliable communications network is required, so that summons may be received by the user, wherever they are in the venue.

In another method, the user may indicate their desire to join the virtual queue (e.g. by scanning their access key at an entry point) and be given a time at which they may return and enter the physical queue. If the time is fixed then no communications network is required, because the user is given their arrival time straight away. However, the physical queue may be more difficult to manage in this way because the rate at which users reach the front of the virtual queue (and so are permitted access to the physical queue) is set ahead of time. For example, if the length of the virtual queue is three hours, it will take three hours before an adjustment to the throughput of the virtual queue is reflected in the rate at which users join the physical queue, because the arrival times of the guests that have already joined the virtual queue cannot be changed.

In yet another method, the user may indicate their desire to join the virtual queue and be given a time at which they may return and enter the physical queue. However, this time may be a provisional time that is subject to adjustment. A long-range broadcast system (e.g. Sub-GHz radio) may be implemented in the venue so that the access keys may receive updates to their entry time. If the length of the physical queue is outside of the preferred range, the virtual queue wait time may be adjusted to decrease/increase the length of the physical queue. For example, if the queue is too long, everyone's arrival time may be pushed back by 5 minutes, to allow the queue length to reduce. In this way, the entire virtual queue may be updated, by broadcasting a message that the queue is now n minutes shorter/longer.

If the broadcast system is not 100% reliable, some guests may not receive the broadcast message. However, as long as the message reaches a majority of the access keys then this may nevertheless provide an effective method to adjust the throughput of the virtual queue and impact the rate at which users join the physical queue. This method therefore provides enhanced control over the physical queue, without requiring a communications network that is 100% effective.

Figure 5A:
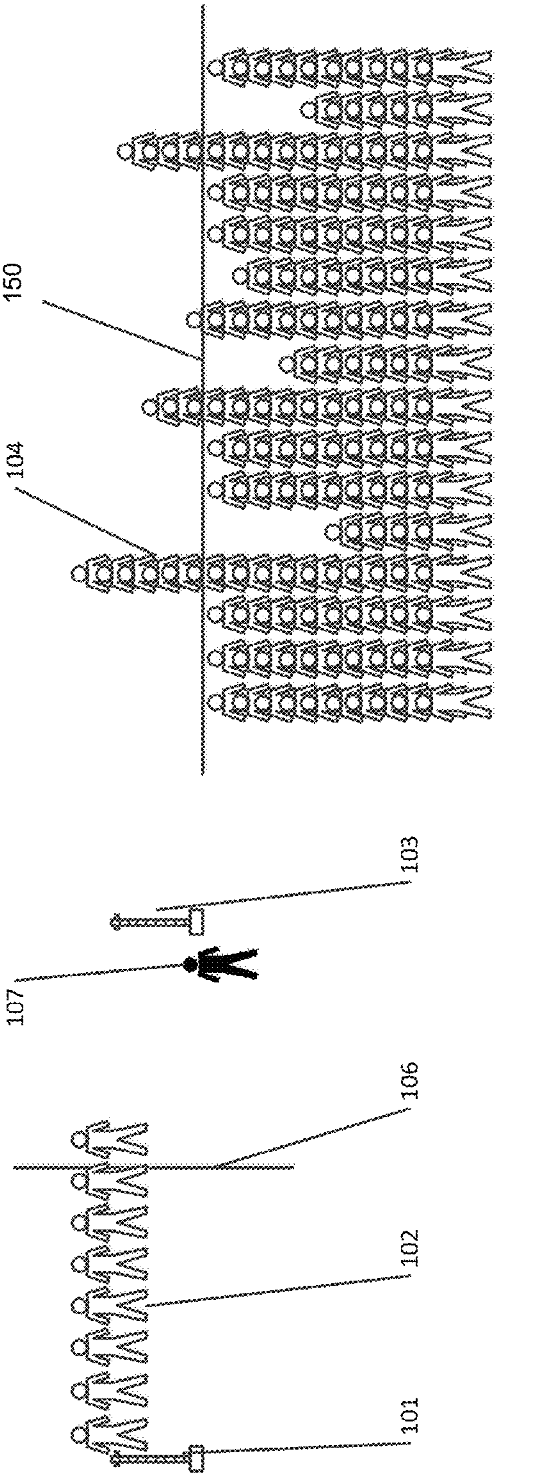
FIG. 5A illustrates an example of a virtual queuing system showing schematic allocation of guests according to one or more illustrative aspects described herein.

An example of a virtual queuing system is explained with reference to FIG. 5A. In this Figure, a schematic representing an allocation of guests (interchangeably referred to as users) in a virtual queue according to an embodiment is shown. The system includes an attraction entry point 101, a buffer queue 102, a barrier for entry to the buffer queue 103, and at least one virtual queue 104.

When a guest makes a reservation (the process for doing which will be explained below), they will be entered into a virtual queue 104. The throughput of the virtual queue (the number of guests per unit in time) will be determined by parameters in the system and will be arranged to have an average throughput 150. This is also set as a parameter of the queue and is, for example, a percentage of the maximum throughput of the ride. Guests are shown their reservation time either on their portable communication device or at a kiosk.

The guests in the queue may be moved around if necessary by the system as they may be waiting anywhere (for example in an amusement park, other enclosure of attractions, village, town, city or wider area), they may be allocated a new reservation time or prompted to select one, based on various events.

At their allotted time, the guest presents themselves with an access key or device, which may be a mobile telephone, smartphone, RFID device (such as a card, wristband or other wearable item), a card or wearable item (such as a wristband) with a visual code (such as a barcode), paper ticket, body part (for biometric identification) or other device showing that they may access the attraction, at the barrier for entry to the buffer queue. The barrier 103 may be automatic or manual. They then wait in a short buffer queue 102 to get onto the attraction through the attraction entry point 101.

In cases where the buffer queue 102 is not necessary, the barrier 103 and the attraction entry point 101 will be one and the same.

The buffer queue 102 has an optimum length 106. Changes in the length of the buffer queue from this optimum are signalled back to the system, either through automatic sensing apparatus or via an attendant 107.

The queue or queues in which guests are placed, prior to being granted access to the buffer queue (through the entry barrier 103), is/are managed by the queue manager, which is an electronic (computerised) system. These queues are entirely virtual queues. Advantageously, this may allow guests to queue for an attraction without having to physically stand in a line. There may be different types of virtual queue, as will be discussed below. Although the queue manager may also manage the physical buffer queue 102, access to this might only be available through the virtual queues.

This system may support a park, for example, where there are a number of rides or other attractions. One or more of the available attractions may be managed by the queuing system. The system may support different queue types, for instance:

- where the throughput of the ride is fixed, so the length of queue is a function of the number of guests waiting in that queue; and
- where the wait time in the queue is fixed, so the throughput of the queue varies and is a function of the number of guests in the queue (any variation in the queue throughput may taken up with a variation in the physical buffer queue 102, for example).

Other types of queue, such as where the throughput and/or wait time are variable are also possible.

A purpose of the buffer queue 102 may be to allow optimum loading on attractions where there is a fixed number of spaces available (such as an amusement park ride). For attractions where there is some flexibility in the throughput (for example, a museum or walk-through attraction) this buffer queue 102 may not be necessary. The optimum length of this buffer queue 102 may be set in the system. This may be different for each ride.

Figure 5B:
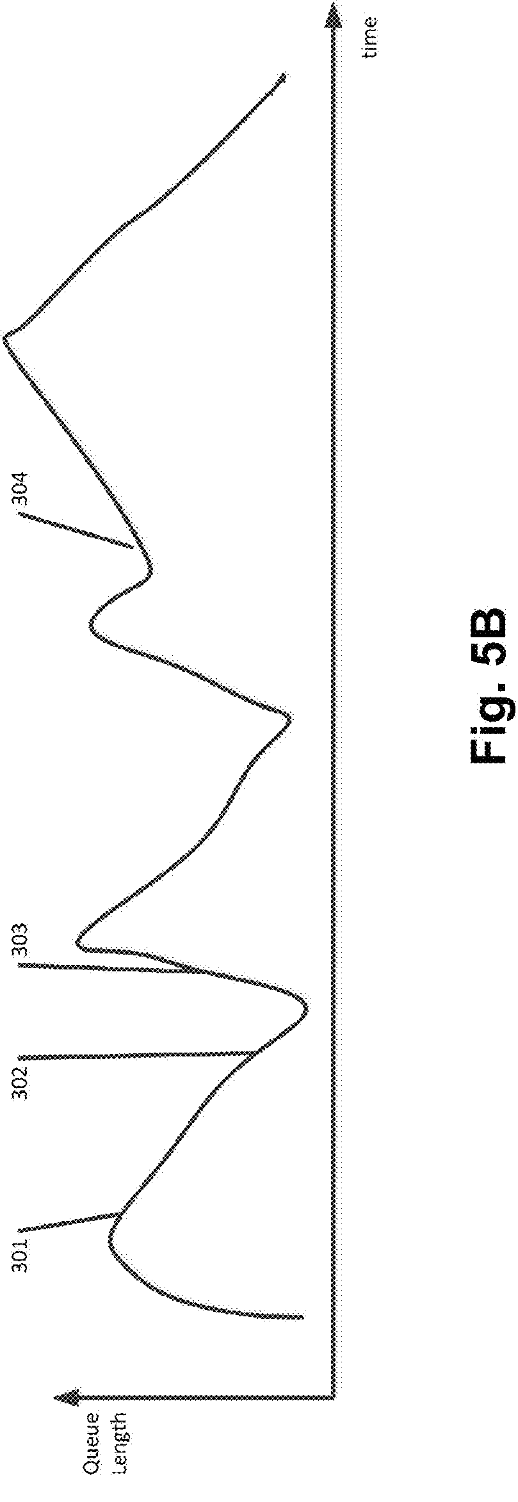
FIG. 5B shows a variation in the length of an exemplary buffer queue over time according to one or more illustrative aspects described herein.

With reference to FIG. 5B, it is shown how the length of the physical buffer queue may vary over time. The rate of throughput of the virtual queue may be set as a proportion of the expected maximum throughput of the ride. By setting the rate at less than the maximum throughput, the steady state may be for the buffer queue to decrease in length 301. When the queue gets too short, this state may be signalled back to the system controller which may cause a block of guests to be granted faster access to the front of the queue through a variety of means 302. This may take a few minutes to be seen in action, and may result in the queue length increasing 303. If the attraction closes for a short period, this may result in the buffer queue increasing in length as guests are fed onto it but are not leaving onto the attraction 304, when the attraction reopens the queue will decrease once again.

To cope with the inherent unknowns of an attraction, the throughput of guests at the front of the queue may be set as a percentage of the throughput that the ride may cope with. A more unreliable ride may have a lower allocation proportion. In a steady state, the entry to the buffer queue being below the throughput of the attraction, the buffer queue may decrease in size with time.

A system to monitor this buffer queue and send back the state may enable the system to bring forward a block of guests when the ride buffer queue gets too short. This may refill the buffer queue, which may then gradually shrink through time. The guest may be prompted to decide whether they wish to advance towards the front of the queue (this may correspond to the guest being allocated an earlier reservation time). Those guests who do not want to move their place need do nothing. Optionally this method of calling forward guests may prioritise certain groups of guests, such as those nearer the front first, those who have had their records flagged with a marker as a result of ride closures or other unexpected events.

Similarly if the queue becomes too long, the system may push guests back by increasing their reservation time. In this way, the rate at which users join the buffer queue and the overall length of the buffer queue may be controlled. Additionally or alternatively, the virtual queue may be set in the form of a fixed throughput queue.

The guest may be informed on their communication device that their reservation time is delayed. Certain types of guest (for example with pre-bought timed tickets) might potentially not be pushed back.

If the ride closes, the buffer queue may increase in length. When the ride reopens, the queue may then start to decrease again.

Thus, the rate at which users are removed from the virtual queue may be the sum of: the physical rate at which they present themselves at the attraction (or its physical buffer queue) and go on to it; and the rate of those that have missed their allocated time slot and are therefore automatically removed from the queue. The predicted time given to each guest is set depending on the set rate of the virtual queue (which may be a percentage of maximum throughput of the attraction). If we expect 600 people per hour to be processed at the attraction, every minute will contain 10 people. The system may spot gaps in this (for instance, users cancelling) and fill these gaps, as explained above. This differs from existing systems, in that the number booking is known when a request is received (since the system is a complete virtual queuing approach), so a ride time is allocated based on the predicted throughput. If this throughput is changed, the system may reallocate users by bringing them forward or moving them backwards.

Figure 5C:
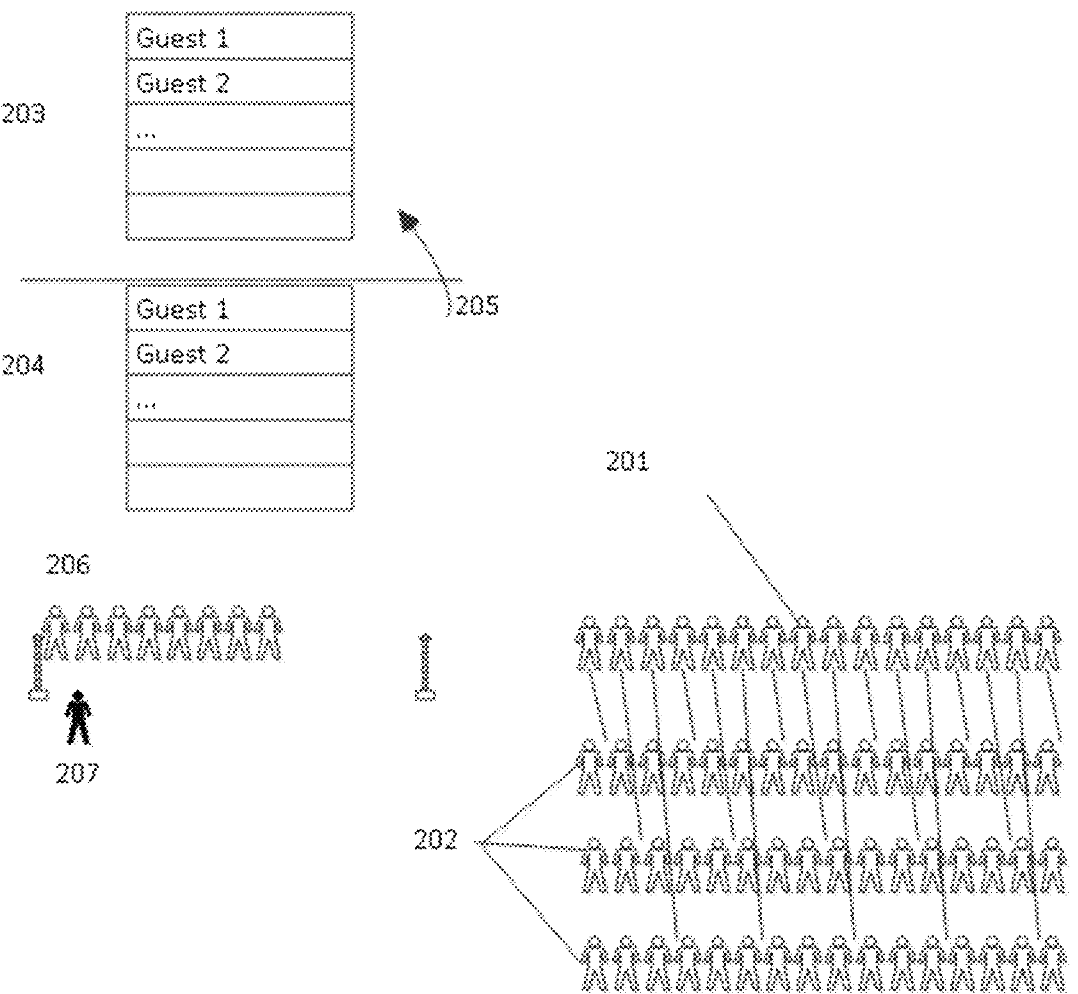
FIG. 5C depicts a schematic reallocation of guests in a buffer queue according to one or more illustrative aspects described herein.

With reference to FIG. 5C, it is demonstrated how the position of guests in a buffer queue may be reallocated. The two queues 201 and 206 are for the attraction as it is running normally. As the attendant 207 scans a group into the buffer queue 206, the system 205 may remove them from the virtual queue 204 and maintain a list 203 of those guests in the buffer queue 206. As there is no need to scan the guest out of the buffer queue when they get onto or into the attraction, this queue may grow, though a pruning algorithm would keep it at say 10 times the expected length, to avoid it getting too long.

If the ride breaks down (or the wait time increases for any other reason), the guests in the virtual queue 201 may be provided a choice of other attractions 202 that they may rebook on. The list of guests may be held in the virtual queue 204. The wait time associated with each guest on the new ride may be configurable. Options for this may include but not be limited to the time that they have already waited subtracted from the length of the virtual queue that they are joining (either current length or the length at the time they originally reserved on the closed ride), or the time that they have yet to wait for the closed attraction. The system will track the number of guests allocated onto each ride to ensure that any one ride does not get too many. Another option is that the guest will be allocated an immediate access pass for the closed ride when it reopens, and are then free to book on another ride normally.

The attendant 207 may then scan the front of buffer queue 206, this will determine the head of the queue in the list 203, all guests after this point in the buffer queue may then be allocated a premium pass or similar for another ride. If there are multiple points that may be the head of the queue (e.g. a train that loads both sides) then the attendant may scan all possible heads and the system may then determine the list based on this.

A ride may close for a number of reasons and with subsequently different closure lengths. For scheduled stoppages (addition of a second or subsequent train for example) may be entered into the system beforehand, the system may then cause a gap in guests arriving to cater for this temporary stoppage. The throughput may then be adjusted accordingly after this stoppage so that a potentially different throughput of guests may then be accommodated.

For unexpected stoppages of short duration (e.g. ride cleaning), the buffer queue will grow during the stoppage, the system may attempt to push back some guests in the virtual queue. If guests are not delayed, then the buffer queue may grow in length. Since the throughput onto the buffer queue is set to be lower than the ride throughput, once the ride restarts the buffer queue may start to shrink.

For unexpected stoppages of a longer expected or unknown duration, the guests in the virtual queue may be reallocated by the system into queues for other rides (the group rides may be pre-set or set by an operator when the ride is marked as closed). Their new wait time may be set as the amount of time that they still have left to wait, or subtracting the amount of time that they have waited from the queue length of the new ride (either current or the length at the time that they reserved). The guests who have already scanned into a buffer queue will be out of the virtual queue. If there is no barrier for them to scan to get on the attraction then the system will keep a list of guests who have scanned in. The operator may then go to the guest at the front of the buffer queue (or multiple guests in the case of parallel loading) and scan their devices. The system may then assume that all guests after those scanned are in the buffer queue may then be immediately credited with a priority voucher within the system.

Enforcing a time limit on the window for the guest to 'check in' at the front of the line, the system may reduce the possible surges made by guests delaying their entry (lunch, another performance etc.) the guest in this case may be required to notify the server that they cannot arrive within their allotted window and select a later time when they will be able to arrive.

Different types of reservations may be treated in a priority order for this pull forward or push back—for example a timed purchased ticket may be pushed back after a non-purchased reservation.

A line closure may have the same effect (pre-empting the signalling of the buffer queue becoming too long).

When a ride closes the guests may be proactively managed, and reassigned (with the guest getting a choice) into virtual queues on the remaining rides. Those in the buffer queue may be credited with an immediate (front of line) pass to use elsewhere, removing some of the customer complaints and the need for the guest to complain to guest services to get some form of recompense.

Figure 5D:
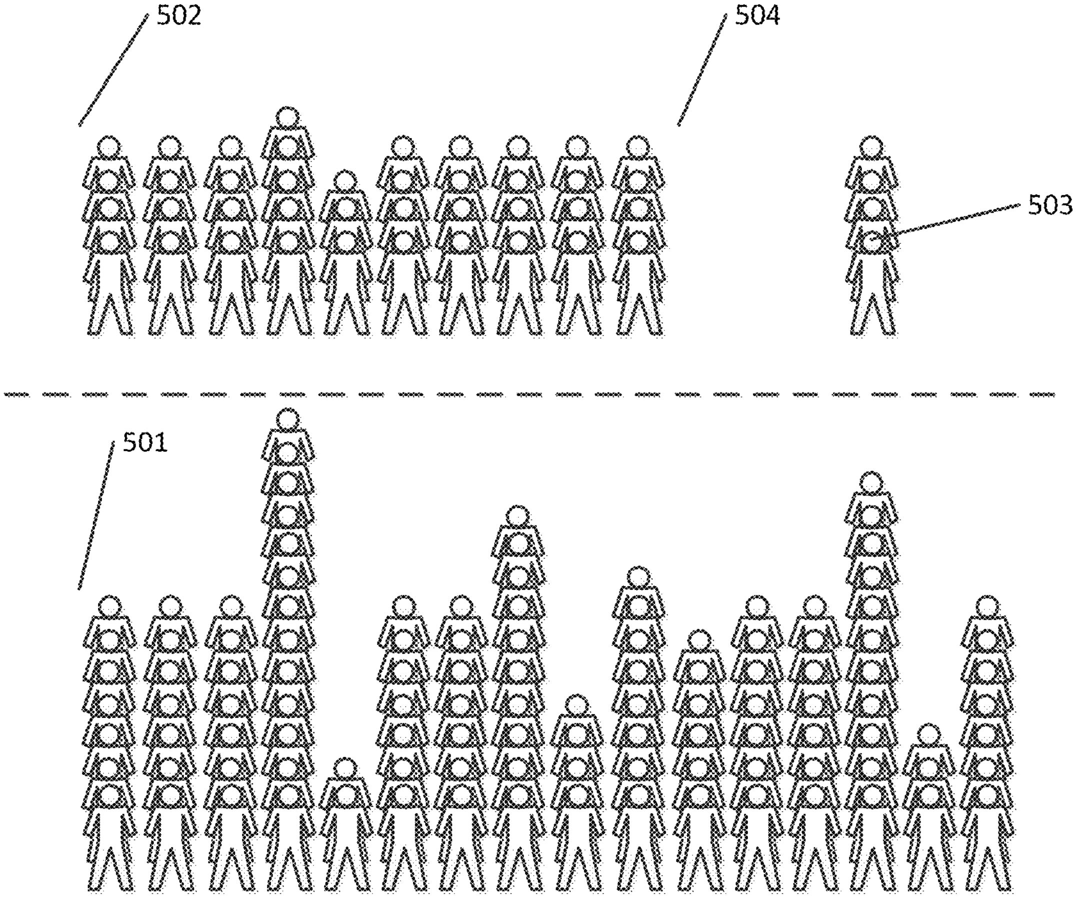
FIG. 5D shows a schematic allocation of guests in a system with multiple virtual queues according to one or more illustrative aspects described herein.

With reference to FIG. 5D, it is demonstrated how a queuing system according to one or more illustrative embodiments described herein may be operated with multiple virtual queues in parallel. When the system manages 100% of the line, multiple queues 501, 502 may be configured whose individual throughputs will add up to the available throughput. The parameters of these queues may be set differently. In this example the second queue 502 may provide a premium allocated ticket which does not count towards the guest's concurrent ride reservation limit. In this case the tail of the queue 504 may be the time that is suggested to the guest when they purchase a timed reservation, though they may be free to select a time later 503 if they have already planned something else at the time suggested.

Such a system may allow priority guests who have received an entitlement to the priority queue through some means, which may include paying for the entitlement, as a frequent user bonus, or being granted as a function of other parameters.

These additional queues may be run as fixed wait time queues or virtual queues where the length is dependent on the throughput allocated and the number of guests who have booked.

Each queue may have separate parameters to determine the queue type as well as the throughput. Priority queuing may be sold into a second queue providing a fixed time, which may allow the guest to carry on using the system for other rides.

By providing a virtual queue online, with an optional priority queue line in parallel the guest is freed from waiting in line and the merge point of the two queues is itself virtual so guest A who is in the standby line presents themselves or their group at the front at the same time as guest B who is in the priority line, neither may have any idea how long the other has waited.

Although a preferred embodiment has now been explained, the skilled person will understand that various alternatives and modifications are possible. For instance, although this system has been largely described with reference to an amusement park, it may equally be applied to other attractions or resources in which a time of access or entry may be desirable, such as a museum, a shop, an office counter, a restaurant or another appointment-based attraction or resource.

As noted above, throughput for the attraction may be measured by counting people moving through the access point. An alternative approach for measuring throughput is also considered. A wireless beacon may be placed at either end of the physical queue. Then, as a user with a wireless device that may interface with the beacon passes it, the device records the time. The device also may record the time when it passes the end of the queue. It may then transmit this to a server. An advantage of this approach is that the queue ends may be moved easily and need no power or networking, which is instead reliant on the user device. The system may only need to measure a proportion of the guests rather than 100% to extract the necessary information (for instance, it may know how many have gone into the queue as they have been scanned previously).

System Configuration

Referring next to FIG. 6, there are schematically illustrated interactions between user devices and a system operated in accordance with the disclosure. In this embodiment, there may be provided: a smartphone access key 401; a kiosk 402; an alternative access key 403; an access barrier 404; a scanning device 405; a management console 406; a (computer) server (also referred to as a system) 407. A communications network (or connectivity) 408 provides connectivity between the various components of the system. The management console 406 may be used by the operator of the attraction or attractions to configure the server 407 appropriately.

To use the system the guest may first register, which may be done using a personal communications device 401 (such as a mobile telephone) or at a kiosk 402. For a premium system this will include payment of the premium service level fee. For a system where all guests are required to use the system to book, a method of permitting that each guest only appears once is required. Typically this may be based on the entry ticket, where the ticket has a unique identifier for that guest or group. The system may allow that an entry ticket may only be used for one session in a day. Multiple entry tickets will enable a guest on subsequent visits to register their session.

A form of identification may link each user to a device used to interact with the system, which may typically be the smartphone access key or device 401 discussed above or an alternative type of access key 403, which will be discussed below. A link to the host system to validate and verify the ticket will reduce potential fraud of guests entering invalid tickets. If this system also provides information as to whether the ticket has been used that day to gain access to the park (that is, the guest is inside the park) this will provide a further level of security. A guest may register on their personal communication device 401; alternatively they may use an alternative static form of access device 403 (such as a paper ticket with an identifier such as a barcode, QR or other visual code, an RFID device, a short range wireless communications device such as based on Bluetooth or similar technologies or biometric) and register at a kiosk 402. This may allow each user of on the system 407 to be linked to a unique identifier for the guest in the form of their access key.

To register at a kiosk 402, the user may present their access key (either the smartphone 401 or the alternative access key 403) as well as their tickets (not shown). The kiosk 402 comprises a reader for the smartphone 401 and/or the alternative access key 403. The tickets are then associated with the access key into a session.

To register on a personal communication device 401, the guest may either use the device as the access key, or associate a different access key with the session and present the tickets of the group to associate these with the session (either by scanning or typing the ticket in). This may be done directly from the personal communication device 401, in particular over a network connection.

Where the tickets have been bought online in advance, the session containing the tickets and the access key of the guest may be passed by the ticket engine to the system to precreate these sessions. In this case, the guest identifies themselves with the system and their session is then retrieved.

The system 407 provides at least one virtual queue per attraction. However, some attractions may have multiple virtual queues. In this case, one of the virtual queues for an attraction may be considered a normal virtual queue and at least one other virtual queue for the attraction may be considered a premium virtual queue. The throughput for the normal virtual queue and the premium virtual queue for the same attraction may be different and the throughput for the premium virtual queue may normally be higher than that of the normal virtual queue.

Generally, a guest will only queue in one normal virtual queue at a time. The system may provide an enhanced service level generally through payment of a fee so that additional queue places may be added to their list. These are typically of the form of single or limited visits to an attraction, multiple attractions or faster access to one or more attractions. By providing a second virtual queue with different parameters the guest may get a time to go to the additional attraction. This might not stop them using the main system to queue and visit attractions whilst this additional entitlement remains on their list.

To make a reservation:

On a personal communication device 401 (where the guest remains logged in during the visit), they may select from the options available on the screen which then communicates the preferences to the server.

OR

At a kiosk 402, the guest may present an access key in the form of a personal communication device 401, or alternative access key 403, such as an RFID device or media, a ticket or biometric information to retrieve their session details which may then be presented on the kiosk 402 screen. The kiosk 402 may present the guest with options similar to the smartphone 401, enabling them to make a choice. Where appropriate, this information may then be loaded onto an access key, the guest representing their access key for the system to write the information to it.

To reserve a time, a guest may be presented with a list of the attractions and the predicted ride time. When they reserve, the system may check the current queue, add them to the end of it and notify them of the actual time that has been reserved for them. The guest may be free to alter this time to be later than that supplied by the system 407. This may enable the guest to plan other events if required, especially for purchased allocation.

In addition to the reservation for attractions, additional benefits may be made available for guests to purchase, which may enable timed access to attractions. These may be individual or grouped. These may be managed by adding a separate virtual queue for the attraction.

Guests may purchase access to some of the rides in advance, allowing them to ensure that during their visit they are guaranteed a ride on those that they want. The number of rides providing this may be determined by the system setup and packages available.

Packages for reserving additional rides may be available for purchase, or for credit to the guest's session at guest services discretion. A group of rides may be available from which the guest may only be allowed on a subset.

The guest may opt to 'step out of the line' to perform certain activities; in this case their position remains fixed. This allows them to maybe use the booking engine for something different, but without having to cancel their reservation and so re-joining the line at the end. Additionally or alternatively, the system may force the guest to do so, if the guest wants to do something else (for example due to a last minute reservation for another attraction, or a longer event such as lunch, a show or similar).

During normal operation, the queue management system 407 may allocate a number of guests per unit of time (for example, a minute) that the ride may accommodate, each unit of time or 'bucket' will get filled with guests, then the next bucket will be filled. If a group is larger than the bucket, then the subsequent bucket or buckets may have a corresponding number subtracted from them.

One other alternative setup for the management of this 100% virtual queue system is for attractions that need or may cope with smaller buffer queues, as will now be discussed.

The system may monitor the people going through the access point, from this determines the average throughput. This may be combined with past data and smoothed to avoid large changes.

Based on this throughput the wait times may be calculated for all guests in the queue. When these wait times have changed by a pre-set margin, the guest may be notified of the change.

The guest might therefore not be presented with a fixed visit time, but with an estimate, which will get more accurate the nearer to the front of the queue that they get. The guest may choose to revert to their original later time if they are unable to make the new estimated time.

By setting the throughput initially as a proportion of the expected throughput the reservation time should in normal running be brought forwards. In the event of ride closures the updated reservation times may be pushed out, for extended closure the system may offer them a choice of switching to another queue.

This system may cope better with low throughput attractions where the throughput is more variable, so a fixed reservation time cannot be easily provided.

Guests may be grouped into priority groups, so that higher priority groups take precedence in being moved forwards, and become the last to be moved back.

When the guest arrives at the access barrier 404 at the time set by the server 407, the scanning device 405 detects the smartphone access key 401 or the alternative access key 403. The guest is allowed to pass through the access barrier 404 towards the attraction if the scanning device 405 (optionally after checking with the server 407) confirms that the guest is entitled to do so based on the time set by the server 407. The scanning device 405 may be integrated with the access barrier 404, so that the opening of the access barrier 404 is automatic. Alternatively (as shown), an attendant may be present to use the scanning device 405 and open the barrier based on the result.

The throughput of guests into the buffer queue may be adjusted so that normally it may be below the actual throughput of the ride. The factor may be determined operationally and may take into account:

the variability of throughput of that ride;

the propensity of the ride to break down, or other unanticipated stoppages; and/or the propensity of other rides within the park to break down or have stoppages (planned or unplanned) resulting in temporary closure and thus the potential need to offload guests.

To manage a line or lines efficiently, in every case where the throughput of the service or attraction may vary, the system may manage this virtual queue and keep the guest updated with their time to present themselves. This may be achieved by either moving the entry time forwards or backwards, or by sending a message to those with a personal device to determine whether they would accept a place sooner.

Figure 7:
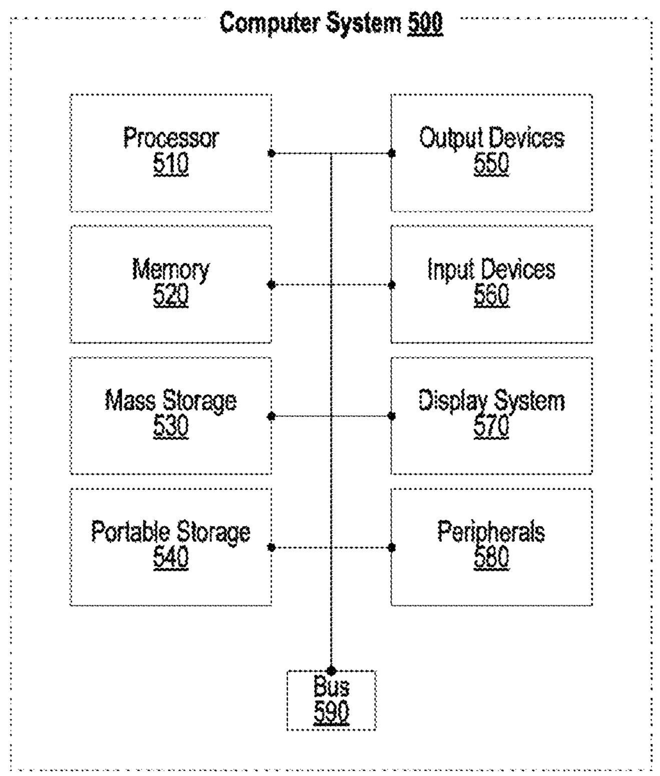
FIG. 7 illustrates an exemplary computing system that may be used to implement one or more illustrative aspects described herein.

FIG. 7 illustrates an exemplary computing system 500 that may be used to implement one or more aspects described herein. For example, any of the computer systems or computerized devices described herein may, in at least some cases, be a computing system 500. The computing system 500 of FIG. 7 includes one or more processors 510 and memory 510. Main memory 510 stores, in part, instructions and data for execution by processor 510. Main memory 510 may store the executable code when in operation. The system 500 of FIG. 7 may further include a mass storage device 530, portable storage medium drive(s) 540, output devices 550, user input devices 560, a graphics display 570, and peripheral devices 580.

The components shown in FIG. 7 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, may be a non-volatile storage device for storing data and instructions for use by processor unit 510. Mass storage device 530 may store the system software for implementing one or more illustrative embodiments described herein for purposes of loading that software into main memory 510.

Portable storage device 540 operates in conjunction with a portable nonvolatile storage medium, such as a floppy disk, compact disk or Digital video disc, to input and output data and code to and from the computer system 500 of FIG. 7. The system software for implementing one or more illustrative embodiments described herein may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 7 may include output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 may receive textual and graphical information, and process the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

The components contained in the computer system 500 of FIG. 7 are those typically found in computer systems that may be suitable for use with aspects described herein and are intended to represent a broad category of such computer components that are well known in the art. Thus, the computer system 500 of FIG. 7 may be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewellery/clothing/accessory), a video game console (portable or otherwise), an e-book reader, a media player device (portable or otherwise), a vehicle-based computer, some combination thereof, or any other computing device. The computer system 500 may in some cases be a virtual computer system executed by another computer system. The computer may also include different bus configurations, networked platforms, multi-processor platforms, etc. Various operating systems may be used including Unix, Linux, Windows, Macintosh OS, Palm OS, Android, iOS, and other suitable operating systems.

In some cases, the computer system 500 may be part of a multi-computer system that uses multiple computer systems 500, each for one or more specific tasks or purposes. For example, the multi-computer system may include multiple computer systems 500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 500 from different networks communicatively coupled together via the internet (also known as a "distributed" system).

While various flow diagrams provided and described above may show a particular order of operations performed by certain aspects described herein, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

User Interface

FIG. 8A illustrates a map user interface that identifies estimated wait times for multiple attractions on a distorted map of a venue. The map user interface is illustrated in FIG. 8A being displayed via a display screen of a front-end device 305, which is illustrated as a mobile device 110.

The map user interface of FIG. 8A includes a distorted map 315 with a guest location marker 340 and a number of markers identifying estimated wait times for various points interest. For example, different points of interest marked on the map 315 are illustrated in FIG. 8A as having 5 minute wait times, 10 minute wait times, 15 minute wait times, or 20 minute wait times, depending on the lines outside each point of interest.

The map 315 of FIG. 8A is distorted in that it is not illustrated entirely to scale. In particular, certain areas may be illustrated at a closer scale (i.e., more "zoomed in") than other areas. For example, in the map 315 of FIG. 8A, an area including the guest location marker 340 and the point of interest location markers is illustrated at a closer "more zoomed in" scale (e.g., a 1:10 scale), while areas of the entertainment venue that are farther away from the guest location marker 340 and the point of interest location markers are illustrated at a farther "more zoomed out" scale (e.g., a 1:100 scale). Each "area" may be of uniform scale, or may have a gradual increase/decrease in scale internally, or some combination thereof.

An area including guest location marker 340 and point of interest location markers could gradually have a farther "more zoomed out" scale towards the edges of the area. The areas could be segmented internally as well. For example, a sub-area including the guest location marker 340 may be illustrated at a closer scale (e.g., a 1:5 scale) than an area including the point of interest location markers (e.g., a 1:15 scale), or vice versa. It should be noted that while FIG. 8B illustrates the map 335 as distorted, in some cases, it may instead be an ordinary map illustrated entirely at one scale.

Figure 8C:
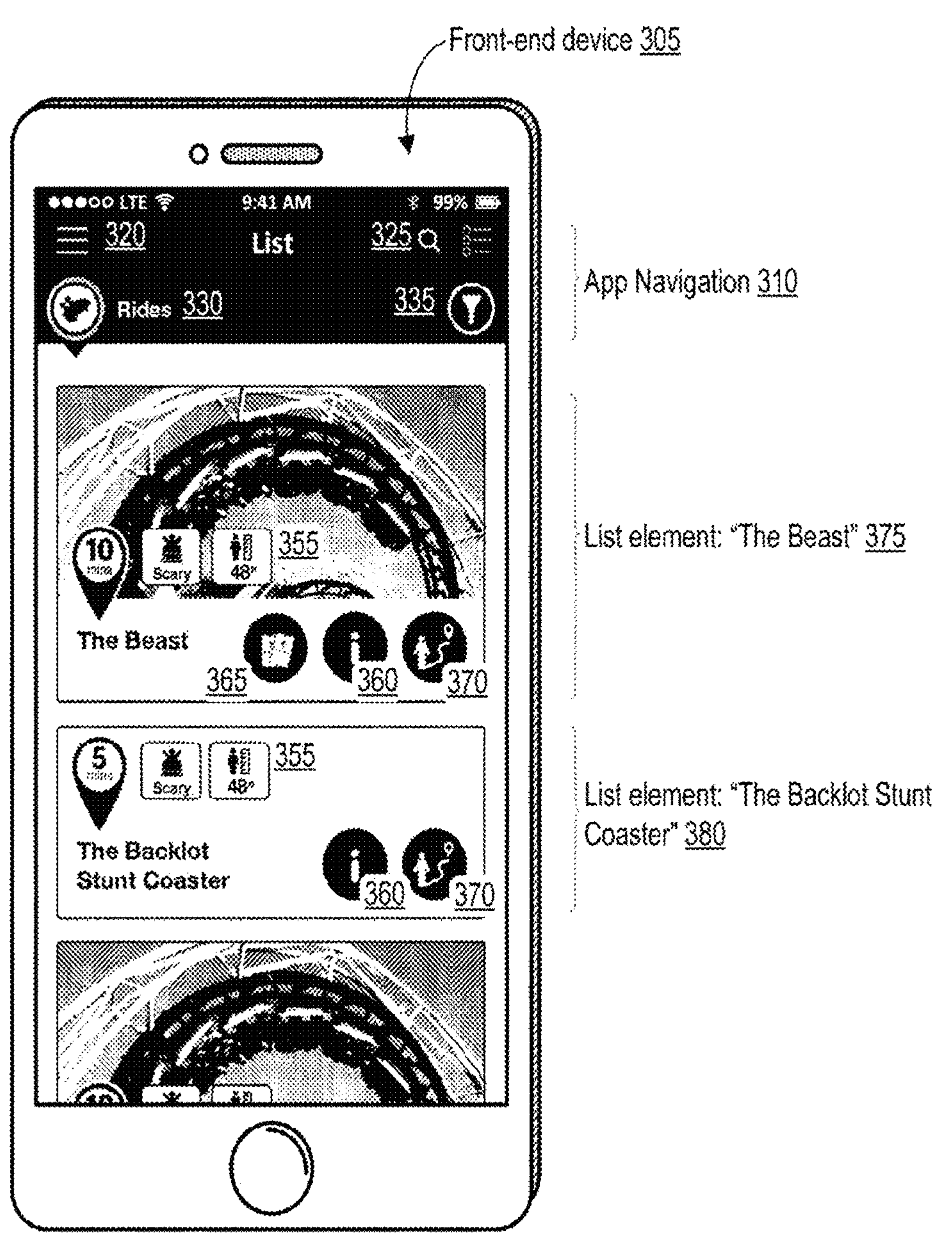

The map user interface of FIG. 8A also includes an application navigation element 310. This identifies that the current user interface is the "map" user interface, includes a search function 320 allowing a user of the front-end device 305 to search through the map for a particular point of interest, includes a specifier 330 that identifies that the points of interest currently shown on the map are "rides" as opposed to restaurants or bathrooms, and includes a filter function 335 allowing a user of the front-end device 305 to further filter the types of points of interest shown (e.g., scary roller-coaster rides, child-friendly rides). The application navigation element 310 of FIG. 8A also may include a menu button 320 allowing further navigation within the application (e.g., to reach the list user interface illustrated in FIG. 8C).

FIG. 8B illustrates a pop-up alert displayed over a map user interface, the pop-up alert identifying an estimated wait time and various facts about a particular attraction in a venue. The pop-up alert 350 and map-user interface are illustrated in FIG. 8B being displayed via a display screen of a front-end device 305, which is illustrated as a mobile device 110.

The pop-up alert 350 of FIG. 8B is overlaid over the map user interface 315 of FIG. 8B, which is darkened to put the emphasis on the pop-up alert 350. This darkened map user interface 315 of FIG. 8B may or may not retain ordinary map functionality or interactivity while the pop-up alert 350 remains displayed. For example, panning, zooming, or selecting different points of interest may be disabled while the pop-up alert 350 remains displayed. The pop-up alert 350 of FIG. 8B includes a point of interest name ("Race For Your Life Charlie Brown"), a photo of the point of interest, some details 355 (identifying the ride as a "thrill" ride, identifying a 42 inch height requirement, and identifying a under-41-inch guardian supervision requirement), and an estimated wait time (10 minutes). The pop-up alert 350 of FIG. 8B also includes navigation buttons, including an information button 360 that navigates the user to a point of interest information user interface (e.g., such as the one illustrated in FIG. 9), a ticket button 365 that navigates the user to an electronic copy of their tickets (e.g., and in some cases may alert the user to available promotions), and a travel map button 370 that navigates the user to a map with travel directions (e.g., walking directions, bus directions, trolley directions, driving directions, or some combination thereof) to the identified point of interest.

The map user interface in the background of FIG. 8B also includes the application navigation element 310 of FIG. 8A.

FIG. 8C illustrates a list user interface identifying estimated wait times and various facts about multiple attractions in a venue. The list user interface is illustrated in FIG. 8C being displayed via a display screen of a front-end device 305, which is illustrated as a mobile device 110.

The list user interface of FIG. 8C includes a list element 375 identifying one ride named "The Beast." The list element 375 identifies a 10 minute estimated wait time, and includes details 355 identifying "The Beast" ride as "scary" and as having a 48 inch height requirement. The list element 375 also includes a ticket button 360 and a travel button 370, as well as an information button 365 that navigates to the point of interest information user interface illustrated in FIG. 9.

The list user interface of FIG. 8C includes a list element 380 identifying one ride named "The Backlot Stunt Coaster." The list element 380 identifies a 10 minute estimated wait time, and includes details 355 identifying "The Backlot Stunt Coaster" ride as "scary" and as having a 48 inch height requirement. The list element 375 also includes a ticket button 360 and a travel button 370.

The list user interface of FIG. 8C also includes an application navigation element 310 similar to the application navigation element 310 illustrated in FIG. 8A, though the application navigation element 310 of FIG. 8C identifies that the current user interface is the "list" user interface, and the search function 325 and filter function 335 are applied to searching for points of interest within the list and filtering the points of interest viewable within the list, respectively. The menu 320 of FIG. 8C may be used to return to the map user interface of FIG. 8A.

Figure 9:
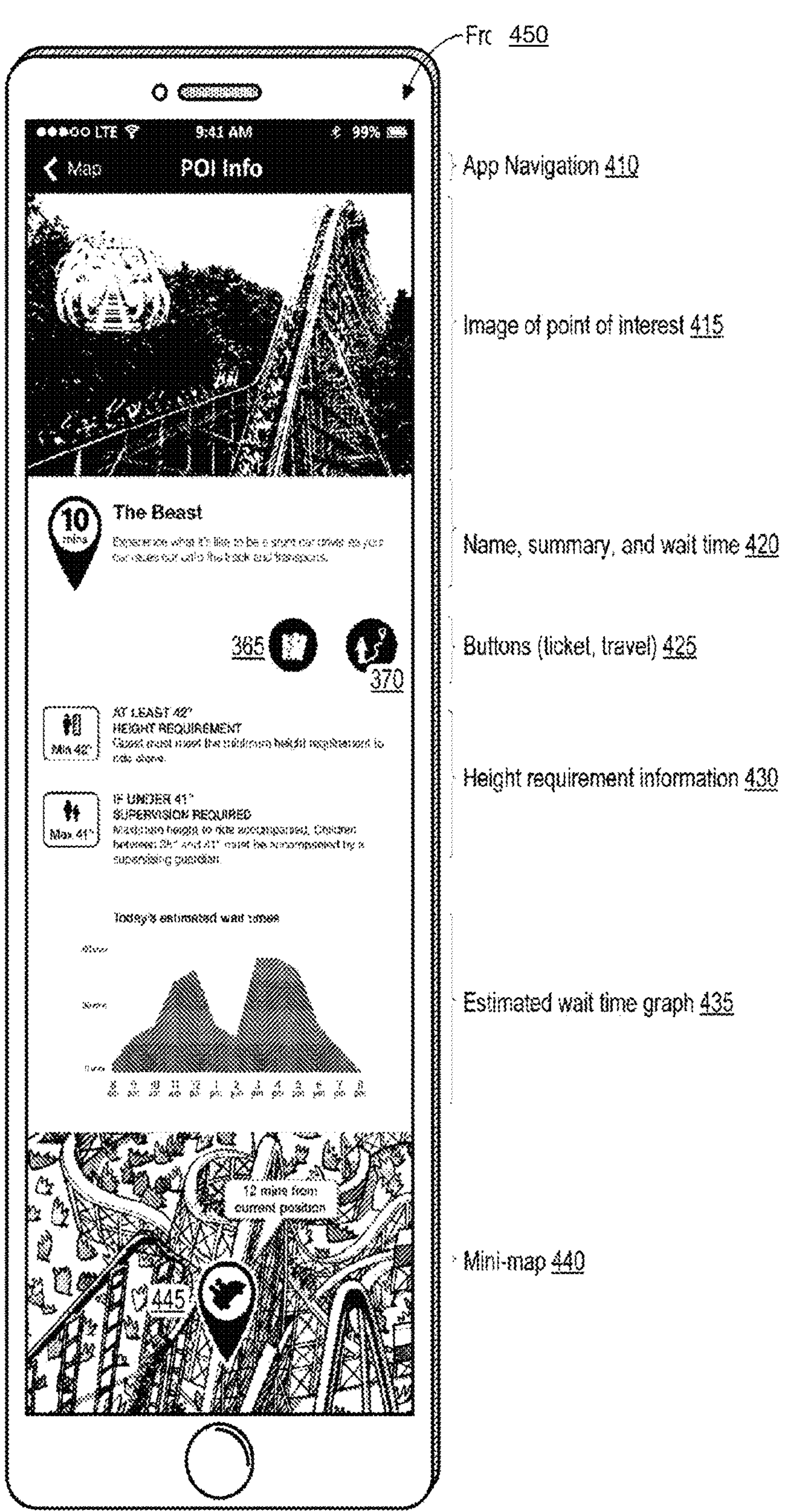
FIG. 9 illustrates an example graphical user interface that may be displayed according to one or more illustrative aspects described herein.

FIG. 9 illustrates a point of interest information user interface identifying an estimated wait time graph and other facts about a particular attraction in a venue. The point of interest information user interface is illustrated in FIG. 9 being displayed via a display screen of a front-end device 305, which is illustrated as a mobile device 110. While front-end device 450 of FIG. 9 is illustrated in an exaggerated manner with a vertically lengthy display, it should be understood that the proportions of the front-end device 450 could be closer to those of exemplary front-end device 305, and that the notification user interface of FIG. 9 could include a scroll bar or other scrolling mechanism to scroll through the notification user interface of FIG. 9, for example via touchscreen gestures, mouse movements, mouse clicks, scroll wheel/ball movements, or some combination thereof.

The point of interest information user interface of FIG. 9 includes an application navigation element 410 that identifies that the current user interface is a point of interest information user interface ("POI Info") and allows the user to navigate back to a map user interface, such as the map user interface of FIG. 8A. In another embodiment, the application navigation element 410 of FIG. 9 could instead allow the user to navigate back to a list user interface, such as the list user interface of FIG. 8C.

The point of interest information user interface of FIG. 9 also includes an image 415 of the point of interest, which in this case is the ride "The Beast," as explained in the name segment 420, which also identifies the wait time (10 minutes) and a summary of the ride ("Experience what it's like to be a stunt car driver as your car races out onto the track and transports.") The point of interest information user interface of FIG. 9 also includes a buttons section 425 with a ticket button 365 and a travel button 370. The point of interest information user interface of FIG. 9 also includes a height requirement information section 430 identifying a 42 inch height requirement and identifying a guardian supervision requirement for guests from 38 inches to 41 inches in height.

The point of interest information user interface of FIG. 9 also includes an estimated wait time graph 435. This is generated by the application server(s) 125 using the wait time calculation algorithm as described in reference to FIG. 3, and includes future wait times so that the guest in question may plan when they wish to get on the "Beast" ride. For example, 1 pm-2 pm is predicted to have low wait times, but 3 pm-5 pm is predicted to have high wait times, so a guest might use this to plan to ride the "Beast" ride around 1:30 pm. Similarly, venue staff might use this type of estimated wait time graph 435 to plan an appropriate reaction to alleviate potential problems before they become real problems. For example, venue staff may act to increase guest throughput by increasing the number of staff or cashiers. Venue staff might also act to increase capacity by increasing a number of seats for a show or increasing a number ride cars operating on a theme park ride. Such venue staff actions may be planned ahead of time during estimated peak times, such as 3 μm to 5 pm as identified in FIG. 9.

The point of interest information user interface of FIG. 9 also includes a mini-map 440 that identifies a location 445 of the "Beast" ride within a map showing a portion of the venue. The mini-map 440 may be distorted as discussed regarding the map 315 of FIG. 8A, or may be an ordinary map drawn to scale.

Although a preferred embodiment has been described above, the skilled person will understand that various alternatives and modifications are possible. For instance, although this system has been largely described with reference to an amusement park, it may equally be applied to other attractions or resources in which a time of access or entry may be desirable, such as a museum, a shop, an office counter, a restaurant or another appointment-based attraction or resource.

What is claimed is:

1. A method of estimating a length of a queue associated with a resource within a venue, wherein the queue comprises a plurality of segments, the method comprising:

receiving, from one or more cameras present in the venue, a plurality of images of the queue, wherein each image corresponds to a segment of the queue;

estimating, by a server, a number of venue guests in the queue, based on the plurality of images of the queue, wherein estimating the number of venue guests in the queue comprises:

for each of a first subset of the plurality of images, estimating a number of venue guests in the corresponding segment of the queue by estimating a number of pixels of the image that correspond to venue guests in the queue, wherein for each of the first subset of images, estimating the number of venue guests in the corresponding segment of the queue further comprises applying a weighting to each pixel, wherein the weighting is based on:

a gradient mask applied to the image, wherein the gradient mask causes a lower weighting to be applied to pixels corresponding to areas that are closer to a corresponding camera and a higher weighting to pixels corresponding to areas that are further from the corresponding camera, to account for perspective effects in the image;

for each of a second subset of the plurality of images, estimating a number of venue guests in the corresponding segment of the queue by detecting and counting individual venue guests visible in the image; and summing, for each of the plurality of images, the estimated number of venue guests in the corresponding segment of the queue;

wherein the method further comprises sending, to one or more of a front-end device and mobile devices corresponding to venue guests, a notification comprising one or more of:

the estimated number of venue guests in the queue;

an estimated current wait time based on the estimated number of venue guests in the queue; and a time at which a venue guest joining the queue is permitted entry to the resource, based on the estimated number of venue guests in the queue.

2. The method of claim 1, wherein each segment of the queue has a corresponding capacity, wherein estimating the number of venue guests in the queue comprises:

identifying a queue segment containing an end of the queue; and summing the capacities of each of the segments that are ahead of the segment containing the end of the queue.

3. The method of claim 2, wherein estimating the number of venue guests in the queue further comprises:

estimating a number of venue guests in the queue segment containing the end of the queue based on the image of the corresponding segment; and summing the estimated number of venue guests in the queue segment containing the end of the queue, along with the capacities of each of the segments that are ahead of the segment containing the end of the queue.

4. The method of claim 1, wherein each segment of the queue has a corresponding capacity, wherein estimating a number of venue guests in the queue comprises:

identifying a queue segment containing an end of the queue; and for each of the plurality of images corresponding to segments that are ahead of the segment containing the end of the queue or corresponding to the segment containing the end of the queue, estimating a number of venue guests in the corresponding segment of the queue; and summing, for each of the plurality of images corresponding to segments that are ahead of the segment containing the end of the queue or corresponding to the segment containing the end of the queue, the estimated number of venue guests in the corresponding segment of the queue.

5. The method of claim 1, wherein the plurality of segments comprises a subset of segments for which corresponding images are not available, wherein the method comprises:

identifying a queue segment containing an end of the queue; and for each queue segment that is ahead of the segment containing the end of the queue and for which a corresponding image is not available, estimating a number of venue guests in the corresponding segment of the queue by assuming the number of venue guests in the segment is equal to a corresponding capacity of the segment.

6. The method of claim 1, wherein the plurality of segments comprises a subset of segments for which corresponding images are not available, wherein the method comprises, for each segment for which a corresponding image is not available:

estimating a number of venue guests in a segment immediately subsequent to the segment for which a corresponding image is not available, based on an image corresponding to the immediately subsequent segment; and if the estimated number of venue guests in the immediately subsequent segment is greater than a threshold number or is greater than a threshold percentage of a capacity of the immediately subsequent segment, estimating a number of venue guests in the corresponding segment of the queue by assuming the number of venue guests in the segment is equal to a corresponding capacity of the segment.

7. The method of claim 1, wherein estimating the number of venue guests in the queue based on the plurality of images of the queue comprises, for at least some of the plurality of images:

comparing the image with a corresponding reference image of a same location captured at a time when there are no venue guests in the queue.

8. The method of claim 1, wherein estimating the number of venue guests in the queue based on the plurality of images of the queue comprises, for at least some of the plurality of images:

applying a mask to the image so that areas of the image that correspond to areas of the venue that do not form part of the queue are excluded when estimating the number of venue guests.

9. The method of claim 1, further comprising managing, by the server and based on the estimated number of venue guests in the queue, a virtual queue, wherein managing the virtual queue comprises automatically sending, to mobile devices corresponding to venue guests included in the virtual queue, notifications indicating when the corresponding venue guests are permitted entry to the resource.

10. The method of claim 1, further comprising regulating, by the server, access to the resource by one or more venue guests by receiving, from a mobile device corresponding to a venue guest, a request to access the resource, adding the venue guest to a virtual queue associated with the resource, and managing the virtual queue by removing the venue guests from the virtual queue at a rate based on the estimated number of venue guests in the queue.

11. A method of estimating a wait time of a queue associated with a resource within a venue, wherein the queue comprises a plurality of segments, the method comprising:

determining, by a server, a throughput of the resource;

receiving, from one or more cameras present in the venue, a plurality of images of the queue, wherein each image corresponds to a segment of the queue;

estimating, by a server, a number of venue guests in the queue, based on the plurality of images of the queue, wherein estimating the number of venue guests in the queue comprises:

for each of a first subset of the plurality of images, estimating a number of venue guests in the corresponding segment of the queue by estimating a number of pixels of the image that correspond to venue guests in the queue, wherein for each of the first subset of images, estimating the number of venue guests in the corresponding segment of the queue further comprises applying a weighting to each pixel, wherein the weighting is based on:

a gradient mask applied to the image, wherein the gradient mask causes a lower weighting to be applied to pixels corresponding to areas that are closer to a corresponding camera and a higher weighting to pixels corresponding to areas that are further from the corresponding camera, to account for perspective effects in the image;

for each of a second subset of the plurality of images, estimating a number of venue guests in the corresponding segment of the queue by detecting and counting individual venue guests visible in the image;

summing, for each of the plurality of images, the estimated number of venue guests in the corresponding segment of the queue;

estimating a current wait time of the queue, based on the number of venue guests in the queue and the throughput of the resource; and sending, to one or more of a front-end device and mobile devices corresponding to venue guests, a notification comprising one or more of:

the estimated current wait time; and a time at which a venue guest joining the queue is permitted entry to the resource, based on the estimated current wait time.

12. The method of claim 11, further comprising managing, by the server and based on the estimated current wait time, a virtual queue, wherein managing the virtual queue comprises automatically sending, to mobile devices corresponding to venue guests included in the virtual queue, notifications indicating when the corresponding venue guests are permitted entry to the resource.

13. The method of claim 11, further comprising regulating, by the server, access to the resource by one or more venue guests by receiving, from a mobile device corresponding to a venue guest, a request to access the resource, adding the venue guest to a virtual queue associated with the resource, and managing the virtual queue by removing the venue guests from the virtual queue at a rate based on the estimated current wait time and/or the throughput of the resource.

14. The method of claim 13, further comprising:

controlling access to the resource such that a venue guest presenting an identifier is allowed to access the resource only after being removed from a front of the virtual queue, no other access to the resource being permitted.

15. The method of claim 14, further comprising detecting, by a scanner at an entrance to the queue, the identifier presented by a user; and automatically controlling an access barrier permitting or blocking entrance to the queue.

16. The method of claim 11, further comprising:

measuring, by the server, a direct wait time of at least one venue guest in the queue, by:

receiving, from the one or more cameras, a plurality of timestamped images of the queue and performing identity recognition on the timestamped images; or receiving, from one or more beacons present in the venue, one or more timestamps tracking one or more mobile devices, corresponding to the venue guests, in proximity to the one or more beacons, wherein the current wait time of the queue is further based on historic data comprising the measured direct wait time.

17. The method of claim 11, wherein determining the throughput of the resource comprises:

determining, by the server, an operating throughput of the resource;

receiving, by the server, event schedule data identifying a plurality of scheduled times corresponding to a plurality of events occurring at one or more of the resource and nearby points of interest, wherein the events cause a throughput of the resource to deviate from the operating throughput of the resource; and estimating, by the server, the throughput of the resource based on the operating throughput, and the event schedule data.

18. The method of claim 17, further comprising:

tracking, by the server and via a satellite navigation system, locations of the one or more mobile devices, corresponding to the venue guests;

identifying, by the server, one or more trends in the locations of the mobile devices, based on the event schedule data;

inputting, into a machine learning model, one or more of: the estimated current wait time, a measured direct wait time, the tracked locations of the one or more mobile devices, the event schedule data, and historic data; and wherein estimating the current wait time of the queue, comprises generating, by the machine learning model, an estimated wait time.

19. A server configured to estimate a length of a queue, wherein the queue is associated with a resource within a venue, wherein the server is configured to:

receive, from one or more cameras present in the venue, a plurality of images of the queue, wherein each image corresponds to a segment of the queue; and estimate a number of venue guests in the queue, based on the plurality of images of the queue, wherein estimating the number of venue guests in the queue comprises:

for each of a first subset of the plurality of images, estimating a number of venue guests in the corresponding segment of the queue by estimating a number of pixels of the image that correspond to venue guests in the queue, wherein for each of the first subset of images, estimating the number of venue guests in the corresponding segment of the queue further comprises applying a weighting to each pixel, wherein the weighting is based on:

a gradient mask applied to the image, wherein the gradient mask causes a lower weighting to be applied to pixels corresponding to areas that are closer to a corresponding camera and a higher weighting to pixels corresponding to areas that are further from the corresponding camera, to account for perspective effects in the image;

for each of a second subset of the plurality of images, estimating a number of venue guests in the corresponding segment of the queue by detecting and counting individual venue guests visible in the image; and summing, for each of the plurality of images, the estimated number of venue guests in the corresponding segment of the queue;

send, to one or more of a front-end device and mobile devices corresponding to venue guests, a notification comprising one or more of:

the estimated number of venue guests in the queue;

an estimated current wait time based on the estimated number of venue guests in the queue; and a time at which a venue guest joining the queue is permitted entry to the resource, based on the estimated number of venue guests in the queue.

20. A non-transitory computer-readable storage medium storing a program that, when executed by a processor of a computing system, causes the computing system to estimate a length of a queue associated with a resource within a venue by performing the following steps:

receiving, from one or more cameras present in the venue, a plurality of images of the queue, wherein each image corresponds to a segment of the queue;

estimating a number of venue guests in the queue, based on the plurality of images of the queue, wherein estimating the number of venue guests in the queue comprises:

for each of a first subset of the plurality of images, estimating a number of venue guests in the corresponding segment of the queue by estimating a number of pixels of the image that correspond to venue guests in the queue, wherein for each of the first subset of images, estimating the number of venue guests in the corresponding segment of the queue further comprises applying a weighting to each pixel, wherein the weighting is based on:

a gradient mask applied to the image, wherein the gradient mask causes a lower weighting to be applied to pixels corresponding to areas that are closer to a corresponding camera and a higher weighting to pixels corresponding to areas that are further from the corresponding camera, to account for perspective effects in the image;

for each of a second subset of the plurality of images, estimating a number of venue guests in the corresponding segment of the queue by detecting and counting individual venue guests visible in the image;

summing, for each of the plurality of images, the estimated number of venue guests in the corresponding segment of the queue;

sending, to one or more of a front-end device and mobile devices corresponding to venue guests, a notification comprising one or more of:

the estimated number of venue guests in the queue;

estimated current wait time based on the estimated number of venue guests in the queue; and a time at which a venue guest joining the queue is permitted entry to the resource, based on the estimated number of venue guests in the queue.

21. The method of claim 1, wherein the weighting applied to each pixel is further based on an estimated density of the queue at a location corresponding to the pixel.

22. The method of claim 11, wherein the weighting applied to each pixel is further based on an estimated density of the queue at a location corresponding to the pixel.

* * * * *